(12) United States Patent
    Huang

(10) Patent No.: US 12,700,348 B2
(45) Date of Patent: Aug. 4, 2026

(54) REFRESH RATE ADJUSTMENT METHOD AND ELECTRONIC DEVICE

(71) Applicant: HONOR DEVICE CO., LTD., Shenzhen (CN)

(72) Inventor: Bangbang Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/995,115

(22) PCT Filed: Nov. 14, 2023

(86) PCT No.: PCT/CN2023/131611
    § 371 (c)(1),
    (2) Date: Jan. 15, 2025

(87) PCT Pub. No.: WO2024/148945
    PCT Pub. Date: Jul. 18, 2024

(65) Prior Publication Data
    US 2026/0031018 A1      Jan. 29, 2026

(30) Foreign Application Priority Data

Jan. 10, 2023    (CN) ........................ 202310033877.X

(51) Int. Cl.
    *G09G 3/32*        (2016.01)
    *G06F 3/048*       (2013.01)
    *G06F 3/04847*     (2022.01)
(52) U.S. Cl.
    CPC .......... *G09G 3/32* (2013.01); *G06F 3/04847* (2013.01); *G09G 2340/0435* (2013.01)

(58) Field of Classification Search
    CPC .. G06F 1/3218; G06F 1/3265; G06F 3/04883; G06F 3/1454; H04M 1/72412;
    (Continued)

(56) References Cited

U.S. PATENT DOCUMENTS

2017/0116933 A1    4/2017  Xu
2017/0352322 A1   12/2017  Spence et al.
                  (Continued)

FOREIGN PATENT DOCUMENTS

CN    106250085  A    12/2016
CN    113961277  A     1/2022
                  (Continued)

*Primary Examiner* — Insa Sadio
(74) *Attorney, Agent, or Firm* — WOMBLE BOND DICKINSON (US) LLP

(57)              ABSTRACT

Embodiments of this application provide a refresh rate adjustment method and an electronic device in the field of electronic technologies. The method displays a first interface at a first refresh rate. After receiving a first operation from a user, a motion-effect image is displayed at a second refresh rate in response to the operation. A second interface is then displayed at a third refresh rate after the motion-effect image is shown. The motion-effect image is displayed while the electronic device switches from the first to the second interface, with the second refresh rate being greater than the first and third refresh rates. This allows some motion-effect images to be displayed at a higher second refresh rate, improving their display effects and alleviating issues like jittering and smearing, thus enhancing the user experience.

20 Claims, 22 Drawing Sheets

(a)

(b)

(58) Field of Classification Search
    CPC . H04M 1/72454; H04W 52/027; Y02D 30/70
    See application file for complete search history.

(56)                    References Cited

U.S. PATENT DOCUMENTS

2018/0033378 A1*   2/2018  Li  ........................ G09G 3/3406
2019/0122637 A1    4/2019  Sanders et al.
2021/0043169 A1*   2/2021  Bae ........................... G06F 3/14
2023/0134189 A1    5/2023  Xu et al.
2023/0351665 A1   11/2023  Bian et al.
2024/0221701 A1    7/2024  Zhao

FOREIGN PATENT DOCUMENTS

CN          114518817 A    5/2022
CN          114690975 A    7/2022
CN          114842816 A    8/2022
EP            4105773 A1  12/2022
WO         2022242213 A1  11/2022

* cited by examiner

Electronic device 100

CONT. FROM FIG. 4C (a)                                                  (b)

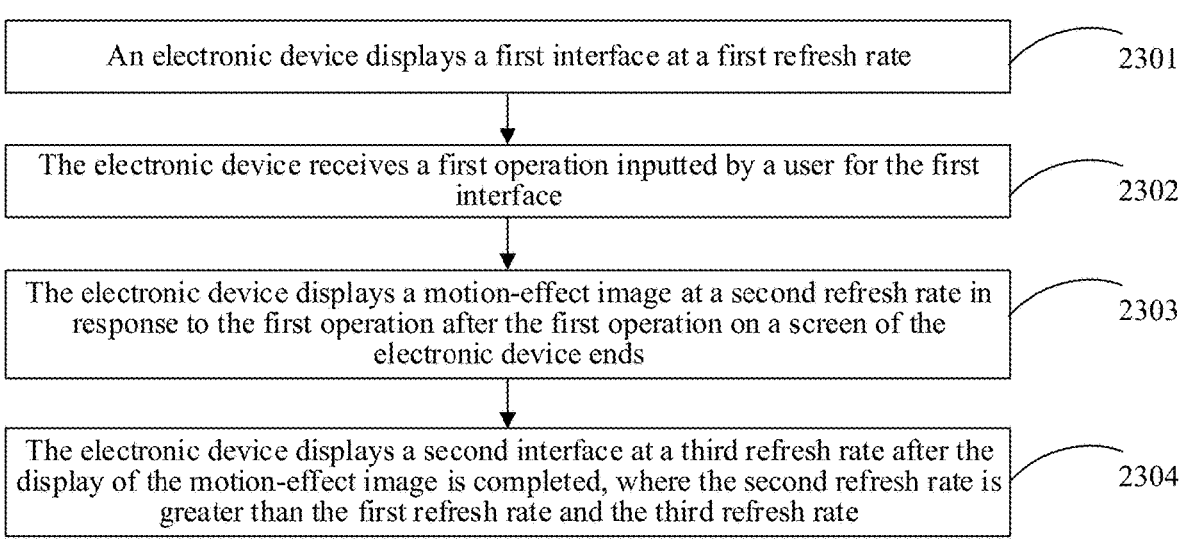

| | |
|---|---|
| An electronic device displays a first interface at a first refresh rate | 2301 |
| The electronic device receives a first operation inputted by a user for the first interface | 2302 |
| The electronic device displays a motion-effect image at a second refresh rate in response to the first operation after the first operation on a screen of the electronic device ends | 2303 |
| The electronic device displays a second interface at a third refresh rate after the display of the motion-effect image is completed, where the second refresh rate is greater than the first refresh rate and the third refresh rate | 2304 |

FIG. 23

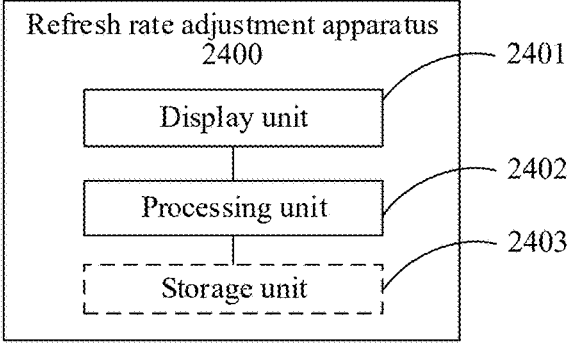

Refresh rate adjustment apparatus 2400

Display unit — 2401

Processing unit — 2402

Storage unit — 2403

FIG. 24

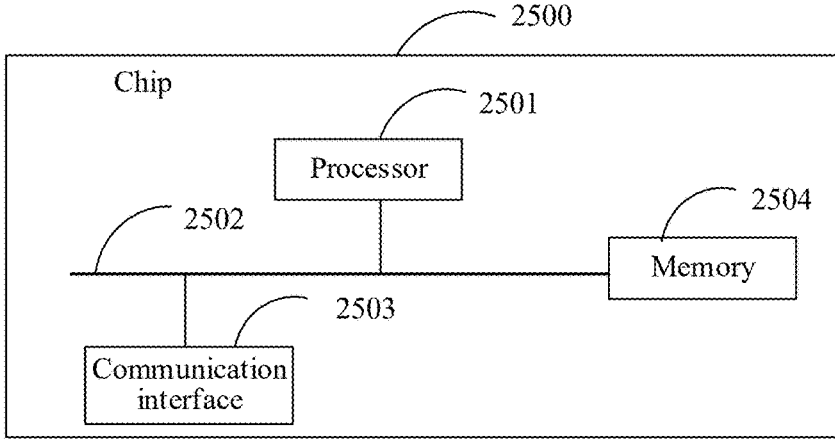

2500

Chip

Processor — 2501

2502

Memory — 2504

Communication interface — 2503

FIG. 25

REFRESH RATE ADJUSTMENT METHOD AND ELECTRONIC DEVICE

CROSS-REFERENCE TO RELATED APPLICATIONS

This application is a National Stage of International Application No. PCT/CN2023/131611, filed on Nov. 14, 2023, which claims priority to Chinese Patent Application No. 202310033877. X, filed on Jan. 10, 2023, both of which are hereby incorporated by reference in their entireties.

TECHNICAL FIELD

This application relates to the field of electronic technologies, and in particular, to a refresh rate adjustment method and an electronic device.

BACKGROUND

With continuous development of electronic technologies, some electronic devices can support high screen refresh rates such as 90 Hz, 120 Hz, or 144 Hz.

To balance fluency of a display image on an electronic device and power consumption of the electronic device, the electronic device locks some applications at a low refresh rate, while the other applications may be displayed at a high refresh rate.

However, in this refresh rate adjustment mode, when display of motion-effect images is triggered, problems such as jittering and smearing may occur on some motion-effect images.

SUMMARY

Embodiments of this application provide a refresh rate adjustment method and an electronic device, to display some motion-effect images at a second refresh rate that is greater than a first refresh rate and a third refresh rate, that is, to improve refresh rates of the motion-effect images, thereby improving display effects of the motion-effect images, and alleviating problems such as jittering and smearing of these motion-effect images.

According to a first aspect, an embodiment of this application provides a refresh rate adjustment method. The method is applied to an electronic device, and includes: displaying, by the electronic device, a first interface at a first refresh rate; receiving, by the electronic device, a first operation inputted by a user for the first interface; displaying, by the electronic device, a motion-effect image at a second refresh rate in response to the first operation after the first operation on a screen of the electronic device ends; and displaying, by the electronic device, a second interface at a third refresh rate after the display of the motion-effect image is completed, where the motion-effect image is an image displayed in a process in which the electronic device switches from the first interface to the second interface; and the second refresh rate is greater than the first refresh rate and the third refresh rate.

In this way, in this embodiment of this application, a refresh rate of a motion-effect image is adjusted based on specific content of the motion-effect image instead of using a white list. Some motion-effect images may be displayed at the second refresh rate greater than the first refresh rate and the third refresh rate, that is, refresh rates of the motion-effect images are improved, thereby improving display effects of the motion-effect images, and alleviating problems such as jittering and smearing of these motion-effect images, to improve use experience of the user.

In a possible implementation, the electronic device includes a target application. The first interface is a desktop of the electronic device, and the second interface is an interface displayed after the target application is started. Alternatively, the first interface is an interface of the target application, and the second interface is a desktop of the electronic device. In this way, in this embodiment of this application, the motion-effect image may be displayed at the second refresh rate greater than the first refresh rate and the third refresh rate in a start process or an exit process of the target application, thereby improving a display effect of the motion-effect image.

In a possible implementation, the electronic device includes a target application, the first operation is a slide operation on an interface of the target application, and the slide operation includes any one of a slide-up operation, a slide-down operation, a slide-left operation, and a slide-right operation. The first interface is an interface displayed by the target application before the slide operation, and the second interface is an interface displayed by the target application after the slide operation. In this way, in this embodiment of this application, the motion-effect image may be displayed at the second refresh rate greater than the first refresh rate and the third refresh rate in an interface slide scenario or a ViewPage switching scenario, thereby improving a display effect of the motion-effect image.

In a possible implementation, the electronic device includes a target application, and the target application is a Settings application. The first interface is a main setting interface of the Settings application, and the main setting interface includes a plurality of setting items. The first operation is a tap operation on a target setting item in the main setting interface, and the target setting item is any one of the plurality of setting items. The second interface is a setting interface corresponding to the target setting item. In this way, the motion-effect image is displayed at the second refresh rate greater than the first refresh rate and the third refresh rate in a window motion-effect scenario of the Settings application, thereby improving a display effect of the motion-effect image.

In a possible implementation, the electronic device includes a target application. The first interface is an interface including an input box in the target application, the first operation is a tap operation on the input box in the first interface, and the second interface is an interface including a touch keyboard. Alternatively, the first interface is an interface including a touch keyboard; and the second interface is an interface including an input box in the target application. In this way, the motion-effect image is displayed at the second refresh rate greater than the first refresh rate and the third refresh rate in an input method pop-up scenario or an input method hidden scenario, thereby improving a display effect of the motion-effect image.

In a possible implementation, the displaying, by the electronic device, a motion-effect image at a second refresh rate in response to the first operation includes: generating, by the electronic device in response to the first operation, motion-effect attribute information corresponding to the motion-effect image, where the motion-effect attribute information includes a motion-effect type and a motion-effect parameter; calculating, by the electronic device based on the motion-effect parameter when the motion-effect type is a translation motion-effect, a movement parameter corresponding to the motion-effect image; determining, by the electronic device, the second refresh rate based on the movement parameter; and displaying, by the electronic device, the motion-effect image at the second refresh rate, where the second refresh rate is greater than the first refresh rate and the third refresh rate when the movement parameter meets a preset condition. In this way, a refresh rate for displaying a motion-effect image whose motion-effect type is the translation motion-effect and whose movement parameter meets the preset condition can be increased, thereby alleviating problems such as jittering and smearing of the motion-effect image, and improving use experience of the user. However, refresh rates for displaying a motion-effect image whose motion-effect type is a transparency motion-effect, a color motion-effect, or a rotation motion-effect and a motion-effect image whose motion-effect type is the translation motion-effect but whose movement parameter does not meet the preset condition are not increased, to reduce power consumption caused when these motion-effect images are displayed at an unnecessarily high refresh rate, thereby reducing power consumption of the electronic device. Therefore, the second refresh rate of the motion-effect image is properly set based on the motion-effect attribute information, to balance the display effect of the motion-effect image and the power consumption of the electronic device.

In a possible implementation, when the motion-effect type is the translation motion-effect, the motion-effect parameter includes a motion-effect start position, a motion-effect end position, a motion-effect curve, and motion-effect duration. The calculating, by the electronic device based on the motion-effect parameter, a movement parameter corresponding to the motion-effect image includes: calculating, by the electronic device based on a distance between the motion-effect end position and the motion-effect start position, a movement distance corresponding to the motion-effect image; and when the movement distance is greater than a first preset distance, calculating, by the electronic device based on at least one of the motion-effect start position, the motion-effect end position, the motion-effect curve, and the motion-effect duration, a movement speed corresponding to the motion-effect image. In this way, the movement parameter corresponding to the motion-effect image is the movement speed corresponding to the motion-effect image, and the movement distance and the movement speed can be easily calculated based on the motion-effect parameter in the motion-effect attribute information.

In a possible implementation, the determining, by the electronic device, the second refresh rate based on the movement parameter includes: obtaining, by the electronic device, the corresponding second refresh rate based on a speed interval to which the movement speed belongs, where the electronic device includes a plurality of speed intervals and second refresh rates one-to-one corresponding to the speed intervals, and the second refresh rate is positively correlated with a speed value included in the speed interval. In this way, a higher movement speed indicates a higher corresponding second refresh rate, and a lower movement speed indicates a lower corresponding second refresh rate.

In a possible implementation, when the movement speed belongs to a preset speed interval, the movement parameter meets the preset condition; and the preset speed interval is at least a part of the plurality of speed intervals, and a speed value included in the preset speed interval is greater than a speed value included in a speed interval other than the preset speed interval in the plurality of speed intervals.

In a possible implementation, the motion-effect curve is a uniform motion-effect curve, movement speeds corresponding to the motion-effect image at different moments remain consistent, and second refresh rates corresponding to the motion-effect image at the different moments remain consistent. Alternatively, the motion-effect curve is a nonuniform motion-effect curve, movement speeds corresponding to the motion-effect image at different moments are inconsistent, and second refresh rates corresponding to the motion-effect image at the different moments change. In this way, the electronic device may select a corresponding motion-effect curve as required to properly set the second refresh rate for displaying the motion-effect image.

In a possible implementation, the nonuniform motion-effect curve includes at least a first stage curve and a second stage curve, the first stage curve is a motion-effect curve between a motion-effect start moment and a first target moment, and the second stage curve is a motion-effect curve after the first target moment. A slope of the nonuniform motion-effect curve represents a movement speed of the motion-effect image. A second refresh rate corresponding to the first stage curve is less than or equal to the first refresh rate, a second refresh rate corresponding to the second stage curve is greater than the first refresh rate, and the electronic device displays, at the second refresh rate less than or equal to the first refresh rate, the motion-effect image that appears before the first target moment. In this way, when the display of the motion-effect image is triggered, the motion-effect image is displayed at a low refresh rate in a time period between the motion-effect start moment and a refresh rate increase moment, thereby reducing the power consumption of the electronic device.

In a possible implementation, the nonuniform motion-effect curve includes at least a third stage curve and a fourth stage curve, the third stage curve is a motion-effect curve before a second target moment, and the fourth stage curve is a motion-effect curve between the second target moment and a motion-effect end moment. A slope of the nonuniform motion-effect curve represents a movement speed of the motion-effect image. A second refresh rate corresponding to the third stage curve is greater than the third refresh rate, a second refresh rate corresponding to the fourth stage curve is less than or equal to the third refresh rate, and the electronic device displays, at the second refresh rate less than or equal to the third refresh rate, the motion-effect image that appears after the second target moment. In this way, when the display of the motion-effect image is triggered, the motion-effect image is displayed at a low refresh rate in a time period after a refresh rate decrease moment, thereby reducing the power consumption of the electronic device.

In a possible implementation, the electronic device includes a focus application, a target manager, a motion-effect management module, and an image synthesizer, and the target manager includes a window manager or an input method manager. The generating, by the electronic device in response to the first operation, motion-effect attribute information corresponding to the motion-effect image includes: directly invoking or indirectly invoking through the target manager, by the focus application, the motion-effect management module in response to the first operation, to generate the motion-effect attribute information corresponding to the motion-effect image, and sending the motion-effect attribute information to the image synthesizer.

In a possible implementation, the calculating, by the electronic device based on the motion-effect parameter when the motion-effect type is a translation motion-effect, a movement parameter corresponding to the motion-effect image includes: calculating, by the image synthesizer based on the motion-effect parameter when determining that the motion-effect type in the motion-effect attribute information is the translation motion-effect, the movement parameter corresponding to the motion-effect image; and the determining, by the electronic device, the second refresh rate based on the movement parameter includes: determining, by the image synthesizer, the second refresh rate based on the movement parameter. In this way, in this embodiment of this application, a refresh rate decision process is performed by the image synthesizer.

In a possible implementation, the electronic device further includes a refresh rate control module. The method further includes: sending, by the refresh rate control module, a changed refresh rate interval to the image synthesizer when a refresh rate interval corresponding to the focus application changes, where the refresh rate interval is an interval from a minimum refresh rate to a maximum refresh rate, and the second refresh rate determined by the image synthesizer belongs to the refresh rate interval. In this way, the refresh rate control module may further determine the refresh rate interval corresponding to the focus application based on a current usage condition of the electronic device, such as whether the focus application is locked at a frame, a low brightness, a low temperature, or a low battery level, to properly set whether to display the motion-effect image at a high refresh rate.

In a possible implementation, the electronic device further includes a hardware composer, a display drive, a display driver chip, and a display screen. The displaying, by the electronic device, the motion-effect image at the second refresh rate includes: sending, by the image synthesizer through the display drive, a refresh rate switching instruction to the display driver chip; adjusting, by the display driver chip based on the refresh rate switching instruction, a frequency of a hardware Vsync signal to the second refresh rate; generating, by the image synthesizer through synchronization with the hardware Vsync signal, a first software Vsync signal and a second software Vsync signal whose frequencies are the second refresh rate, where the first software Vsync signal is used for triggering drawing and rendering to be performed on the motion-effect image at the second refresh rate, and the second software Vsync signal is used for triggering synthesis to be performed on a drawn and rendered motion-effect image at the second refresh rate; sending, by the image synthesizer, a synthesized motion-effect image to the hardware composer after synthesizing the motion-effect image; sending, by the hardware composer, the synthesized motion-effect image to the display driver chip through the display drive; and controlling, by the display driver chip, the display screen based on the hardware Vsync signal to display the synthesized motion-effect image.

According to a second aspect, an embodiment of this application further provides a refresh rate adjustment method. The method is applied to an electronic device, and includes: displaying, by the electronic device, a first interface at a first refresh rate; receiving, by the electronic device, a second operation inputted by a user for the first interface, where the second operation is a slide operation; displaying, by the electronic device, a motion-effect image at a second refresh rate in response to the second operation in a process in which the second operation is continuously performed on a screen of the electronic device; and displaying, by the electronic device, a second interface at a third refresh rate after the second operation on the screen of the electronic device ends. The motion-effect image is an image displayed by the electronic device through continuous slide based on the slide operation in the process in which the slide operation is continuously performed on the screen of the electronic device. A second slide speed corresponding to the slide operation is positively correlated with the second refresh rate. In other words, a higher second slide speed corresponds to a higher second refresh rate, and a lower second slide speed corresponds to a lower second refresh rate.

According to a third aspect, an embodiment of this application provides an electronic device, including a processor and a memory, where the memory is configured to store a computer program, and the processor is configured to invoke the computer program, to perform the refresh rate adjustment method above.

According to a fourth aspect, an embodiment of this application provides a computer-readable storage medium. The computer-readable storage medium stores a computer program or instructions, and the computer program or the instructions, when run, implement the refresh rate adjustment method above.

According to a fifth aspect, an embodiment of this application provides a computer program product, including a computer program, where the computer program, when run, causes a computer to perform the refresh rate adjustment method above.

Effects of the possible implementations of the third aspect to the fifth aspect are similar to the effects of the first aspect and the possible designs of the first aspect, and details are not described herein again.

BRIEF DESCRIPTION OF DRAWINGS

FIG. 23 is a flowchart of a refresh rate adjustment method according to an embodiment of this application;

FIG. 24 is a schematic structural diagram of a refresh rate adjustment apparatus according to an embodiment of this application; and FIG. 25 is a schematic structural diagram of a chip according to an embodiment of this application.

DESCRIPTION OF EMBODIMENTS

Figure 1:
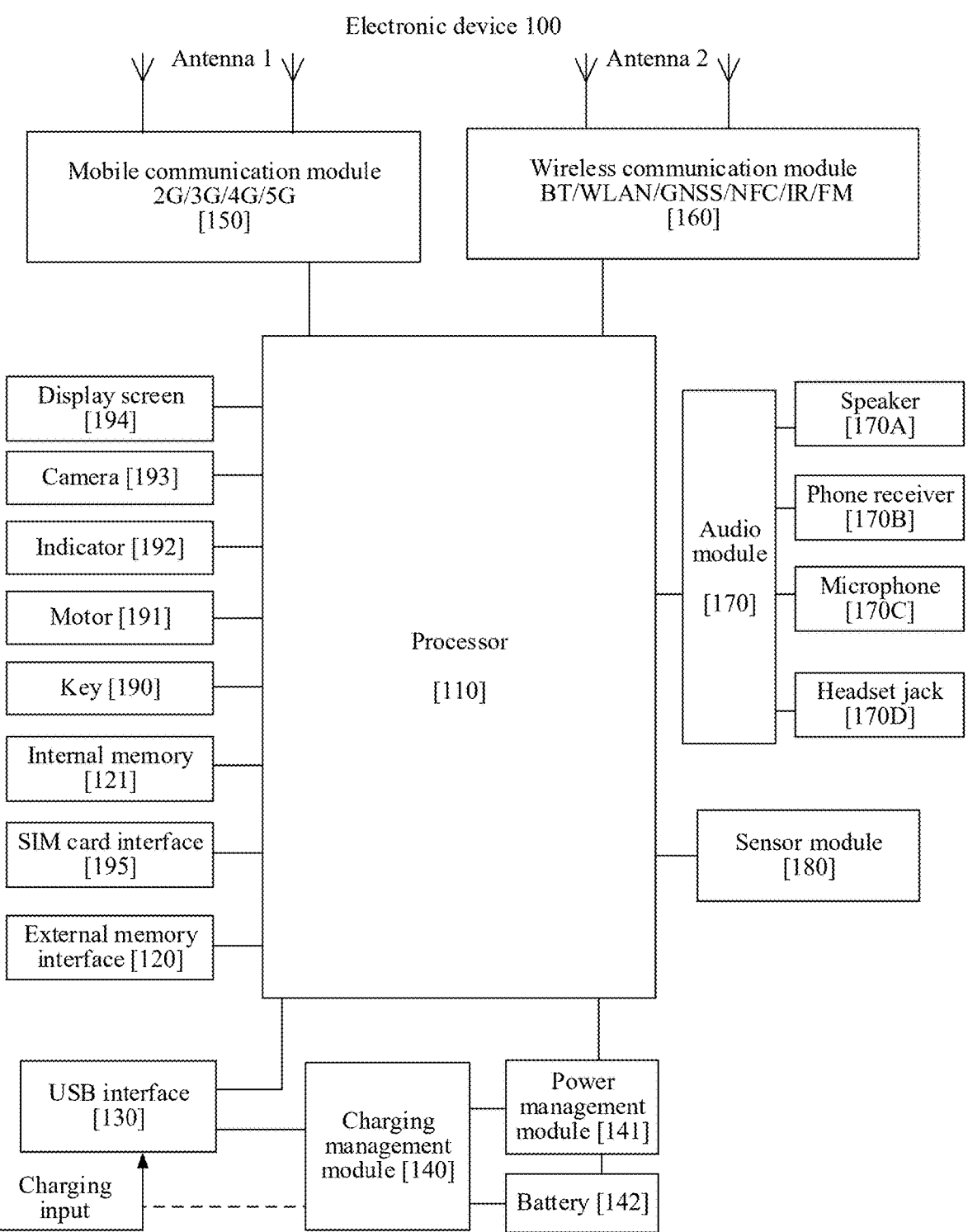
FIG. 1 is a schematic structural diagram of a hardware system of an electronic device according to an embodiment of this application.

For ease of describing technical solutions in embodiments of this application clearly, in embodiments of this application, words such as "first" and "second" are used to distinguish same or similar items with a basically same function and role. For example, a first chip and a second chip are merely used to distinguish different chips, and are not intended to limit a sequence thereof. A person skilled in the art may understand that the words such as "first" and "second" do not limit a quantity and an execution order, and do not indicate a definite difference either.

It should be noted that in embodiments of this application, terms such as "exemplary" and "for example" are used to represent giving an example, an illustration or a description. Any embodiment or design scheme described as "exemplary" or "for example" in this application should not be explained as being more preferred or having more advantages than another embodiment or design scheme. In particular, the terms such as "exemplary" and "for example" as used herein are intended to present related concepts in a specific manner.

In embodiments of this application, "at least one" refers to one or more, and "a plurality of" refers to two or more. The term "and/or" describes an association relationship between associated objects and represents that three relationships may exist. For example, A and/or B may represent: only A exists, both A and B exist, and only B exists, where A and B may be singular or plural. The character "/" generally indicates an "or" relationship between associated objects. The term "at least one of the following items" or a similar expression means any combination of these items, including a single item (piece) or any combination of a plurality of items (pieces). For example, at least one of a, b, or c may represent: a, b, c, a-b, a-c, b-c, or a-b-c, where a, b, and c may be singular or plural.

With continuous development of electronic technologies, performance requirements of users on electronic devices are increasingly higher. To improve visual viewing effects of the users, more electronic devices can support higher screen refresh rates such as 90 Hz, 120 Hz, or 144 Hz.

When an electronic device displays an image at a high refresh rate, fluency of the image can be improved, thereby improving a visual viewing effect of a user.

However, when applications in the electronic device all display an image at a high refresh rate, a quantity of times that the electronic device performs image drawing, rendering, and synthesis per unit time (for example, 1 s) increases, resulting in a large increase in power consumption of the electronic device.

In the related art, a visual viewing effect of a user and power consumption may be balanced by using a white list, to add a part of applications to the white list, and the other part of applications are not added to the white list. When an application in the white list runs, an image may be displayed at a high refresh rate (for example, 90 Hz or 120 Hz). When an application that is not in the white list runs, an image is displayed at a low refresh rate (for example, 60 Hz) that is fixed.

However, during running of the application that is not in the white list, if a user taps, slides, or performs another operation on an interface in which the application is currently running, to trigger display of a motion-effect image, the electronic device still displays the motion-effect image at a low refresh rate. Consequently, problems such as jittering and smearing occur on display of some motion-effect images, affecting use experience of the user.

During running of the application in the white list, if the user performs a tap or slide operation on an interface in which the application is currently running, regardless of a motion-effect type of a motion-effect image triggered by the tap or slide operation, the electronic device still displays the motion-effect image at a high refresh rate. However, in an actual use process, display, at a high refresh rate, of some motion-effect images triggered by the tap or slide operation has little meaning for improving the use experience of the user. Therefore, these motion-effect images triggered by the tap or slide operation are displayed at an unnecessarily high refresh rate, resulting in an increase in the power consumption of the electronic device.

It should be noted that the foregoing white list may be customized by a manufacturer of the electronic device, and a plurality of refresh rate setting options such as a high-level refresh rate option, a medium-level refresh rate option, a standard-level refresh rate option, and an intelligent refresh rate option are displayed on an interface of the electronic device. For example, when the electronic device receives a trigger operation of the user on the high-level refresh rate option, interfaces of all applications in the electronic device are displayed at a refresh rate of 120 Hz. When the electronic device receives a trigger operation of the user on the medium-level refresh rate option, interfaces of all applications in the electronic device are displayed at a refresh rate of 90 Hz. When the electronic device receives a trigger operation of the user on the standard-level refresh rate option, interfaces of all applications in the electronic device are displayed at a refresh rate of 60 Hz. When the electronic device receives a trigger operation of the user on the intelligent refresh rate option, the application of the electronic device in the white list may be displayed at a high refresh rate, while the application that is not in the white list is displayed at a low refresh rate. When the electronic device is at delivery, the electronic device selects the intelligent refresh rate option by default.

In view of this, embodiments of this application provide a refresh rate adjustment method. In the method, a first interface is displayed at a first refresh rate. After a first operation inputted by a user for the first interface is received, and the first operation on a screen of an electronic device ends, a motion-effect image is displayed at a second refresh rate in response to the first operation. A second interface is displayed at a third refresh rate after the display of the motion-effect image is completed. The motion-effect image is an image displayed in a process in which the electronic device switches from the first interface to the second interface, and the second refresh rate is greater than the first refresh rate and the third refresh rate. In this way, in embodiments of this application, some motion-effect images may be displayed at the second refresh rate greater than the first refresh rate and the third refresh rate, that is, refresh rates of the motion-effect images are improved, thereby improving display effects of the motion-effect images, and alleviating problems such as jittering and smearing of these motion-effect images, to improve use experience of the user.

Specifically, in embodiments of this application, a refresh rate of a motion-effect image is adjusted based on specific content of the motion-effect image instead of using a white list. A refresh rate for displaying a motion-effect image whose motion-effect type is a translation motion-effect and whose movement parameter meets a preset condition can be increased, thereby alleviating problems such as jittering and smearing of the motion-effect image, and improving the use experience of the user. However, refresh rates for displaying a motion-effect image whose motion-effect type is a transparency motion-effect, a color motion-effect, or a rotation motion-effect and a motion-effect image whose motion-effect type is the translation motion-effect but whose movement parameter does not meet the preset condition are not increased, to reduce power consumption caused when these motion-effect images are displayed at an unnecessarily high refresh rate, thereby reducing power consumption of the electronic device.

In conclusion, based on the refresh rate adjustment method in embodiments of this application, the refresh rate of the motion-effect image can be adjusted based on motion-effect attribute information corresponding to the motion-effect image, to balance a visual viewing effect of the user and the power consumption.

It may be understood that the solution in embodiments of this application is applicable to adjustment of a screen refresh rate in a motion-effect scenario. The motion-effect scenario is a scenario in which an interface displayed on a display screen of an electronic device changes, to be specific, the process in which the electronic device switches from the first interface to the second interface is the motion-effect scenario in embodiments of this application, and the motion-effect image is the image displayed in the process in which the electronic device switches from the first interface to the second interface. That is, the electronic device may adjust the screen refresh rate when the interface of the display screen of the electronic device changes.

For example, the electronic device performs refresh at the first refresh rate (for example, 60 Hz) when displaying the first interface. The electronic device performs refresh at the third refresh rate (for example, 60 Hz) when switching from the first interface to the second interface. The electronic device may perform refresh at the second refresh rate when displaying the motion-effect image that is in the process of switching from the first interface to the second interface. Specifically, the second refresh rate is greater than the first refresh rate and the third refresh rate when the motion-effect type of the motion-effect image is the translation motion-effect and the movement parameter corresponding to the motion-effect image meets the preset condition. For example, the second refresh rate may be 90 Hz or 120 Hz.

The refresh rate adjustment method provided in embodiments of this application may be applied to an electronic device having a display function. The electronic device may also be referred to as a terminal (terminal), user equipment (user equipment, UE), a mobile station (mobile station, MS), a mobile terminal (mobile terminal, MT), or the like. The electronic device may be a mobile phone (mobile phone), a smart television, a wearable device, a tablet computer (Pad), a computer having a wireless transceiver function, a virtual reality (virtual reality, VR) electronic device, an augmented reality (augmented reality, AR) electronic device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. Embodiments of this application impose no limitation on a specific technology and a specific device form used by the electronic device.

To better understand embodiments of this application, the following describes a structure of the electronic device in embodiments of this application.

FIG. 1 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure illustrated in embodiments of this application does not constitute a specific limitation on the electronic device 100. In some other embodiments of this application, the electronic device 100 may include more or fewer components than those shown in the figure, some components may be combined, some components may be split, or different component arrangement may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time-sequence signal, and control obtaining and executing of instructions.

A memory may be further disposed in the processor 110, and is configured to store instructions and data. In some embodiments, the memory in the processor 110 is a cache memory. The memory may store instructions or data recently used or cyclically used by the processor 110. If the processor 110 needs to use the instructions or the data again, the processor 110 may invoke the instructions or the data from the memory. This avoids repeated access, and reduces waiting time of the processor 110, thereby improving system efficiency.

The charging management module 140 is configured to receive a charging input from a charger. The charger may be a wireless charger or a wired charger. While the charging management module 140 charges the battery 142, the power management module 141 may also supply power to the electronic device. The power management module 141 is configured to be connected to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like.

A wireless communication function of the electronic device 100 may be implemented via the antenna 1, the antenna 2, the mobile communication module 150, the wireless communication module 160, the modem processor, the baseband processor, and the like.

The antenna 1 and the antenna 2 are configured to transmit and receive an electromagnetic wave signal. The mobile communication module 150 may provide a solution to wireless communication such as 2G/3G/4G/5G that is applicable to the electronic device 100. The wireless communication module 160 may provide a solution to wireless communication such as wireless local area networks (wireless local area networks, WLANs) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and infrared (infrared, IR) that is applicable to the electronic device 100.

The electronic device 100 implements a display function through the GPU, the display screen 194, the application processor, and the like. The GPU is a microprocessor for image processing, and connects the display screen 194 and the application processor. The GPU is configured to perform mathematical and geometric calculation, and is used for render graphics. The processor 110 may include one or more GPUs that execute program instructions to generate or change display information.

The display screen 194 is configured to display an image, display a video, receive a slide operation, and so on. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or more display screens 194.

The electronic device 100 may implement a photographing function through the ISP, the camera 193, the video codec, the GPU, the display screen 194, the application processor, and the like.

The ISP is configured to process data fed back by the camera 193. For example, during photographing, a shutter is switched on, light is transferred to a camera photosensitive element through a lens, an optical signal is converted into an electrical signal, and the camera photosensitive element transfers the electrical signal to the ISP for processing, to convert the electrical signal into an image visible to naked eyes. The ISP may also optimize noise point, brightness, and skin tone algorithms for an image. The ISP may also optimize parameters such as exposure and a color temperature of a photographed scene. In some embodiments, the ISP may be arranged in the camera 193.

The camera 193 is configured to capture a still image or a video. An optical image is generated for an object through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard RGB or YUV format. In some embodiments, the electronic device 100 may include one or more cameras 193.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)-1, MPEG-2, MPEG-3, and MPEG-4.

The external memory interface 120 may be configured to be connected to an external storage card, for example, a micro-SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code, where the executable program code includes instructions. The internal memory 121 may include a program storage area and a data storage area. The program storage area may store an operating system, an application required by at least one function (such as a voice playing function and an image playing function), and the like. The data storage area may store data (for example, audio data and an address book) and the like created when the electronic device 100 is used. In addition, the internal memory 121 may include a high-speed random access memory, and may further include a non-volatile memory, for example, at least one disk storage device, a flash memory device, or a universal flash storage (universal flash storage, UFS). The processor 110 runs the instructions stored in the internal memory 121 and/or the instructions stored in the memory disposed in the processor, to perform various function applications and data processing of the electronic device 100.

The electronic device 100 may implement an audio function such as music playing or recording through the audio module 170, the speaker 170A, the phone receiver 170B, the microphone 170C, the headset jack 170D, the application processor, and the like.

The touch sensor is also referred to as a "touch component". The touch sensor may be disposed on the display screen 194. The touch sensor and the display screen 194 form a touchscreen, which is also referred to as a "touch control screen". The touch sensor is configured to detect a touch operation performed on or near the touch sensor. The touch sensor may transfer the detected touch operation to the application processor to determine a touch event type, and may provide a visual output related to the touch operation through the display screen 194. In some other embodiments, the touch sensor may alternatively be disposed on a surface of the electronic device 100, and is located at a position different from that of the display screen 194.

The key 190 includes a power key, a volume key, and the like. The electronic device 100 may receive a key input, and generate a key signal input related to user setting and function control of the electronic device 100. The motor 191 may generate a vibration prompt. The motor 191 may be used for an incoming call vibration prompt and a touch vibration feedback. The indicator 192 may be an indicator light that may be configured to indicate a charging status and a power change, or may be configured to indicate a message, a missed call, a notification, and the like. The SIM card interface 195 is configured to be connected to a SIM card. The SIM card may be inserted into the SIM card interface 195 or plugged from the SIM card interface 195, to come into contact with or be separated from the electronic device 100.

A software system of the electronic device 100 may be in a hierarchical architecture, an event-driven architecture, a micro-kernel architecture, a micro-service architecture, a cloud architecture, or the like. An Android system in a hierarchical architecture is used as an example in embodiments of this application to describe the software structure of the electronic device 100.

Figure 2:
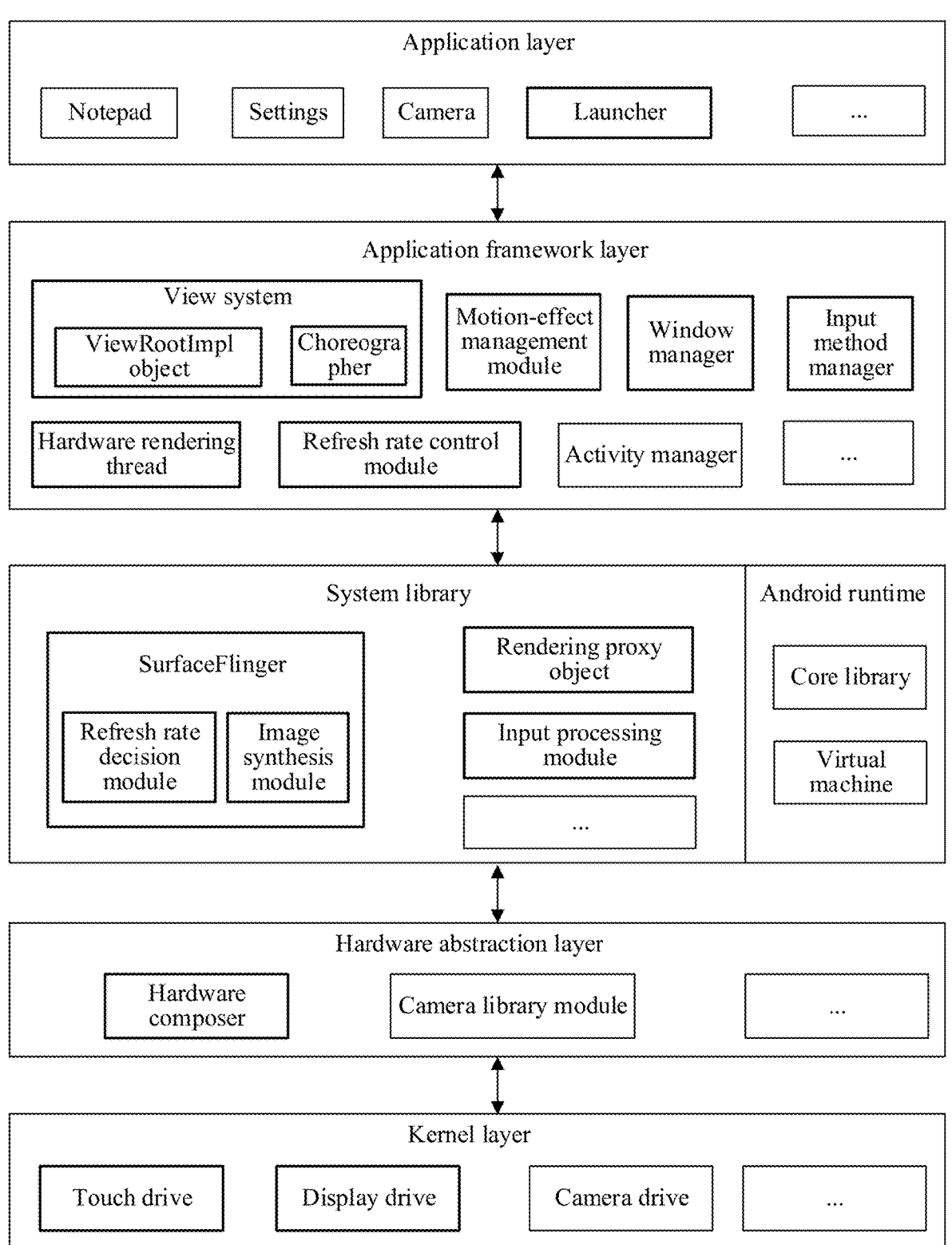
FIG. 2 is a schematic structural diagram of a software system of an electronic device according to an embodiment of this application.

FIG. 2 is a block diagram of the software structure of the electronic device 100 according to an embodiment of this application.

In the hierarchical architecture, software is divided into several layers, and each layer has a clear role and task. The layers communicate with each other through a software interface. In some embodiments, the Android system is divided into five layers, namely, an application layer, an application framework layer, Android runtime (Android runtime) and a system library, a hardware abstraction layer, and a kernel layer from top to bottom.

The application layer may include a series of application packages. As shown in FIG. 2, the application packages may include applications such as Notepad, Settings, Camera, and a launcher (launcher). The launcher is configured to manage a system desktop, for example, start or stop the system desktop. The launcher may also be referred to as a desktop application.

The application framework layer provides an application programming interface (application programming interface, API) and a programming framework for the applications at the application layer. The application framework layer includes some predefined functions.

As shown in FIG. 2, the application framework layer may include a view system, a motion-effect management module, a window manager, an input method manager, a hardware rendering thread, a refresh rate control module, an activity manager, and the like.

The view system includes visible controls such as a control for displaying a text and a control for display a picture. The view system may be configured to construct an application. A display interface may include one or more views. For example, a display interface including an SMS notification icon may include a view for displaying a text and a view for displaying a picture.

The view system may include a ViewRootImpl object (root view object). The ViewRootImpl object is neither a child class of a view (view) nor a parent class of the view, but may be understood as a manager of a view tree. The ViewRootImpl object is configured to read an original input event in a BatchQueue (batch queue), and traverse, based on information (such as a spot location) about the original input event, a view tree corresponding to a focus application, to determine a view control triggered by the original input event.

The view system further includes a choreographer (Choreographer). The choreographer is a class in an operating system, and is a class responsible for obtaining a vertical synchronization (vertical synchronization, Vsync) signal and controlling a user interface (user interface, UI) thread to complete image drawing. A class is a data structure configured to define a status and a behavior of an object.

When an application needs to refresh an interface or a view, the choreographer requests a first software Vsync signal from a SurfaceFlinger (an image synthesizer) to seek an appropriate occasion for a drawing operation.

The motion-effect management module (Animator Manager) is configured to manage an animator instance. The focus application, the window manager, the input method manager, or the like may invoke the motion-effect management module to generate motion-effect attribute information corresponding to a motion-effect image.

The motion-effect attribute information may also be referred to as animator data. The motion-effect attribute information includes a view object, a motion-effect type, and a motion-effect parameter. The motion-effect parameter may include motion-effect start information, motion-effect end information, an interpotator (interpolator), and motion-effect duration.

The view object is a view for execution of a motion-effect image, and includes coordinates of upper, lower, left, and right corners. The motion-effect type may include a translation motion-effect, a transparency motion-effect, a color motion-effect, a rotation motion-effect, and the like.

When the motion-effect type is the translation motion-effect, the motion-effect start information is a motion-effect start position, and the motion-effect end information is a motion-effect end position. When the motion-effect type is the transparency motion-effect, the motion-effect start information is transparency at the start of the motion-effect image, and the motion-effect end information is transparency at the end of the motion-effect image. When the motion-effect type is the color motion-effect, the motion-effect start information is a color at the start of the motion-effect image, and the motion-effect end information is a color at the end of the motion-effect image. When the motion-effect type is the rotation motion-effect, the motion-effect start information is a rotation angle at the start of the motion-effect image, and the motion-effect end information is a rotation angle at the end of the motion-effect image.

The interpolator may also be referred to as a motion-effect curve, and represents a status change curve from a motion-effect start moment to a motion-effect end moment. Using an example in which the motion-effect type is the translation motion-effect, a slope of the motion-effect curve indicates a movement speed corresponding to the motion-effect image.

The window manager (window manager service, WMS) is configured to manage a window application. The window manager may obtain a size of the display screen, determine whether there is a status bar, perform screen locking, take a screenshot, and so on. In some embodiments, when a window motion-effect scenario is triggered, the window manager may invoke the motion-effect management module to generate the motion-effect attribute information corresponding to the motion-effect image, and send the motion-effect attribute information to the image synthesizer.

The input method manager (input manager service, IMS) is configured to provide an input method management service, to manage a plurality of input methods in the electronic device 100 and interact with another system service, for example, is configured to trigger on, off, or switching of an input method. In some embodiments, when an input method pop-up or hidden motion-effect is triggered, the input method manager may invoke the motion-effect management module to generate the motion-effect attribute information corresponding to the motion-effect image, and send the motion-effect attribute information to the image synthesizer.

The hardware rendering thread (HardwareRender) is an entrance for entire hardware to accelerate rendering. After image drawing, the focus application invokes the hardware rendering thread to send a rendering instruction to a rendering proxy object (RenderProxy).

The refresh rate control module is configured to determine, based on a current usage condition of the electronic device, such as whether the focus application is locked at a frame (that is, whether the focus application is locked at a low refresh rate), a low brightness, a low temperature, or a low battery level, a refresh rate interval corresponding to the focus application. The refresh rate interval is an interval from a minimum refresh rate to a maximum refresh rate. After the refresh rate interval corresponding to the focus application changes, the refresh rate control module sends a changed refresh rate interval to the image synthesizer, so that the image synthesizer selects an appropriate second refresh rate based on the refresh rate interval sent by the refresh rate control module. For example, if the minimum refresh rate in the refresh rate interval corresponding to the focus application is 60 Hz, and the maximum refresh rate is 90 Hz, the second refresh rate corresponding to the motion-effect image is between 60 Hz and 90 Hz, and there is no case in which the second refresh rate is less than 60 Hz or greater than 90 Hz.

The activity manager (AMS) is configured to manage a lifecycle of each application and a navigation fallback function, and is responsible for main thread creation for Android and maintenance of the lifecycle of each application.

The Android runtime includes a core library and a virtual machine. The Android runtime is responsible for scheduling and managing the Android system.

The core library includes two parts: a performance function that the Java language needs to invoke and a core library of Android.

The application layer and the application framework layer run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of functional modules, for example, the image synthesizer (Surface-Flinger), the rendering proxy object, and an input processing module.

The image synthesizer may include an image synthesis module. The image synthesis module may be configured to send a refresh rate switching instruction to a display driver chip through a display drive, and generate, through synchronization with the hardware Vsync signal of the display driver chip, a first software Vsync signal and a second software Vsync signal whose frequencies are the second refresh rate. Each time the second software Vsync signal arrives, the image synthesis module may further obtain, in sequence from a second buffer queue corresponding to the image synthesizer, one frame of image that is drawn and rendered, and then perform image synthesis.

In this embodiment of this application, a refresh rate decision module may be further added to the image synthesizer. The refresh rate decision module is configured to receive the motion-effect attribute information corresponding to the motion-effect image; calculate, based on the motion-effect parameter in the motion-effect attribute information when determining that the motion-effect type in the motion-effect attribute information is the translation motion-effect, a movement parameter corresponding to the motion-effect image; and determine the second refresh rate of the motion-effect image based on the movement parameter.

The rendering proxy object is configured to invoke the GPU to render a drawn image after receiving the rendering instruction sent by the hardware rendering thread.

The input processing module may implement mouse, keyboard, and touch input processing, and the like. The input processing module may include an input event reading thread (InputReader), an input event dispatch process (InputDispatcher), an input event sending thread (InputPublisher), and an input event receiving thread (InputConsumer).

The InputReader is configured to read the original input event. The InputDispatcher is configured to: determine the focus application based on the information (including an operation type, the spot location, and the like) about the original input event and a current focus, and dispatch the original input event to the InputPublisher corresponding to the focus application. The InputConsumer corresponding to the focus application receives the original input event in the InputPublisher through a socket (socket), and stores the original input event in the BatchQueue.

The hardware abstraction layer may include a plurality of library modules. The library module may be, for example, a hardware composer (hwcomposer, HWC) and a camera library module. The Android system may load a corresponding library module for device hardware, thereby enabling the application framework layer to access the device hardware. The device hardware may include, for example, the display screen and a camera in the electronic device.

The kernel layer is a layer between hardware and software. The kernel layer includes at least a touch panel (touch panel, TP) drive, a display drive, a camera drive, and the like.

The hardware may be a touch panel, the display screen, a display driver chip (display driver integrated circuit, DDIC), a camera component, a sensor component, or the like.

The following describes an example of working processes of the software and the hardware of the electronic device with reference to a scenario in which interface switching occurs on the electronic device.

The kernel layer processes a touch operation into an original input event (including information such as touch coordinates, touch strength, and a timestamp of the touch operation) when the touch sensor in the touch panel receives the touch operation. The original input event is stored at the kernel layer. The InputReader in the input processing module may read the original input event from the kernel layer, and the InputDispatcher in the input processing module is configured to: determine a focus application based on information (including an operation type, a spot location, and the like) about the original input event and a current focus, and dispatch the original input event to an InputPublisher corresponding to the focus application. An InputConsumer corresponding to the focus application receives the original input event in the InputPublisher through a socket (socket), and stores the original input event in the BatchQueue. The ViewRootImpl object reads the original input event in the BatchQueue, and traverses, based on the information (such as the spot location) about the input event, a view tree corresponding to the focus application, to determine a view control triggered by the input event. The focus application invokes the ViewRootImpl object to obtain the view control corresponding to the original input event. The focus may be a touch point of the touch operation or a click position of a mouse click operation. The focus application is an application running in foreground of the electronic device or an application corresponding to a touch position of the touch operation.

Using a scenario in which the touch operation is a tap operation and a control corresponding to the tap operation is a Notepad application icon to start a Notepad application as an example, the Notepad application draws a motion-effect image, and invokes the hardware rendering thread to send a rendering instruction to the rendering proxy object. The rendering proxy object invokes, based on the rendering instruction, the GPU to render a drawn motion-effect image. The image synthesis module in the image synthesizer synthesizes a drawn and rendered motion-effect image. A synthesized motion-effect image is sent to the display driver chip via the hardware composer and the display drive. The display driver chip controls the display screen to display the motion-effect image that appears in a start process of the Notepad application.

For ease of understanding, some concepts related to embodiments of this application are exemplified for reference.

1. Frame: is a single image of a minimum unit displayed in an interface. One frame may be understood as one still image, and a plurality of connected frames are quickly and successively displayed to form a movement illusion of an object. A frame rate is a quantity of frames of images that are refreshed in one second, and may also be understood as a quantity of times that an image processor in an electronic device refreshes an image per second. A more fluent and more realistic animation can be obtained at a high frame rate. A larger quantity of frames per second indicates a more fluent action that is displayed.

It should be noted that processes such as drawing, rendering, and synthesis usually need to be performed before a frame is displayed in the interface.

2. Frame drawing: is image drawing for interface display. A display interface may include one or more views. Each view may be drawn by a visible control of a view system. Each view includes subviews. One subview corresponds to one widget in the view. For example, one subview corresponds to one symbol in a picture view.

3. Frame rendering: is to perform a coloring operation on, add a 3D effect to, or perform another operation on a drawn view. For example, the 3D effect may be a light effect, a shadow effect, or a texture effect.

4. Frame synthesis: is a process of synthesizing a plurality of the foregoing one or more rendered views into the display interface.

It should be noted that to improve display fluency and reduce phenomena such as display lag, the electronic device generally performs displaying based on a Vsync signal, to synchronize processes such as drawing, rendering, and synthesis of an image and screen refresh for display. A person skilled in the art should understand that, the Vsync signal is a periodic signal, and a period of the Vsync signal may be set based on a refresh rate of a display screen. For example, when the refresh rate of the display screen is 60 Hz, the period of the Vsync signal may be 16.6 ms. That is, the electronic device generates one control signal every 16.6 ms to periodically trigger the Vsync signal.

In addition, it should be noted that, Vsync signals may be classified into a software Vsync signal and a hardware Vsync signal. The software Vsync signal includes a first software Vsync signal (namely, a Vsync-APP signal) and a second software Vsync signal (namely, a Vsync-SF signal). The first software Vsync signal is used for triggering drawing and rendering procedures, the second software Vsync signal is used for triggering a synthesis procedure, and the hardware Vsync signal is used for triggering a screen display refresh procedure.

Generally, periods of the first software Vsync signal, the second software Vsync signal, and the hardware Vsync signal remain synchronized. Using a change from 90 Hz to 60 Hz as an example, if a frequency of the hardware Vsync signal is switched from 90 Hz to 60 Hz, frequencies of the first software Vsync signal and the second software Vsync signal synchronously change from 90 Hz to 60 Hz.

In some scenarios, a motion-effect scenario may be an application start scenario, an application exit scenario, an interface slide scenario, a ViewPage (view page) switching scenario, a window motion-effect scenario, an input method pop-up scenario, an input method hidden scenario, and the like.

The following uses an example in which the electronic device is a mobile phone to exemplify the motion-effect scenario in embodiments of this application. It should be understood that scenarios described in the following embodiments are merely some examples in embodiments of this application, and do not constitute a limitation on this application. Other motion-effect scenarios applicable to screen refresh rate switching shall also fall within the protection scope of embodiments of this application.

An example in which a target application is a Notepad application and the motion-effect scenario is a Notepad application start scenario is used. For example, as shown in (a) in FIG. 3, icons of a plurality of installed applications such as Files, Email, Weather, Calculator, Clock, Recorder, Notepad, and Settings are displayed on a desktop 301 of an electronic device.

A user may perform a touch operation on the icon of the Notepad application displayed on the desktop 301. The touch operation may be referred to as a first operation. For example, the first operation in this case may be a tap operation. The electronic device receives the touch operation of the user on the icon of the Notepad application displayed on the desktop 301. The electronic device may display an interface 302 shown in (b) in FIG. 3 in response to the touch operation after the touch operation on a screen (which may also be referred to as a display screen) of the electronic device ends. The interface 302 is an interface after the Notepad application is started, for example, a note list interface in the Notepad application. The interface 302 includes a note search box, four established notes, establishment time thereof, and the like. The four established notes are a note 1, a note 2, a note 3, and a note 4 respectively.

In the start scenario of the Notepad application, to bring better use experience to the user, the electronic device displays a motion-effect image in a start phase of the application. The motion-effect image in a start process of the Notepad application is an image displayed in a process of switching from the desktop 301 to the interface 302 after the user performs the touch operation on the icon of the Notepad application and a finger of the user leaves the screen of the electronic device. In the start scenario of the Notepad application, the desktop 301 of the electronic device may be referred to as a first interface, and the interface 302 after the Notepad application is started may be referred to as a second interface.

It should be noted that the motion-effect image is displayed within fixed duration, for example, 400 ms or 500 ms. A motion-effect scenario means successively displaying a plurality of frames of motion-effect images within the fixed duration. Using the foregoing start scenario of the Notepad application as an example, the plurality of frames of motion-effect images that are successively displayed actually represent a process in which an image in the interface 302 changes from small to large. Specifically, when the user taps the icon of the Notepad application on the desktop 301, a start motion-effect starts, and the image displayed in the interface 302 starts to be displayed. When the image displayed in the interface 302 covers the entire display screen, the start motion-effect ends.

Figures 4A, 4B, 4C:
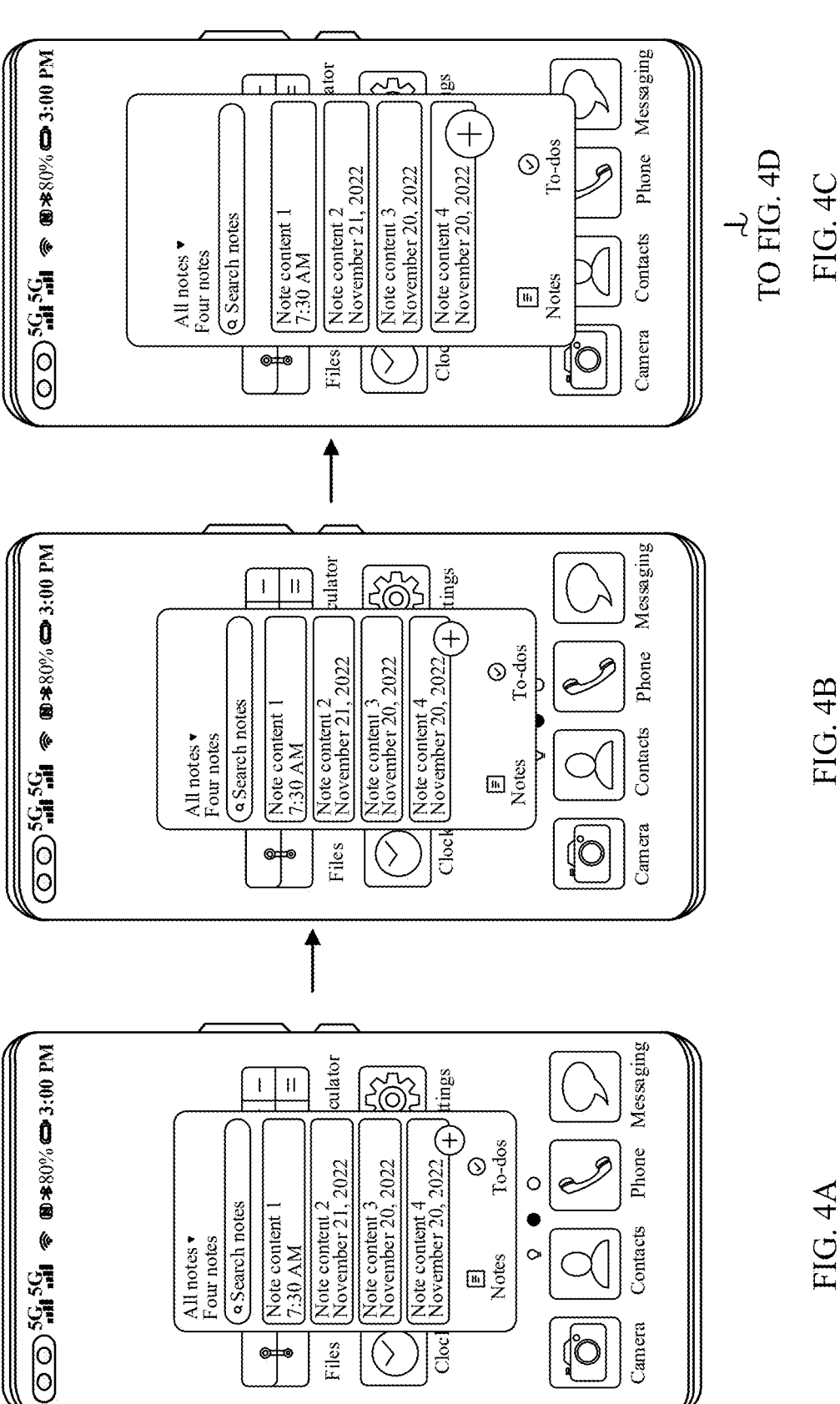
FIG. 4A to FIG. 4F are a schematic diagram of a motion-effect image in an application start scenario according to an embodiment of this application.
Figures 4D, 4E, 4F:
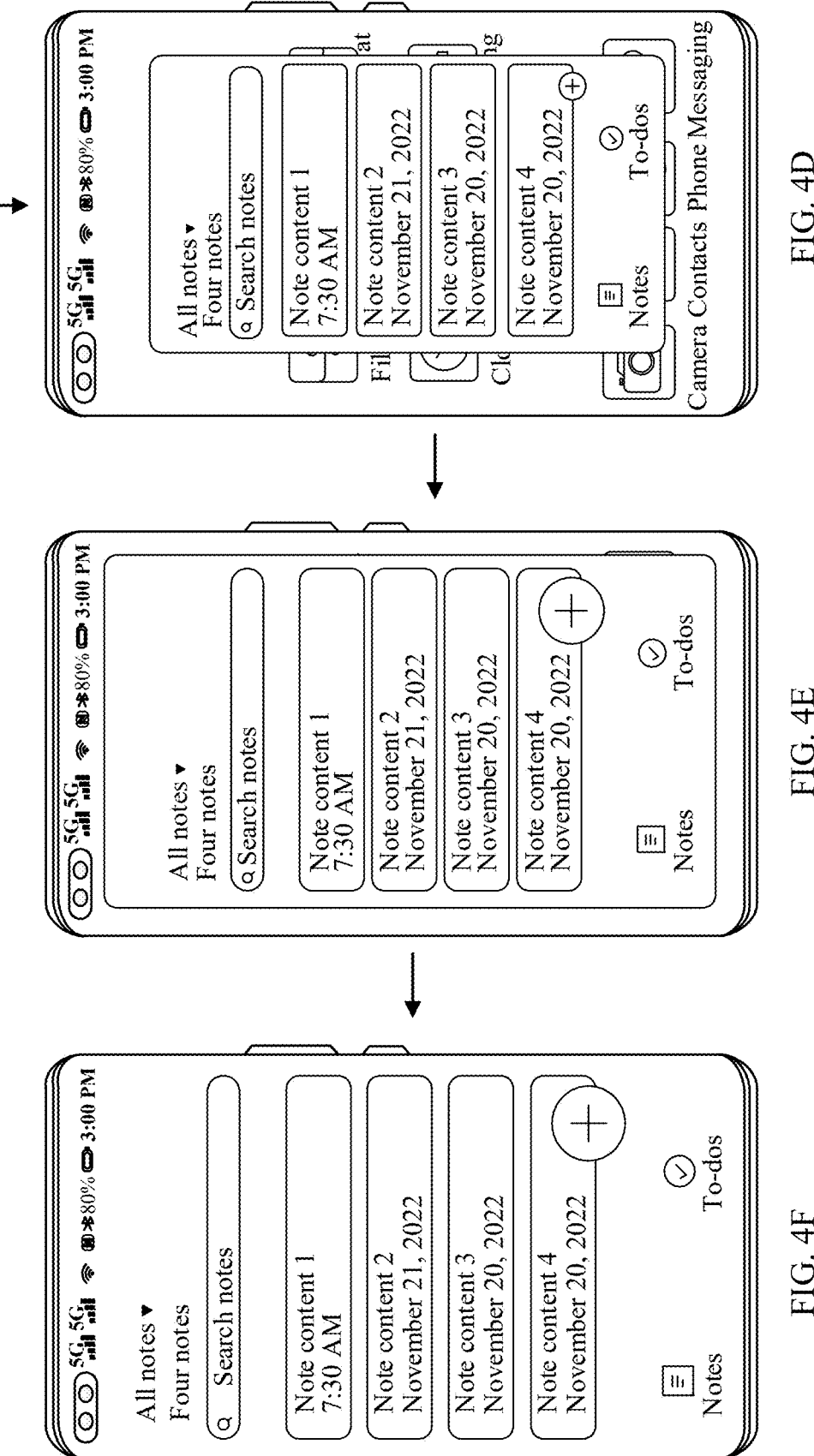

For example, the electronic device successively displays six frames of motion-effect images in the start process of the Notepad application. After the user taps the icon of the Notepad application displayed on the desktop 301 and the finger of the user leaves the screen of the electronic device, the electronic device starts to sequentially display the first frame of motion-effect image shown in FIG. 4A, the second frame of motion-effect image shown in FIG. 4B, the third frame of motion-effect image shown in FIG. 4C, the fourth frame of motion-effect image shown in FIG. 4D, the fifth frame of motion-effect image shown in FIG. 4E, and the sixth frame of motion-effect image shown in FIG. 4F. In addition, the image in the interface 302 displayed through the first frame of motion-effect image to the sixth frame of motion-effect image changes from small to large.

Figure 5:
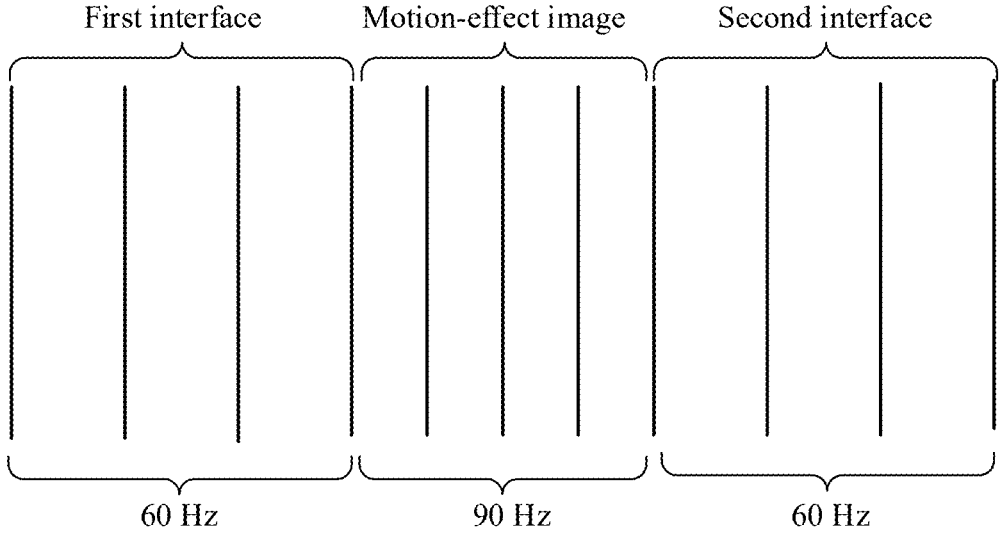
FIG. 5 is a schematic diagram of refresh rate adjustment in a process of switching from a first interface to a second interface according to an embodiment of this application.

In the start scenario of the Notepad application, an example in which the desktop 301 is the first interface and the interface 302 is the second interface is used. As shown in FIG. 5, the electronic device may display the first interface at a first refresh rate (for example, 60 Hz). After the electronic device receives the touch operation of the user on the icon of the Notepad application displayed in the first interface, and detects that the touch operation on the icon of the Notepad application on the screen of the electronic device ends, the electronic device may increase a refresh rate from the first refresh rate to a second refresh rate, and display the motion-effect image at the second refresh rate (for example, 90 Hz). After the Notepad application is completely started, the electronic device decreases the refresh rate from the second refresh rate to a third refresh rate, to display the second interface at the third refresh rate (for example, 60 Hz).

It should be noted that in a start scenario of an application, a motion-effect image in a start process may be a motion-effect image displayed when a user starts the application for the first time or a motion-effect image displayed when the user starts the application not for the first time. "For the first time" means that the application runs neither in foreground nor in background. "Not for the first time" means that the application runs in the background. In this case, the start process of the application may also be understood as a process in which a running position of the application switches from the background to the foreground.

For ease of understanding, a process of interaction between modules in a software system in an application start process according to an embodiment of this application is described below with reference to FIG. 6.

Figure 6:
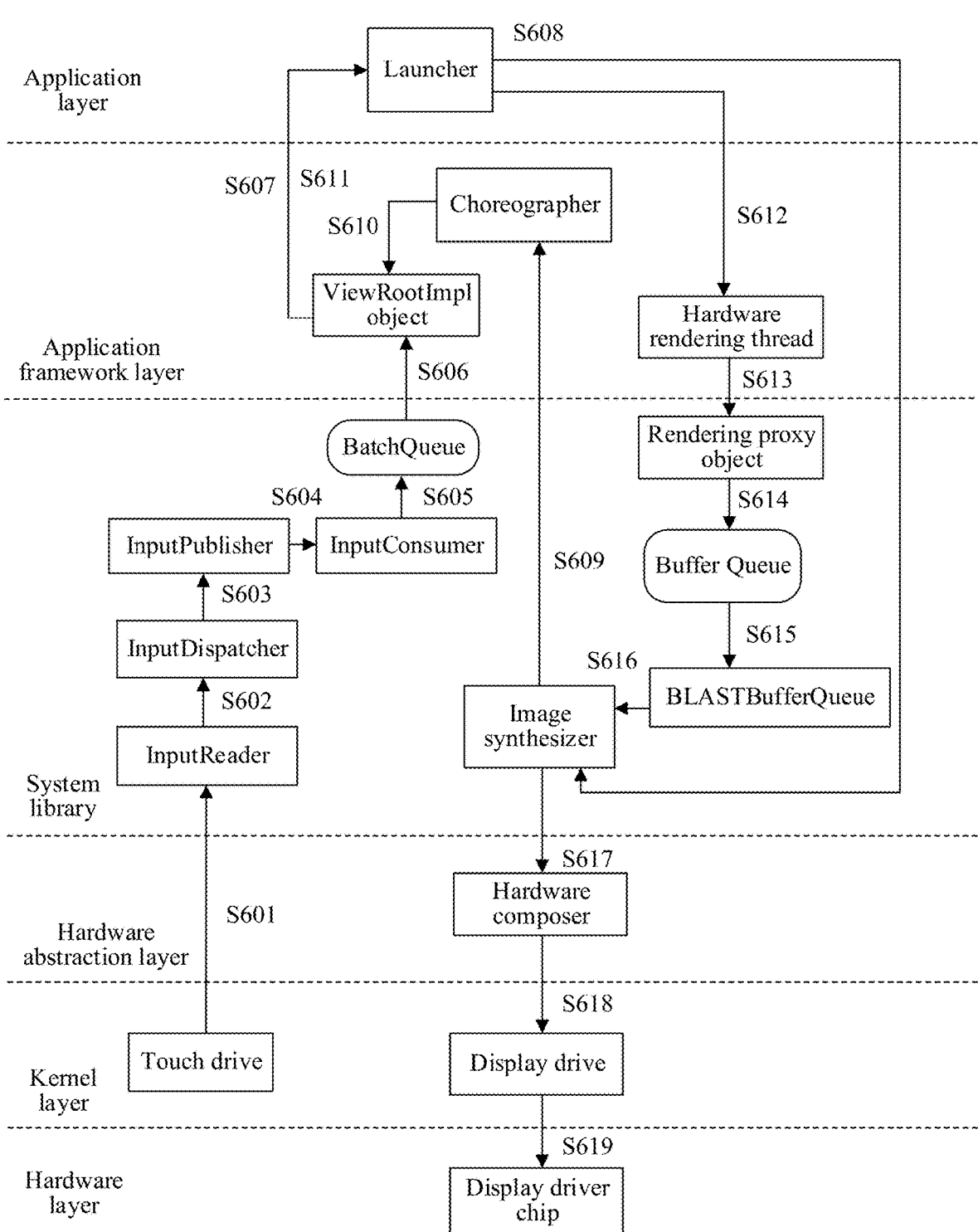
FIG. 6 is a schematic diagram of interaction in a software system in an application start process according to an embodiment of this application.

For example, FIG. 6 is a schematic diagram of the interaction in the software system in the application start process according to this embodiment of this application. Refer to FIG. 6. Using an example in which a user taps an application icon displayed on a desktop to start an application, an execution process thereof may include the following steps:

S601: When a touch sensor in a touch panel receives a touch operation, a touch drive processes the touch operation into an original input event, and reports the original input event to an InputReader.

Using start of a Notepad application as an example, a user may perform the touch operation on an icon of the Notepad application displayed on the desktop. In this case, the touch sensor in the touch panel may receive the touch operation, and the touch drive processes the touch operation into the original input event, and reports the original input event to the InputReader.

In this embodiment of this application, the original input event may be a tap event, a slide event, or the like. The tap event may be a tap by a finger of the user or a tap by a stylus. This is not limited in this embodiment of this application.

S602: The InputReader reads the original input event, and sends the original input event to an InputDispatcher.

S603: The InputDispatcher determines, based on information about the original input event and a current focus, that a focus application is a launcher, and dispatches the original input event to an InputPublisher corresponding to the launcher.

S604: The InputPublisher corresponding to the launcher sends the original input event to an InputConsumer corresponding to the launcher.

In some embodiments, one InputPublisher and one InputConsumer are registered for each application. Therefore, after determining the focus application, the InputDispatcher may dispatch the original input event to the InputPublisher corresponding to the focus application. In addition, the InputPublisher corresponding to the focus application may send, through a socket, the original input event to the InputConsumer corresponding to the focus application.

S605: The InputConsumer corresponding to the launcher stores the original input event into a BatchQueue.

S606: A ViewRootImpl object reads the original input event in the BatchQueue, and traverses, based on the information about the original input event, a view tree corresponding to the launcher, to determine a view control triggered by the original input event.

In some embodiments, the InputConsumer corresponding to the focus application stores the original input event in the BatchQueue. The ViewRootImpl object running in an application progress may read the original input event stored in the BatchQueue, and traverse, based on the information about the original input event, the view tree corresponding to the launcher, to determine the view control triggered by the original input event.

S607: The launcher invokes the ViewRootImpl object to obtain the view control triggered by the original input event.

S608: When the view control is configured to trigger display of a motion-effect image, the launcher invokes a motion-effect management module to generate motion-effect attribute information corresponding to the motion-effect image, and sends the motion-effect attribute information to an image synthesizer.

The motion-effect attribute information includes a view object, a motion-effect type, and a motion-effect parameter. The motion-effect parameter may include motion-effect start information, motion-effect end information, a motion-effect curve, and motion-effect duration.

S609: When determining that the motion-effect type in the motion-effect attribute information is a translation motion-effect, the image synthesizer calculates, based on the motion-effect parameter, a movement parameter corresponding to the motion-effect image, determines a second refresh rate based on the movement parameter, generates a first software Vsync signal and a second software Vsync signal whose frequencies are the second refresh rate, and sends the first software Vsync signal to a choreographer.

In some embodiments, after receiving the motion-effect attribute information, the image synthesizer extracts the motion-effect type in the motion-effect attribute information, and determines whether the motion-effect type in the motion-effect attribute information is the translation motion-effect. When determining that the motion-effect type is the translation motion-effect, the image synthesizer calculates, based on the motion-effect parameter, the movement parameter corresponding to the motion-effect image, and determines the second refresh rate based on the movement parameter.

Next, the image synthesizer sends a refresh rate switching instruction to a display driver chip through a display drive. The refresh rate switching instruction is used for adjusting a frequency of a hardware Vsync signal to the second refresh rate. After receiving the refresh rate switching instruction, the display driver chip adjusts the frequency of the hardware Vsync signal to the second refresh rate based on the refresh rate switching instruction.

The image synthesizer generates, through synchronization with the hardware Vsync signal, the first software Vsync signal and the second software Vsync signal whose frequencies are the second refresh rate. The first software Vsync signal is used for triggering drawing and rendering to be performed on the motion-effect image at the second refresh rate, and the second software Vsync signal is used for triggering synthesis to be performed on a drawn and rendered motion-effect image at the second refresh rate.

For example, when a first refresh rate corresponding to a first interface is 60 Hz, and the second refresh rate corresponding to the motion-effect image is 90 Hz, the display driver chip may adjust a period of the hardware Vsync signal from 16.6 ms to 11.1 ms after receiving the refresh rate switching instruction.

After generating the first software Vsync signal and the second software Vsync signal, the image synthesizer may send the first software Vsync signal to the choreographer.

S610: The choreographer sends the first software Vsync signal to the ViewRootImpl object.

S611: The launcher invokes the ViewRootImpl object to obtain the first software Vsync signal.

S612: The launcher draws the motion-effect image based on the first software Vsync signal, and invokes, after the motion-effect image is completely drawn, a hardware rendering thread to send a rendering instruction.

When the motion-effect image is drawn, several processes, namely, measurement (Measure), layout (Layout), and drawing (Draw), are mainly included. A width and a height of the view control depends on the measurement process. In the measurement process, the measured width of the view control may be obtained through a getMeasuredWidth method, and the measured height of the view control may be obtained through a getMeasuredHeight method. A position of the view control in a parent layout (namely, upper, lower, left, and right coordinates of the view control in the parent layout) depends on the layout process. The drawing process is performed to draw the view control on a screen.

S613: The hardware rendering thread sends the rendering instruction to a rendering proxy object.

S614: The rendering proxy object invokes, based on the rendering instruction, a GPU to render the drawn image, and stores a rendered motion-effect image into a Buffer Queue (which may be referred to as a first buffer queue).

S615: The Buffer Queue stores the rendered motion-effect image into a BLASTBufferQueue (which may be referred to as a second buffer queue).

S616: The image synthesizer reads the rendered motion-effect image from the BLASTBufferQueue when needing to synthesize the motion-effect image.

S617: The image synthesizer synthesizes the rendered motion-effect image based on the second software Vsync signal, and sends a synthesized motion-effect image to a hardware composer.

S618: The hardware composer sends the synthesized motion-effect image to the display drive.

S619: The display drive sends the synthesized motion-effect image to the display driver chip, and the display driver chip controls, based on the hardware Vsync signal, the display screen to display the synthesized motion-effect image.

It may be understood that the implementation corresponding to FIG. 6 provides an entire process in which the electronic device displays, after the user taps the application icon on the desktop, the motion-effect image that appears in the application start process. To understand embodiments of this application more clearly, the process of the interaction between the modules in the refresh rate adjustment method in the application start process provided in embodiments of this application is described in detail below with reference to FIG. 7.

Figure 7:
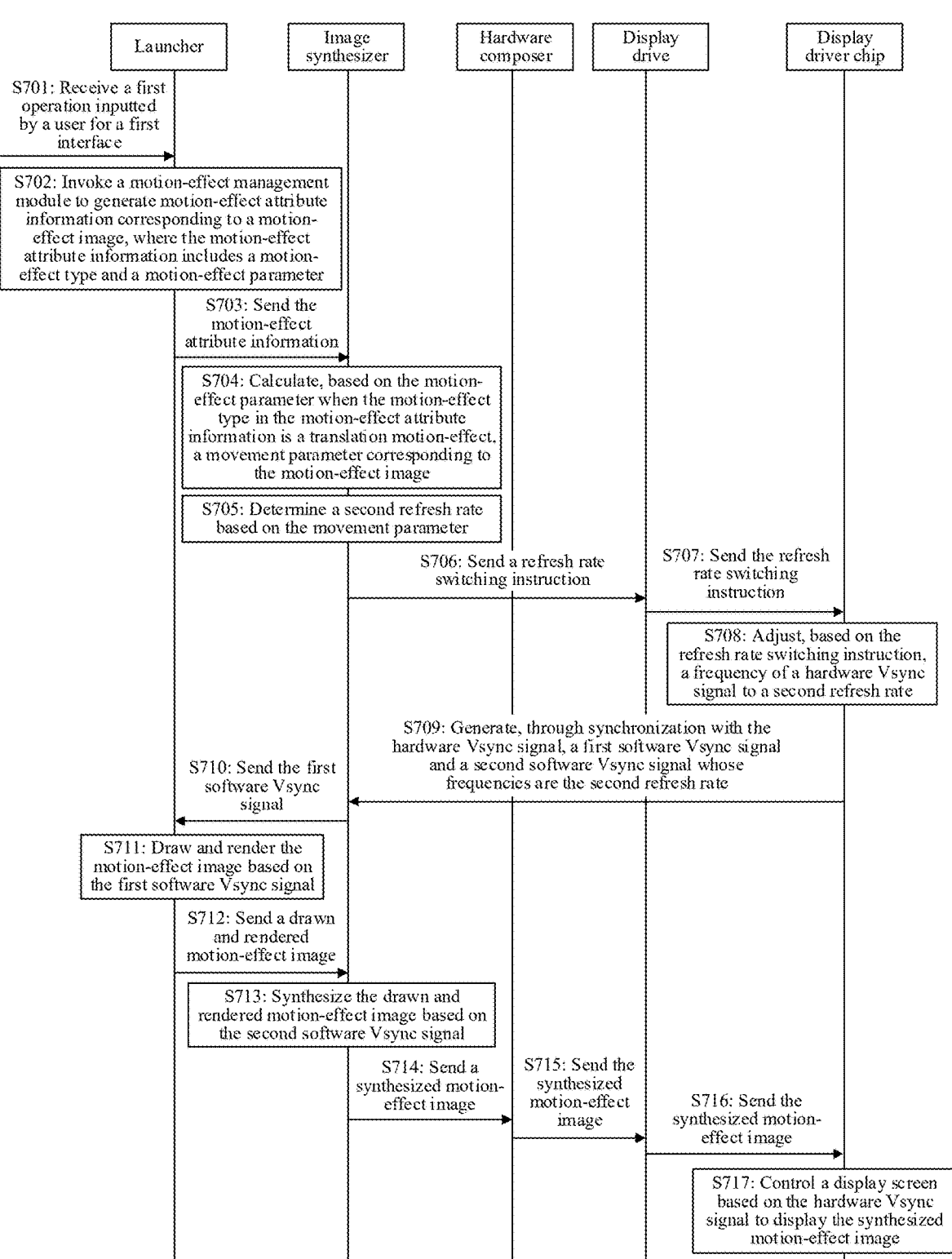
FIG. 7 is an architectural flowchart of a refresh rate adjustment method in an application start process according to an embodiment of this application.

For example, FIG. 7 is an architectural flowchart of a refresh rate adjustment method in an application start process according to an embodiment of this application. As shown in FIG. 7, an electronic device may include: a launcher, an image synthesizer, a hardware composer, a display drive, and a display driver chip. The refresh rate adjustment method may specifically include the following steps:

S701: The launcher receives a first operation inputted by a user for a first interface.

In some embodiments, when the electronic device displays the first interface at a first refresh rate, if the user inputs the first operation for the first interface displayed on the electronic device, the launcher may receive the first operation inputted by the user for the first interface. The first operation may trigger a display event of a motion-effect image.

It may be understood that, for a process in which the launcher receives the first operation inputted for the first interface, refer to the foregoing execution processes of S601 to S607. That the launcher determines, based on a view control triggered by an original input event, that the view control is used for triggering display of the motion-effect image means: The launcher receives the display event, of the motion-effect image, triggered for the first operation.

S702: The launcher directly invokes a motion-effect management module in response to the first operation to generate motion-effect attribute information corresponding to the motion-effect image, where the motion-effect attribute information includes a motion-effect type and a motion-effect parameter.

S703: The launcher sends the motion-effect attribute information to the image synthesizer.

In some embodiments, when receiving the first operation inputted for the first interface, the launcher directly invokes the motion-effect management module in response to the first operation to generate the motion-effect attribute information corresponding to the motion-effect image, and then sends the motion-effect attribute information corresponding to the motion-effect image to the image synthesizer. Specifically, the motion-effect attribute information corresponding to the motion-effect image is sent to a refresh rate decision module in the image synthesizer.

The motion-effect attribute information includes a view object, a motion-effect type, and a motion-effect parameter. The motion-effect parameter may include motion-effect start information, motion-effect end information, a motion-effect curve, and motion-effect duration.

The view object is a view for execution of a motion-effect image, and includes coordinates of upper, lower, left, and right corners. The motion-effect type may include a translation motion-effect, a transparency motion-effect, a color motion-effect, a rotation motion-effect, and the like.

For example, transfrom.rotation.X, transfrom.rotation.Y, transfrom.rotation.Z, and transfrom.rotation all represent the rotation motion-effect; and transfrom.translation.X, transfrom.translation.Y, transfrom.translation.Z, transfrom.translation, transfrom, bounds, and position all represent the translation motion-effect.

The motion-effect start information is status information at the start of the motion-effect image, the motion-effect end information is status information at the end of the motion-effect image, the motion-effect curve represents a status change curve from a motion-effect start moment to a motion-effect end moment, and the motion-effect duration is duration of the motion-effect image.

Using an example in which the motion-effect type is the translation motion-effect, the motion-effect start information is a motion-effect start position, the motion-effect end information is a motion-effect end position, and a slope of the motion-effect curve indicates a movement speed corresponding to the motion-effect image.

S704: The image synthesizer calculates, based on the motion-effect parameter when determining that the motion-effect type in the motion-effect attribute information is the translation motion-effect, a movement parameter corresponding to the motion-effect image.

In some embodiments, the refresh rate decision module in the image synthesizer may extract the motion-effect type in the motion-effect attribute information, and determine whether the motion-effect type in the motion-effect attribute information is the translation motion-effect. The refresh rate decision module in the image synthesizer calculates, based on the motion-effect parameter when determining that the motion-effect type is the translation motion-effect, the movement parameter corresponding to the motion-effect image.

In a possible implementation, the movement parameter corresponding to the motion-effect image is the movement speed. Therefore, the refresh rate decision module in the image synthesizer may calculate, in the following manner, the movement parameter corresponding to the motion-effect image: calculating, based on a distance between the motion-effect end position and the motion-effect start position, a movement distance corresponding to the motion-effect image; and calculating, based on at least one of the motion-effect start position, the motion-effect end position, the motion-effect curve, and the motion-effect duration when the movement distance is greater than a first preset distance, the movement speed corresponding to the motion-effect image.

The motion-effect start position in the motion-effect parameter represents position information of the view control at the motion-effect start moment, and the motion-effect end position in the motion-effect parameter represents position information of the view control at the motion-effect end moment. Therefore, the refresh rate decision module may calculate, based on the distance between the motion-effect end position and the motion-effect start position, the movement distance corresponding to the motion-effect image.

Then, the refresh rate decision module compares the movement distance corresponding to the motion-effect image with the first preset distance. When the movement distance corresponding to the motion-effect image is greater than the first preset distance, the refresh rate decision module calculates, based on at least one of the motion-effect start position, the motion-effect end position, the motion-effect curve, and the motion-effect duration, the movement speed corresponding to the motion-effect image.

When the movement distance corresponding to the motion-effect image is less than or equal to the first preset distance, it indicates that the movement distance of the motion-effect image is very small. Therefore, in this scenario, there is no need to increase the refresh rate to display the motion-effect image.

It should be noted that the first preset distance may be set based on an empirical value. For example, the first preset distance may be 160 pixels or 200 pixels.

Figure 8:
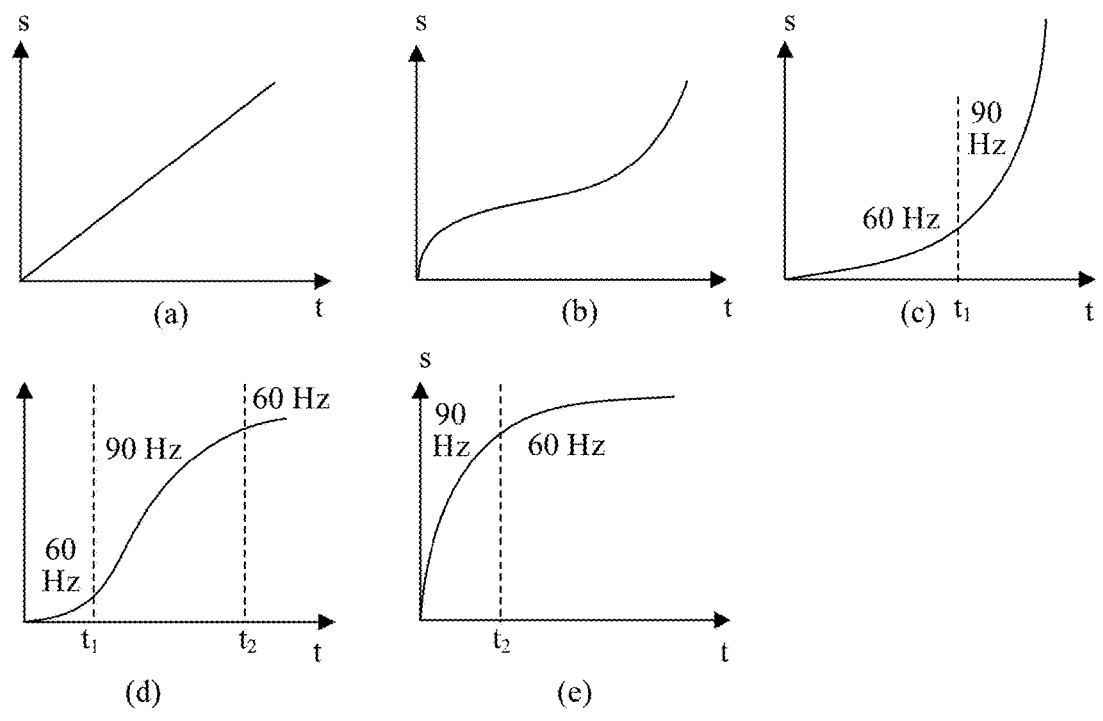
FIG. 8 is a schematic diagram of a motion-effect curve according to an embodiment of this application.

FIG. 8 shows five different motion-effect curves. An x coordinate of the motion-effect curve represents time (t), and a y coordinate of the motion-effect curve represents a translation(s). In this case, a slope of the motion-effect curve represents the movement speed of the motion-effect image.

As shown in (a) in FIG. 8, the motion-effect curve is a uniform motion-effect curve, and slopes of the motion-effect curve at different moments are consistent. Therefore, movement speeds corresponding to the motion-effect image at the different moments are consistent.

As shown in (b) in FIG. 8, the motion-effect curve is a nonuniform motion-effect curve, and slopes of the motion-effect curve at different moments are inconsistent. Therefore, movement speeds corresponding to the motion-effect image at the different moments are inconsistent. A movement speed corresponding to the nonuniform motion-effect curve shown in (b) in FIG. 8 gradually decreases first and then gradually increases.

As shown in (c) in FIG. 8, the motion-effect curve is a nonuniform motion-effect curve, and slopes of the motion-effect curve at different moments are inconsistent. Therefore, movement speeds corresponding to the motion-effect image at the different moments are inconsistent. A movement speed corresponding to the nonuniform motion-effect curve shown in (c) in FIG. 8 increases constantly.

As shown in (d) in FIG. 8, the motion-effect curve is a nonuniform motion-effect curve, and slopes of the motion-effect curve at different moments are inconsistent. Therefore, movement speeds corresponding to the motion-effect image at the different moments are inconsistent. A movement speed corresponding to the nonuniform motion-effect curve shown in (d) in FIG. 8 gradually increases first and then gradually decreases.

As shown in (e) in FIG. 8, the motion-effect curve is a nonuniform motion-effect curve, and slopes of the motion-effect curve at different moments are inconsistent. Therefore, movement speeds corresponding to the motion-effect image at the different moments are inconsistent. A movement speed corresponding to the nonuniform motion-effect curve shown in (e) in FIG. 8 decreases constantly.

If the motion-effect curve in the motion-effect parameter is the uniform motion-effect curve shown in (a) in FIG. 8, the refresh rate decision module may calculate, based on the motion-effect start position, the motion-effect end position, and the motion-effect duration, the movement speed corresponding to the motion-effect image. Specifically, the refresh rate decision module first calculates, based on the distance between the motion-effect end position and the motion-effect start position, the movement distance corresponding to the motion-effect image, and then divides the movement distance corresponding to the motion-effect image by the motion-effect duration, to calculate the movement speed corresponding to the motion-effect image.

If the motion-effect curve in the motion-effect parameter is any one of the nonuniform motion-effect curves shown in (b) in FIG. 8, (c) in FIG. 8, (d) in FIG. 8, and (e) in FIG. 8, the refresh rate decision module may calculate, based on the motion-effect start position, the motion-effect end position, the motion-effect curve, and the motion-effect duration, the movement speed corresponding to the motion-effect image.

It should be noted that FIG. 8 shows only several possible motion-effect curves. Certainly, the motion-effect curve in embodiments of this application includes but is not limited to the motion-effect curves shown in FIG. 8. In an application start scenario, the launcher sends some relevant parameters to the motion-effect management module when invoking the motion-effect management module to generate the motion-effect attribute information corresponding to the motion-effect image, to generate the corresponding motion-effect curve based on the relevant parameters. In the application start scenario, the motion-effect curve may be any motion-effect curve shown in FIG. 8 or any motion-effect curve other than the motion-effect curves shown in FIG. 8.

In another possible implementation, the movement parameter corresponding to the motion-effect image may alternatively include a movement distance and the movement speed. Therefore, the refresh rate decision module in the image synthesizer may calculate, in the following manner, the movement parameter corresponding to the motion-effect image: calculating, based on a distance between the motion-effect end position and the motion-effect start position, the movement distance corresponding to the motion-effect image; and calculating, based on at least one of the motion-effect start position, the motion-effect end position, the motion-effect curve, and the motion-effect duration, the movement speed corresponding to the motion-effect image.

S705: The image synthesizer determines a second refresh rate based on the movement parameter.

In some embodiments, the electronic device includes a plurality of speed intervals and second refresh rates one-to-one corresponding to the speed intervals, and the second refresh rate is positively correlated with a speed value included in the speed interval.

For example, the electronic device may include five speed intervals and corresponding second refresh rates. The first speed interval is $(0, V_1)$, namely, an interval greater than 0 and less than a first speed $V_1$, and a second refresh rate corresponding to the first speed interval is $FPS_1$. The second speed interval is $[V_1, V_2)$, namely, an interval greater than or equal to the first speed $V_1$ and less than a second speed $V_2$, and a second refresh rate corresponding to the second speed interval is $FPS_2$. The third speed interval is $[V_2, V_3)$, namely, an interval greater than or equal to the second speed $V_2$ and less than a third speed $V_3$, and a second refresh rate corresponding to the third speed interval is $FPS_3$. The fourth speed interval is $[V_3, V_4)$, namely, an interval greater than or equal to the third speed $V_3$ and less than a fourth speed $V_4$, and a second refresh rate corresponding to the fourth speed interval is $FPS_4$. The fifth speed interval is $[V_4, \infty)$, namely, an interval greater than or equal to the fourth speed $V_4$, and a second refresh rate corresponding to the fifth speed interval is $FPS_5$.

The fourth speed $V_4$ is greater than the third speed $V_3$, the third speed $V_3$ is greater than the second speed $V_2$, and the second speed $V_2$ is greater than the first speed $V_1$. In addition, $FPS_5$ is greater than $FPS_4$, $FPS_4$ is greater than $FPS_3$, $FPS_3$ is greater than $FPS_2$, and $FPS_2$ is greater than $FPS_1$. For example, $FPS_1$ is 30 Hz, $FPS_2$ is 60 Hz, $FPS_3$ is 90 Hz, $FPS_4$ is 120 Hz, and FPSs is 144 Hz.

Using an example in which the movement parameter corresponding to the motion-effect image is the movement speed, after calculating the movement speed corresponding to the motion-effect image, the refresh rate decision module in the image synthesizer may obtain the corresponding second refresh rate based on a speed interval to which the movement speed belongs.

For example, when the movement speed corresponding to the motion-effect image belongs to the third speed interval $[V_2, V_3)$, the refresh rate decision module may determine that the corresponding second refresh rate is $FPS_3$.

In another possible implementation, the movement parameter corresponding to the motion-effect image may alternatively include the movement distance and the movement speed. In this case, the image synthesizer first determines whether the movement distance corresponding to the motion-effect image is greater than the first preset distance. When the movement distance corresponding to the motion-effect image is greater than the first preset distance, the image synthesizer obtains the corresponding second refresh rate based on a speed interval to which the movement speed belongs.

In this embodiment of this application, when the movement speed belongs to a preset speed interval, the movement parameter meets a preset condition. The preset speed interval is at least a part of the plurality of speed intervals, and a speed value included in the preset speed interval is greater than a speed value included in a speed interval other than the preset speed interval in the plurality of speed intervals.

Using the example in which the electronic device includes the foregoing five speed intervals, the preset speed interval includes the third speed interval $[V_2, V_3)$, the fourth speed interval $[V_3, V_4)$, and the fifth speed interval $[V_4, \infty)$. It can be learned that speed values included in the third speed interval, the fourth speed interval, and the fifth speed interval are all greater than those included in the first speed interval $(0, V_1)$ and the second speed interval $[V_1, V_2)$. When the movement speed belongs to any one of the third speed interval, the fourth speed interval, and the fifth speed interval, it is determined that the movement parameter corresponding to the motion-effect image meets the preset condition. A second refresh rate corresponding to the preset speed interval is greater than the first refresh rate and a third refresh rate, in other words, the motion-effect image is displayed at the second refresh rate greater than the first refresh rate and the third refresh rate, thereby improving a display effect of the motion-effect image, and alleviating problems such as jittering and smearing of the motion-effect image.

In this embodiment of this application, because the refresh rate decision module obtains the corresponding second refresh rate based on the speed interval to which the movement speed belongs, the second refresh rate corresponding to the motion-effect image varies with the motion-effect curve in the motion-effect parameter.

If the motion-effect curve in the motion-effect parameter is the uniform motion-effect curve shown in (a) in FIG. 8, the movement speeds corresponding to the motion-effect image at the different moments remain consistent. Therefore, speed intervals to which the movement speeds corresponding to the motion-effect image at the different moments belong also remain consistent. In this way, second refresh rates corresponding to the motion-effect image at the different moments remain consistent. In other words, if the motion-effect curve in the motion-effect parameter is the uniform motion-effect curve, the electronic device displays the motion-effect image at the constant second refresh rate.

If the motion-effect curve in the motion-effect parameter is any one of the nonuniform motion-effect curves shown in (b) in FIG. 8, (c) in FIG. 8, (d) in FIG. 8, and (e) in FIG. 8, the movement speeds corresponding to the motion-effect image at the different moments are inconsistent. Therefore, speed intervals to which the movement speeds corresponding to the motion-effect image at the different moments belong may be inconsistent, causing second refresh rates corresponding to the motion-effect image at the different moments to change. In other words, if the motion-effect curve in the motion-effect parameter is the nonuniform motion-effect curve, the electronic device displays the motion-effect image at the changing second refresh rate.

For example, if the motion-effect curve in the motion-effect parameter is the nonuniform motion-effect curve shown in (d) in FIG. 8, movement speeds corresponding to the motion-effect image in a phase between the motion-effect start moment and a first target moment $t_1$ are all in the second speed interval $[V_1, V_2)$. In this case, the motion-effect image in the phase between the motion-effect start moment and the first target moment $t_1$ is displayed at $FPS_2$. Movement speeds corresponding to the motion-effect image in a phase between the first target moment $t_1$ and a second target moment $t_2$ are all in the third speed interval $[V_2, V_3)$. In this case, the motion-effect image in the phase between the first target moment $t_1$ and the second target moment $t_2$ is displayed at $FPS_3$. Movement speeds corresponding to the motion-effect image in a phase between the second target moment $t_2$ and the motion-effect end moment are all in the second speed interval $[V_1, V_2)$. In this case, the motion-effect image in the phase between the second target moment $t_2$ and the motion-effect end moment is displayed at $FPS_2$. If $FPS_2$ is 60 Hz, and $FPS_3$ is 90 Hz, the electronic device displays the motion-effect image in the phase between the motion-effect start moment and the first target moment $t_1$ at 60 Hz, displays the motion-effect image in the phase between the first target moment $t_1$ and the second target moment $t_2$ at 90 Hz, and displays the motion-effect image in the phase between the second target moment $t_2$ and the motion-effect end moment at 60 Hz.

Occasions on which the electronic device increases the refresh rate and decreases the refresh rate when the display of the motion-effect image is triggered in this embodiment of this application are different from occasions on which an electronic device increases a refresh rate and decreases the refresh rate when display of a motion-effect image is triggered in the related art.

Figure 9:
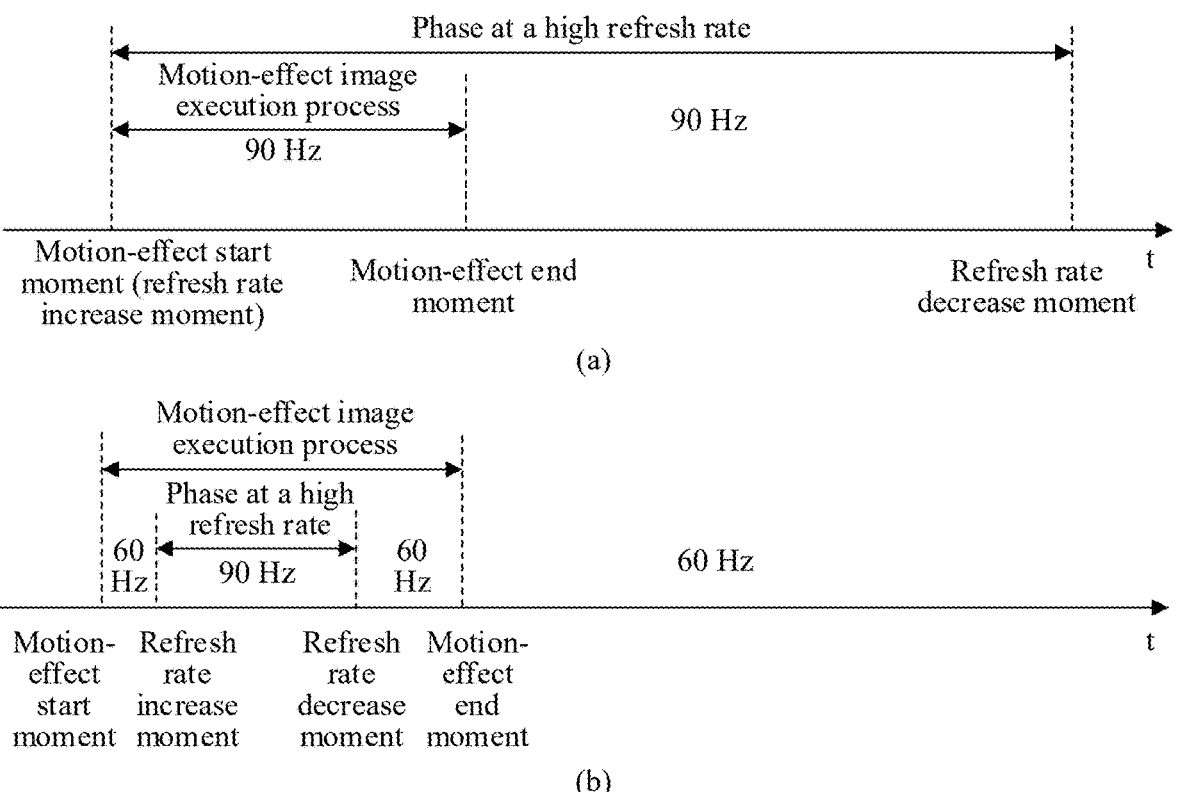
FIG. 9 is a schematic diagram of a refresh rate switching occasion according to an embodiment of this application.

As shown in (a) in FIG. 9, in the related art, when a user triggers display of a motion-effect image through a tap or slide operation for an application in a white list, a refresh rate is increased (for example, to 90 Hz) at a motion-effect start moment to display the motion-effect image. The refresh rate is not decreased at a motion-effect image end moment (for example, the motion-effect image is still displayed at the refresh rate of 90 Hz), but is decreased (for example, to 60 Hz) when 1 s to 3 s elapse after the display of the motion-effect image is completed (that is, after the motion-effect end moment). However, this increases power consumption of the electronic device.

As shown in (b) in FIG. 9, in a possible implementation of this application, when the display of the motion-effect image is triggered, the motion-effect image is displayed without increasing the refresh rate at the motion-effect start moment, that is, the motion-effect image is still displayed at a low refresh rate (for example, 60 Hz) in a time period between the motion-effect start moment and a refresh rate increase moment. The refresh rate is increased (for example, to 90 Hz) only at the refresh rate increase moment to display the motion-effect image. In addition, the refresh rate is decreased in advance (for example, to 60 Hz) at a refresh rate decrease moment that is before the motion-effect end moment, to display, at a low refresh rate, the motion-effect image that appears from the refresh rate decrease moment to the motion-effect end moment. A second interface is still displayed at the decreased refresh rate after the display of the motion-effect image is completed (that is, after the motion-effect end moment).

It can be learned in comparison between (b) in FIG. 9 and (a) in FIG. 9 that in this embodiment of this application, the motion-effect image may be displayed without increasing the refresh rate in the time period between the motion-effect start moment and the refresh rate increase moment, and the refresh rate is decreased in advance at the refresh rate decrease moment that is before the motion-effect end moment, so that the refresh rate can be recovered as soon as possible. Therefore, in this embodiment of this application, the motion-effect image may be displayed at a high refresh rate in a phase between the refresh rate increase moment and the refresh rate decrease moment, to improve the display effect of the motion-effect image. In addition, the motion-effect image is displayed at the low refresh rate in the time period between the motion-effect start moment and the refresh rate increase moment and a time period that is after the refresh rate decrease moment, thereby reducing the power consumption of the electronic device.

It should be noted that in this embodiment of this application, the motion-effect image may alternatively be displayed without increasing the refresh rate in the time period between the motion-effect start moment and the refresh rate increase moment, and the refresh rate is decreased only at the motion-effect end moment. In this embodiment of this application, the motion-effect image may alternatively be displayed by increasing the refresh rate at the motion-effect start moment, and the refresh rate is decreased in advance at the refresh rate decrease moment that is before the motion-effect end moment.

In a possible implementation, the nonuniform motion-effect curve includes at least a first stage curve and a second stage curve, the first stage curve is a motion-effect curve between the motion-effect start moment and a first target moment, and the second stage curve is a motion-effect curve after the first target moment. A slope of the nonuniform motion-effect curve represents the movement speed of the motion-effect image. In addition, a second refresh rate corresponding to the first stage curve is less than or equal to the first refresh rate, a second refresh rate corresponding to the second stage curve is greater than the first refresh rate, and the electronic device displays, at the second refresh rate less than or equal to the first refresh rate, the motion-effect image that appears before the first target moment.

For example, the nonuniform motion-effect curve shown in (c) in FIG. 8 includes a first stage curve between the motion-effect start moment and a first target moment $t_1$ and a second stage curve between the first target moment $t_1$ and the motion-effect end moment. Assuming that a second refresh rate that is calculated based on a slope corresponding to the first stage curve and that corresponds to the first stage curve is less than or equal to the first refresh rate, the electronic device displays, at the second refresh rate less than or equal to the first refresh rate, the motion-effect image that appears before the first target moment $t_1$. Assuming that a second refresh rate that is calculated based on a slope corresponding to the second stage curve and that corresponds to the second stage curve is greater than the first refresh rate, the electronic device displays, at the second refresh rate greater than the first refresh rate, the motion-effect image that appears after the first target moment $t_1$. In other words, the electronic device increases the refresh rate at the first target moment $t_1$ to display the motion-effect image instead of increasing the refresh rate at the motion-effect start moment.

For example, when the motion-effect curve in the motion-effect parameter is the nonuniform motion-effect curve shown in (c) in FIG. 8, and the first refresh rate is 60 Hz, the electronic device displays, at a second refresh rate of 60 Hz, the motion-effect image that appears before the first target moment $t_1$, and displays, at a second refresh rate of 90 Hz, the motion-effect image that appears after the first target moment $t_1$.

In another possible implementation, the nonuniform motion-effect curve includes at least a third stage curve and a fourth stage curve, the third stage curve is a motion-effect curve before a second target moment, the fourth stage curve is a motion-effect curve between the second target moment and the motion-effect end moment, and a slope of the nonuniform motion-effect curve represents the movement speed of the motion-effect image. In addition, a second refresh rate corresponding to the third stage curve is greater than the third refresh rate, a second refresh rate corresponding to the fourth stage curve is less than or equal to the third refresh rate, and the electronic device displays, at the second refresh rate less than or equal to the third refresh rate, the motion-effect image that appears after the second target moment. The third refresh rate is a refresh rate for displaying the second interface.

For example, the nonuniform motion-effect curve shown in (e) in FIG. 8 includes a third stage curve between the motion-effect start moment and a second target moment $t_2$ and a fourth stage curve between the second target moment $t_2$ and the motion-effect end moment. Assuming that a second refresh rate that is calculated based on a slope corresponding to the third stage curve and that corresponds to the third stage curve is greater than the third refresh rate, the electronic device displays, at the second refresh rate greater than the third refresh rate, the motion-effect image that appears before the second target moment $t_2$. Assuming that a second refresh rate that is calculated based on a slope corresponding to the fourth stage curve and that corresponds to the fourth stage curve is less than or equal to the third refresh rate, the electronic device displays, at the second refresh rate less than or equal to the third refresh rate, the motion-effect image that appears after the second target moment $t_2$. In other words, the electronic device decreases the refresh rate in advance at the second target moment $t_2$ to display the motion-effect image instead of decreasing the refresh rate at the motion-effect end moment.

For example, when the motion-effect curve in the motion-effect parameter is the nonuniform motion-effect curve shown in (e) in FIG. 8, and the third refresh rate is 60 Hz, the electronic device displays, at a second refresh rate of 90 Hz, the motion-effect image that appears before the second target moment $t_2$, and displays, at a second refresh rate of 60 Hz, the motion-effect image that appears after the second target moment $t_2$.

It should be noted that this embodiment of this application may be applied to scenarios such as the application start scenario, an application exit scenario, and a ViewPage switching scenario, and a motion-effect curve in a motion-effect parameter created in this embodiment of this application may be the nonuniform motion-effect curve shown in (e) in FIG. 8 or the nonuniform motion-effect curve shown in (d) in FIG. 8, to decrease the refresh rate in advance before the motion-effect end moment to display the motion-effect image.

S706: The image synthesizer sends a refresh rate switching instruction to the display drive.

S707: The display drive sends the refresh rate switching instruction to the display driver chip.

In some embodiments, after determining the second refresh rate, the image synthesizer sends the refresh rate switching instruction to the display drive, and the display drive sends the refresh rate switching instruction to the display driver chip. The refresh rate switching instruction may include the second refresh rate.

S708: The display driver chip adjusts, based on the refresh rate switching instruction, a frequency of a hardware Vsync signal to the second refresh rate.

S709: The image synthesizer generates, through synchronization with the hardware Vsync signal, a first software Vsync signal and a second software Vsync signal whose frequencies are the second refresh rate.

In some embodiments, after receiving the refresh rate switching instruction, the display driver chip adjusts the frequency of the hardware Vsync signal based on the refresh rate switching instruction, so that an adjusted frequency of the hardware Vsync signal is the second refresh rate.

The image synthesizer may generate, through synchronization with the hardware Vsync signal, the first software Vsync signal and the second software Vsync signal whose frequencies are the second refresh rate. That is, the frequencies of the first software Vsync signal, the second software Vsync signal, and the hardware Vsync signal remain the same.

The first software Vsync signal is used for triggering drawing and rendering to be performed on the motion-effect image at the second refresh rate. The second software Vsync signal is used for triggering synthesis to be performed, at the second refresh rate, on a drawn and rendered motion-effect image.

S710: The image synthesizer sends the first software Vsync signal to the launcher.

In this embodiment of this application, after generating the first software Vsync signal and the second software Vsync signal, the image synthesizer may send the first software Vsync signal to a choreographer, the choreographer sends the first software Vsync signal to a ViewRootImpl object, and the launcher invokes the ViewRootImpl object to obtain the first software Vsync signal. Therefore, the image synthesizer sends the first software Vsync signal to the launcher through the foregoing process.

S711: The launcher draws and renders the motion-effect image based on the first software Vsync signal.

S712: The launcher sends the drawn and rendered motion-effect image to the image synthesizer.

After obtaining the first software Vsync signal, the launcher may draw the motion-effect image based on the first software Vsync signal, and invoke, after the motion-effect image is drawn, a hardware rendering thread to send a rendering instruction. The hardware rendering thread then sends the rendering instruction to a rendering proxy object. The rendering proxy object invokes a GPU based on the rendering instruction to render a drawn image. Therefore, the launcher draws and renders the motion-effect image based on the first software Vsync signal through the foregoing process.

After invoking the GPU based on the rendering instruction to render the drawn image, the rendering proxy object stores a rendered motion-effect image into a Buffer Queue. The Buffer Queue stores the rendered motion-effect image into a BLASTBufferQueue. The image synthesizer may read the rendered motion-effect image from the BLASTBufferQueue each time the image synthesizer needs to synthesize the motion-effect image. Therefore, the launcher sends the drawn and rendered motion-effect image to the image synthesizer through the foregoing process.

S713: The image synthesizer synthesizes the drawn and rendered motion-effect image based on the second software Vsync signal.

Each time the image synthesizer needs to synthesize the motion-effect image, an image synthesis module in the image synthesizer may read the rendered motion-effect image from the BLASTBufferQueue based on the second software Vsync signal, and synthesize the rendered motion-effect effect image.

S714: The image synthesizer sends a synthesized motion-effect image to a hardware composer.

S715: The hardware composer sends the synthesized motion-effect image to the display drive.

S716: The display drive sends the synthesized motion-effect image to the display driver chip.

S717: The display driver chip controls a display screen based on the hardware Vsync signal to display the synthesized motion-effect image.

After synthesizing the drawn and rendered motion-effect image, the image synthesizer sends the synthesized motion-effect image to the display driver chip sequentially through the hardware composer and the display drive. The display driver chip controls the display screen based on the hardware Vsync signal to display the synthesized motion-effect image, so that the motion-effect image can be displayed on the display screen of the electronic device at the second refresh rate.

In conclusion, it can be learned that in this embodiment of this application, the motion-effect image displayed after the first operation inputted by the user on the first interface can be accurately identified. A motion-effect image whose motion-effect type is the translation motion-effect and whose movement speed belongs to the preset speed interval is displayed at a second refresh rate greater than the first refresh rate and the third refresh rate, that is, a refresh rate of the motion-effect image is improved, thereby improving a display effect of the motion-effect image, and alleviating problems such as jittering and smearing of these motion-effect image, to improve use experience of the user. However, refresh rates for displaying a motion-effect image whose motion-effect type is a transparency motion-effect, a color motion-effect, or a rotation motion-effect and a motion-effect image whose motion-effect type is the translation motion-effect but whose movement speed does not belong to the preset speed interval are not increased, to reduce power consumption caused when these motion-effect images are displayed at an unnecessarily high refresh rate, thereby reducing power consumption of the electronic device.

The following describes a display processing procedure for an interface of the electronic device with reference to processes of drawing, rendering, synthesizing, and displaying an image frame.

Figure 10:
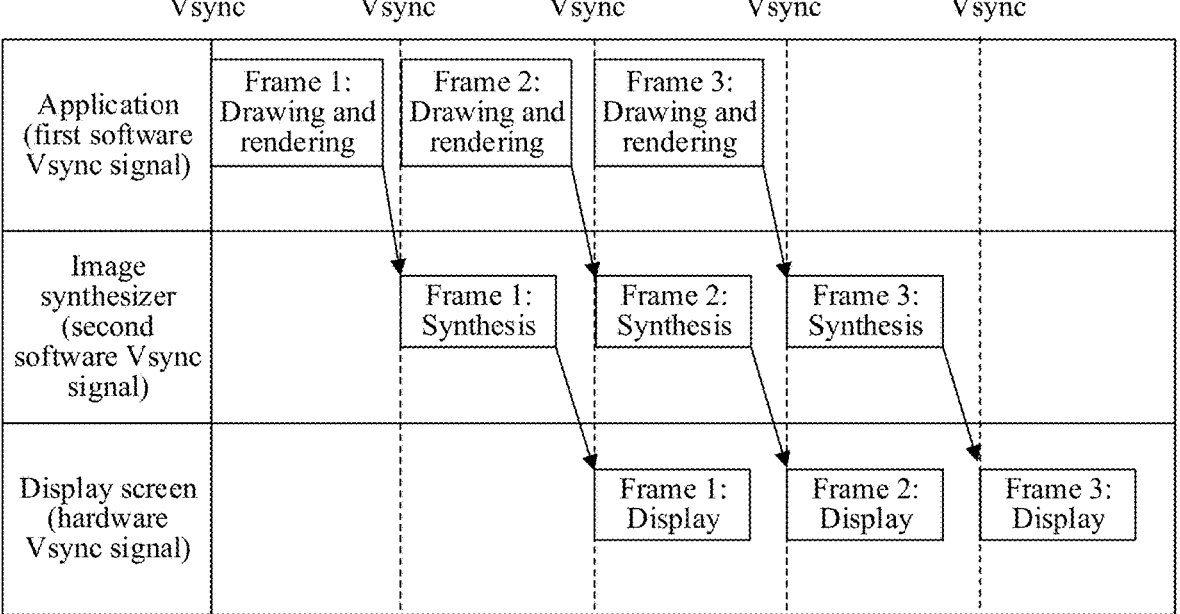
FIG. 10 is a first schematic diagram of a display processing procedure for an interface of an electronic device according to an embodiment of this application.

For example, FIG. 10 is a schematic diagram of the display processing procedure for the interface of the electronic device according to this embodiment of this application. In chronological order, content displayed by the electronic device sequentially corresponds to a frame 1, a frame 2, and a frame 3.

Specifically, using display of the frame 1 as an example, an application of the electronic device draws and renders the frame 1 through a view system at an application framework layer. After the frame 1 is drawn and rendered, the application of the electronic device sends a drawn and rendered frame 1 to the image synthesizer. The image synthesizer synthesizes the drawn and rendered frame 1. After the frame 1 is synthesized, the electronic device may invoke the display drive at a kernel layer to display, on the display screen, the content corresponding to the frame 1. It should be noted that the frame 2 and the frame 3 are also synthesized and displayed. This is similar to the process of the frame 1. Details are not described herein again. In FIG. 10, each frame has a lag of two Vsync signal periods through drawing to display, that is, the display by the electronic device has hysteresis.

Figure 11:
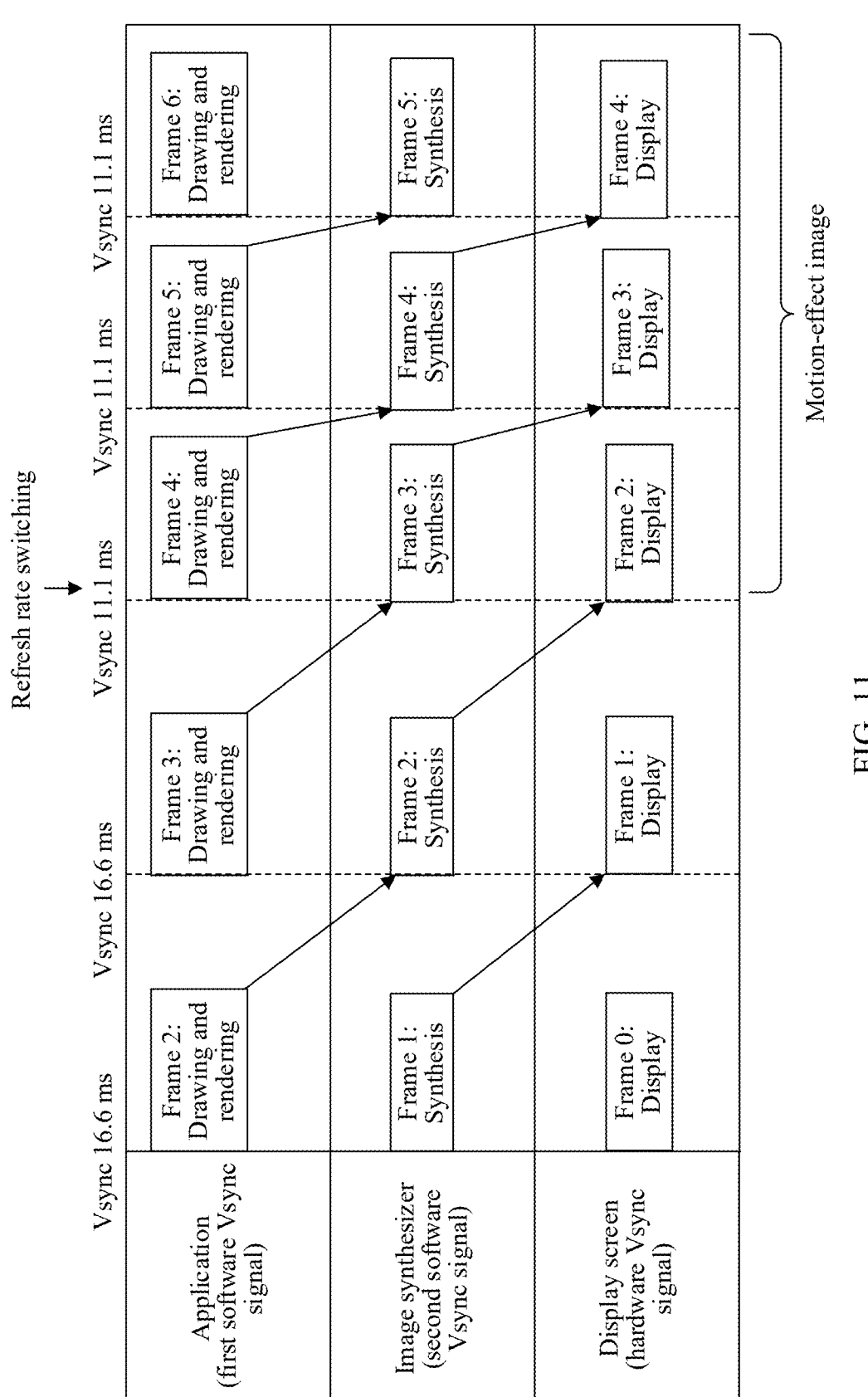
FIG. 11 is a second schematic diagram of a display processing procedure for an interface of an electronic device according to an embodiment of this application.

For example, FIG. 11 is a schematic diagram of the display processing procedure for the interface of the electronic device according to this embodiment of this application. In chronological order, content displayed by the electronic device sequentially corresponds to a frame 0, a frame 1, a frame 2, a frame 3, a frame 4, a frame 5, and a frame 6.

Specifically, using display of the frame 2 as an example, an application of the electronic device draws and renders the frame 2 through a view system at an application framework layer. After the frame 2 is drawn and rendered, the application of the electronic device sends a drawn and rendered frame 2 to the image synthesizer. The image synthesizer synthesizes the drawn and rendered frame 2. After the frame 2 is synthesized, the electronic device may invoke a kernel layer to start the display drive to display the content corresponding to the frame 2. The frame 3, the frame 4, the frame 5, and the frame 6 are also synthesized and displayed. This is similar to the process of the frame 2. Details are not described herein again.

When the frame 3 is drawn and rendered, the image synthesizer in the electronic device decides, based on the motion-effect attribute information, that the refresh rate needs to be adjusted from the first refresh rate to the second refresh rate, for example, from 60 Hz to 90 Hz. When the frame 4 is drawn and rendered, the screen refresh rate is switched. Duration of a Vsync signal period corresponding to the drawing and rendering of the frame 4 is shortened, to complete the switching of the screen refresh rate.

It should be noted that when the screen refresh rate of the display screen is 90 Hz, the Vsync signal period may be 11.1 ms. That is, the electronic device generates one piece of control information every 11.1 ms to periodically trigger a Vsync signal. When the refresh rate of the display screen is 60 Hz, the Vsync signal period may be 16.6 ms. That is, the electronic device generates one control signal every 16.6 ms to periodically trigger a Vsync signal.

Figure 12:
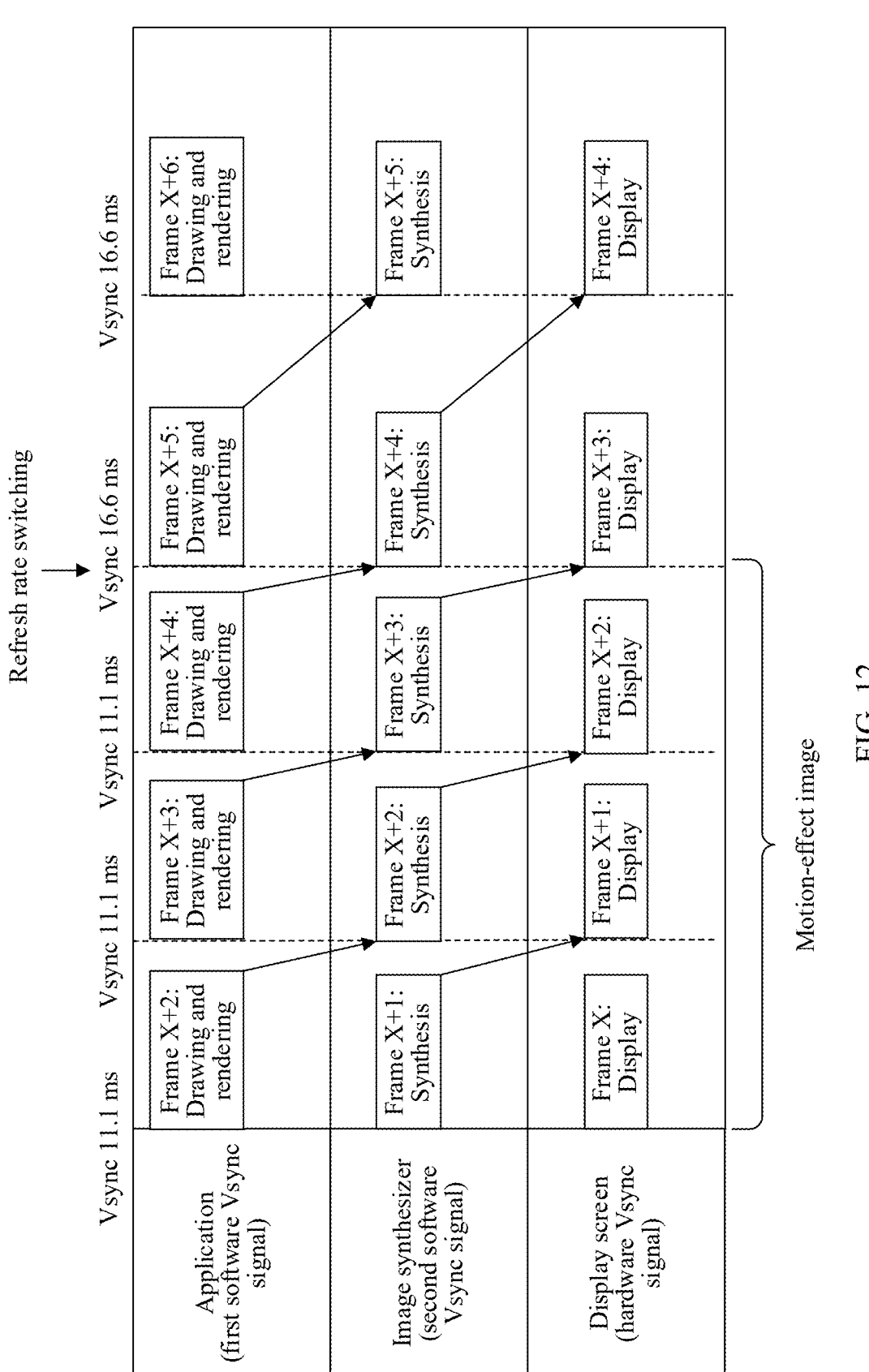
FIG. 12 is a third schematic diagram of a display processing procedure for an interface of an electronic device according to an embodiment of this application.

For example, FIG. 12 is a schematic diagram of the display processing procedure for the interface of the electronic device according to this embodiment of this application. In chronological order, content displayed by the electronic device sequentially corresponds to a frame X, a frame X+1, a frame X+2, a frame X+3, a frame X+4, a frame X+5, and a frame X+6, where X is a positive integer.

Specifically, using display of the frame X+2 as an example, an application of the electronic device draws and renders the frame X+2 through a view system at an application framework layer. After the frame X+2 is drawn and rendered, the application of the electronic device sends a drawn and rendered frame X+2 to the image synthesizer. The image synthesizer synthesizes the drawn and rendered frame X+2. After the frame X+2 is synthesized, the electronic device may invoke a kernel layer to start the display drive to display the content corresponding to the frame X+2. The frame X+3, the frame X+4, the frame X+5, and the frame X+6 are also synthesized and displayed. This is similar to the process of the frame X+2. Details are not described herein again.

When the frame X+4 is drawn and rendered, the image synthesizer in the electronic device determines that a decrease from a second refresh rate to a third refresh rate, for example, from 90 Hz to 60 Hz, is required. When the frame X+5 is drawn and rendered, a screen refresh rate is switched. Duration of a Vsync signal period corresponding to the drawing and rendering of the frame X+5 is prolonged, to complete the switching of the screen refresh rate.

Therefore, it can be learned with reference to FIG. 11 and FIG. 12 that, the electronic device may display the first interface at the first refresh rate of 60 Hz, display the motion-effect image at the second refresh rate of 90 Hz, and display the second interface at the third refresh rate of 60 Hz, so that the motion-effect image is displayed at a high refresh rate, to improve the display effect of the motion-effect image.

The foregoing uses the example in which the motion-effect scenario is the application start scenario. Certainly, the motion-effect scenario in embodiments of this application may alternatively be the application exit scenario, an interface slide scenario, the ViewPage switching scenario, or the like.

Figure 13:
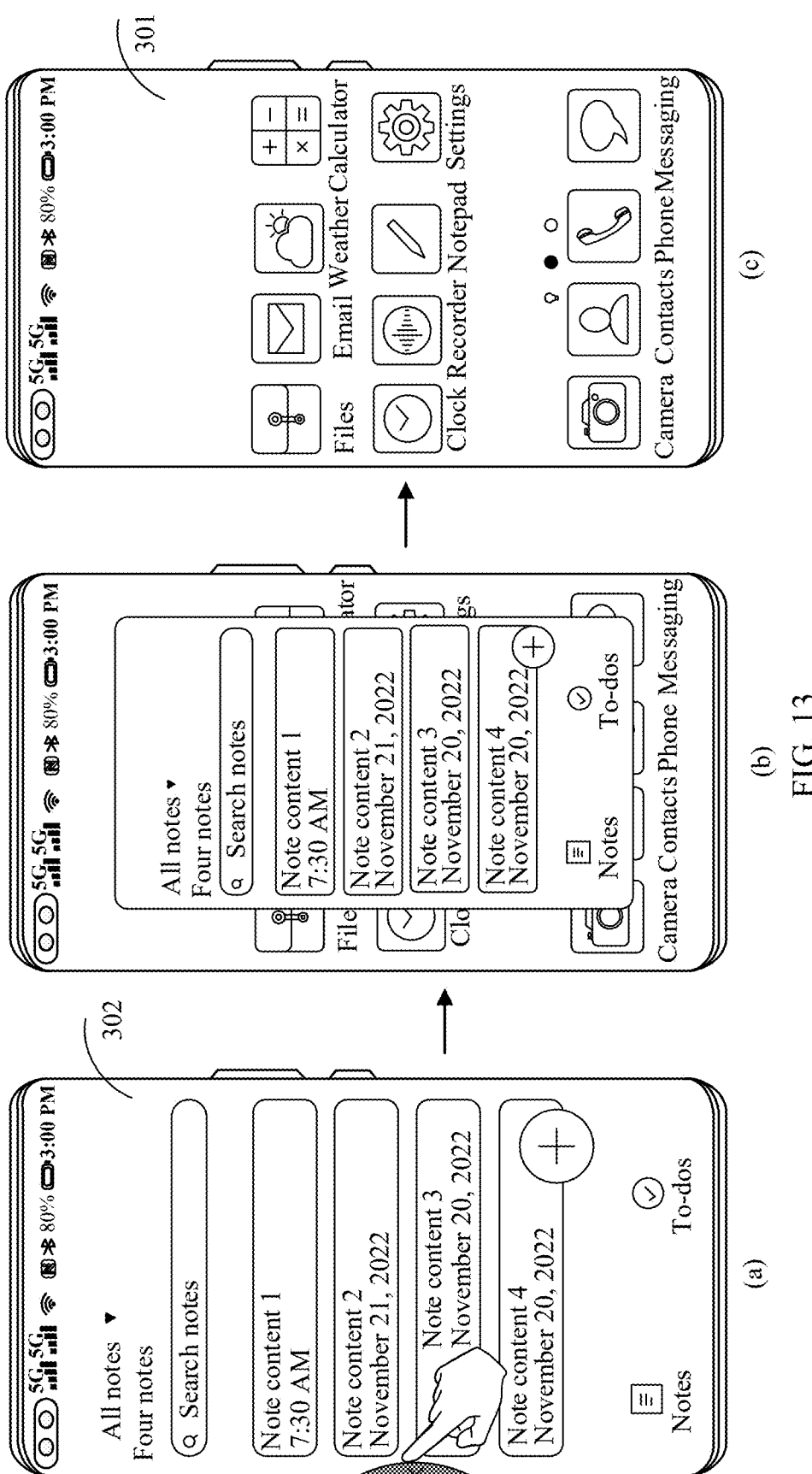
FIG. 13 is a schematic diagram of interface switching in an application exit scenario according to an embodiment of this application.

An example in which a target application is the Notepad application and the motion-effect scenario is a Notepad application exit scenario is used. For example, the electronic device may display an interface 302 of the Notepad application shown in (a) in FIG. 13. The interface 302 is a note list interface in the Notepad application. The user may perform an exit operation on the Notepad application in the interface 302. The exit operation may be referred to as a first operation. For example, the first operation in this case is an operation of sliding right by the user from a left edge of the interface 302 to exit the Notepad application. In this case, the electronic device receives the exit operation of the user on the Notepad application. After a finger of the user leaves the screen of the electronic device, the electronic device may display a desktop 301 shown in (c) in FIG. 13 in response to the exit operation.

In the Notepad application exit scenario, to bring better use experience to the user, the electronic device displays a motion-effect image in a Notepad application exit stage. The motion-effect image in a Notepad application exit process may be an image displayed in a process of switching from the interface 302 to the desktop 301 after the user slides right from the left edge of the interface 302. In the Notepad application exit scenario, the interface 302 of the Notepad application may be referred to as a first interface, and the desktop 301 of the electronic device may be referred to as a second interface.

Using the foregoing Notepad application exit scenario as an example, a plurality of frames of motion-effect images that are successively displayed actually represent a process in which an image in the interface 302 changes from large to small. For example, in the Notepad application exit scenario, one frame of motion-effect image may be an image shown in (b) in FIG. 13. Specifically, when the user slides right from the left edge of the interface 302 and the finger of the user leaves the screen of the electronic device, an exit motion-effect starts, and the image displayed in the interface 302 starts to zoom out. When the image displayed in the interface 302 is completely exited and the desktop 301 is displayed, the exit motion-effect ends.

It should be noted that a refresh rate adjustment method in the application exit process is similar to the implementations corresponding to FIG. 6 and FIG. 7. For details, refer to the foregoing descriptions corresponding to FIG. 6 and FIG. 7. To avoid repetition, details are not described herein again.

In addition, in the application exit scenario, a motion-effect curve may be any motion-effect curve shown in FIG. 8 or any motion-effect curve other than the motion-effect curves shown in FIG. 8.

An example in which a target application is a news browsing type application and the motion-effect scenario is an interface slide scenario is used. For example, as shown in (a) in FIG. 14, three news messages, for example, a news feed 1, a news feed 2, and a news feed 3, are displayed in a first recommendation interface 303 of the electronic device. The news feed 2 corresponds to three pictures: picture content 1, picture content 2, and picture content 3. The news feed 3 corresponds to video content 1.

The user may perform a slide-up operation on the first recommendation interface 303. The slide-up operation may be referred to as a first operation. The electronic device may display a second recommendation interface 304 shown in (c) in FIG. 14 in response to the slide-up operation after receiving the slide-up operation of the user in the first recommendation interface 303 and detects that the slide-up operation on the first recommendation interface 303 on the screen of the electronic device ends. The second recommendation interface 304 includes the video content 1 corresponding to the news feed 3 in the first recommendation interface 303, and further includes a news feed 4, a news feed 5, and a news feed 6. The news feed 4 corresponds to picture content 4, the news feed 5 corresponds to picture content 5, and the news feed 6 corresponds to video content 2.

In the slide scenario of the news browsing type application, to bring better use experience to the user, the electronic device continuously scrolls a page after the finger of the user slides up and the slide operation on the screen of the electronic device ends. A motion-effect image in the slide scenario of the news browsing type application is an image displayed in a process of switching from the first recommendation interface 303 to the second recommendation interface 304 after the user performs the slide-up operation on the first recommendation interface 303. For example, in the slide scenario of the news browsing type application, one frame of motion-effect image may be an image shown in (b) in FIG. 14.

In the slide scenario of the news browsing type application, the first recommendation interface 303 may be referred to as a first interface, and the second recommendation interface 304 may be referred to as a second interface. In other words, in the interface slide scenario of the target application, the first interface is an interface displayed by the target application before the slide operation, and the second interface is an interface displayed by the target application after the slide operation.

It should be noted that for the interface slide scenario of the target application, in addition to reading an original input event, determining a focus application, and dispatching the original input event to the focus application, an input processing module may further calculate a first slide speed that is at a moment at which the slide operation ends, for example, calculate, through an InputConsumer in the input processing module, the first slide speed that is at the moment at which the slide operation ends. The first slide speed may also be sent to the focus application together with the original input event through a BatchQueue and the ViewRootImpl object, and the focus application in this case is the target application. For example, in the slide scenario of the news browsing type application, the focus application is the news browsing type application.

When determining that a view control triggered by the original input event is configured to trigger the display of the motion-effect image, the focus application may invoke the motion-effect management module to generate the motion-effect attribute information corresponding to the motion-effect image. The motion-effect curve in the motion-effect attribute information may be selected based on the first slide speed.

Specifically, in the interface slide scenario of the target application, the focus application (namely, the target application) may send relevant parameters such as the first slide speed to the motion-effect management module, to generate the corresponding motion-effect curve based on the relevant parameters. In addition, in the interface slide scenario of the target application, the motion-effect curve may be any motion-effect curve shown in FIG. 8 or any motion-effect curve other than the motion-effect curves shown in FIG. 8.

Using an example in which the motion-effect curve is a uniform motion-effect curve, a higher first slide speed indicates a larger slope of the selected uniform motion-effect curve, and a lower first slide speed indicates a smaller slope of the selected uniform motion-effect curve. For example, when the first slide speed is greater than 800 pixels/s, a second refresh rate corresponding to the selected uniform motion-effect curve may be 90 Hz. When the first slide speed is less than or equal to 800 pixels/s, a second refresh rate corresponding to the selected uniform motion-effect curve may be 60 Hz. In other words, in a high-speed slide scenario, the motion-effect image is displayed at a high refresh rate. In a low-speed slide scenario, the refresh rate of the motion-effect image is not increased, and the motion-effect image is still displayed at a low refresh rate.

After generating the motion-effect attribute information corresponding to the motion-effect image, the focus application also sends the motion-effect attribute information to the image synthesizer. For a subsequent execution process, refer to the foregoing descriptions corresponding to FIG. 6 and FIG. 7, provided that the launcher is replaced with the focus application to perform the corresponding operations, and remaining processes are substantially similar. To avoid repetition, details are not described herein again.

Certainly, the interface slide scenario in this embodiment of this application may alternatively be slide-down or the like in addition to the foregoing slide-up. That is, in the interface slide scenario of the target application, the first operation is a slide operation on the interface of the target application, and the slide operation includes the slide-up operation or the slide-down operation.

Figure 14:
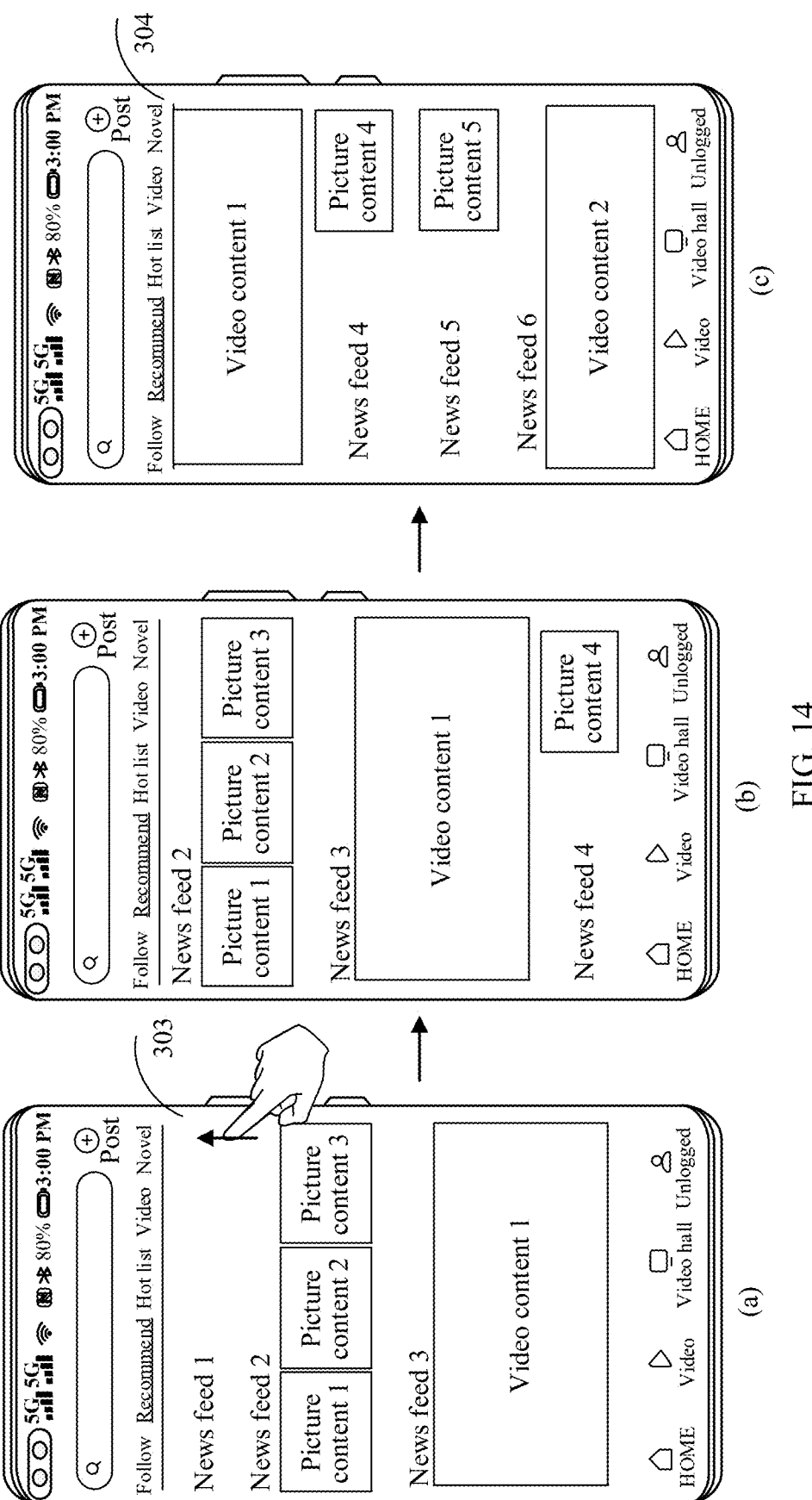
FIG. 14 is a schematic diagram of interface switching in an interface slide scenario according to an embodiment of this application.

In some other embodiments, the scenario in which the user performs the slide operation in the interface of the target application may be the scenario, shown in FIG. 14, in which the finger of the user lifts off the screen of the electronic device after the slide operation. During actual use, when the user performs the slide operation in the interface of the target application, the finger of the user may always touch the screen without leaving the screen. In this case, the electronic device needs to display a motion-effect image based on a slide operation of the finger, and a focus application in this case is the target application.

Figure 15:
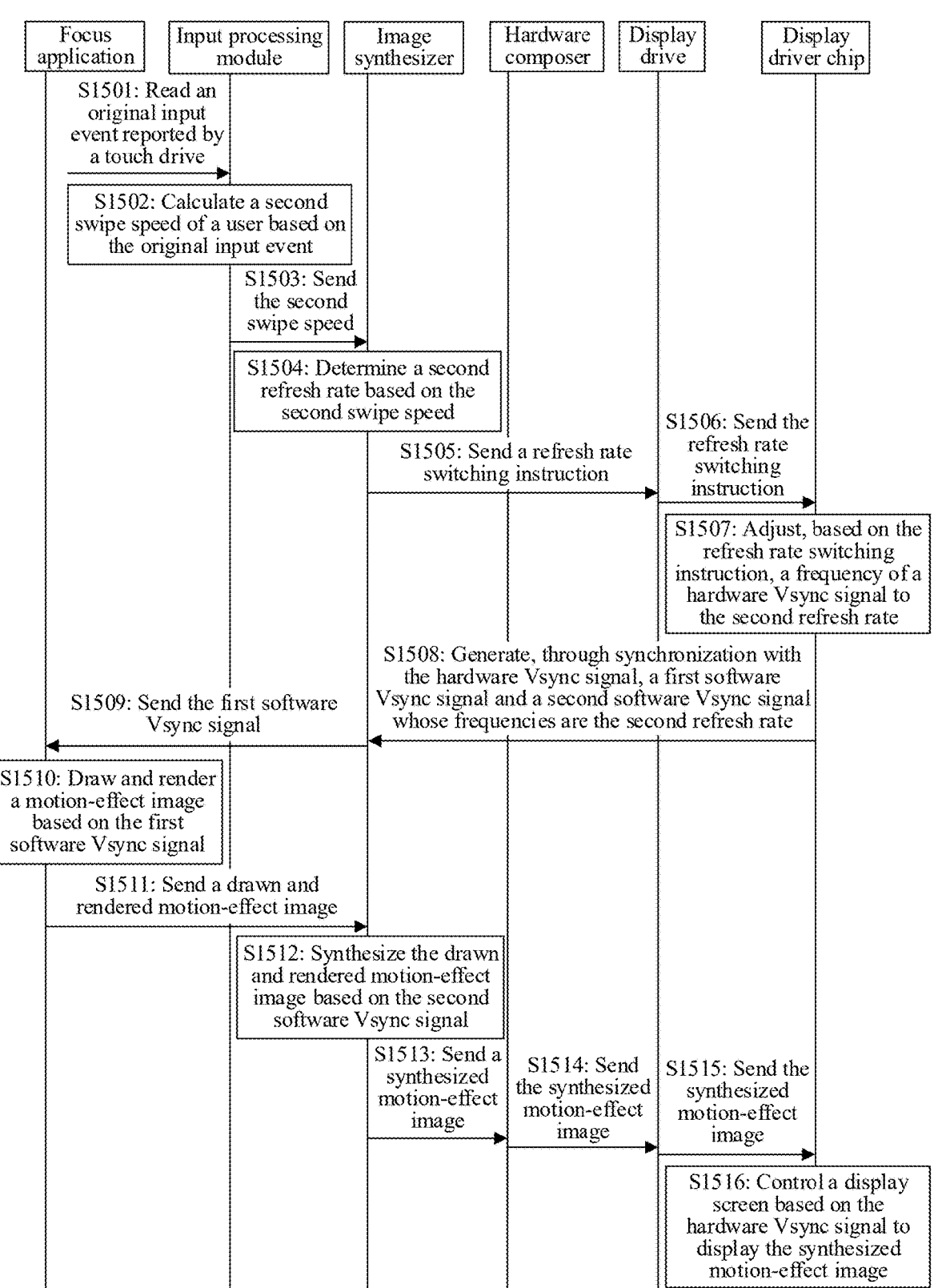
FIG. 15 is an architectural flowchart of a refresh rate adjustment method in a scenario of slide always with a hand according to an embodiment of this application.

For example, FIG. 15 is an architectural flowchart of a refresh rate adjustment method in a scenario of slide always with a hand according to an embodiment of this application. Refer to FIG. 15. An electronic device may include a focus application, an input processing module, an image synthesizer, a hardware composer, a display drive, and a display driver chip. The refresh rate adjustment method may specifically include the following steps:

S1501: The input processing module reads an original input event reported by a touch drive.

S1502: The input processing module calculates a second slide speed of a user based on the original input event.

S1503: The input processing module sends the second slide speed to the image synthesizer.

S1504: The image synthesizer determines a second refresh rate based on the second slide speed.

In some embodiments, when a touch sensor in a touch panel receives a slide operation, the touch drive processes the slide operation into an original input event. The input processing module reads the original input event reported by the touch drive.

The input processing module first calculates, based on the original input event, a slide distance of slide performed by the user. The input processing module calculates the second slide speed based on the original input event when the slide distance is greater than a second preset distance. The input processing module sends the second slide speed to the image synthesizer when the second slide speed is greater than a preset speed. Alternatively, the input processing module directly sends the second slide speed to the image synthesizer after calculating the second slide speed.

The electronic device includes a plurality of speed intervals and second refresh rates one-to-one corresponding to the speed intervals, and the second refresh rate is positively correlated with a speed value included in the speed interval. The image synthesizer may obtain the corresponding second refresh rate based on a speed interval to which the second slide speed belongs.

It may be understood that correspondence tables between a speed interval and a second refresh rate that are respectively used in a scenario of determining a second refresh rate based on a movement speed corresponding to a motion-effect image and a scenario of determining the second refresh rate based on the second slide speed of the user may be a same correspondence table or different correspondence tables. This is not limited in this embodiment of this application.

In addition, when sending the second slide speed to the image synthesizer, the input processing module may further store the original input event into a BatchQueue. A ViewRootImpl object reads the original input event in the BatchQueue, and traverses, based on information about the original input event, a view tree corresponding to a focus application, to determine a view control triggered by the original input event. The focus application invokes the ViewRootImpl object to obtain the view control triggered by the original input event. In this scenario, the focus application does not invoke a motion-effect management module to generate motion-effect attribute information corresponding to the motion-effect image.

S1505: The image synthesizer sends a refresh rate switching instruction to the display drive.

S1506: The display drive sends the refresh rate switching instruction to the display driver chip.

S1507: The display driver chip adjusts, based on the refresh rate switching instruction, a frequency of a hardware Vsync signal to the second refresh rate.

S1508: The image synthesizer generates, through synchronization with the hardware Vsync signal, a first software Vsync signal and a second software Vsync signal whose frequencies are the second refresh rate.

S1509: The image synthesizer sends the first software Vsync signal to the focus application.

In this embodiment of this application, after generating the first software Vsync signal and the second software Vsync signal, the image synthesizer may send the first software Vsync signal to a choreographer, the choreographer sends the first software Vsync signal to the ViewRootImpl object, and the focus application invokes the ViewRootImpl object to obtain the first software Vsync signal. Therefore, the image synthesizer sends the first software Vsync signal to the focus application through the foregoing process.

S1510: The focus application draws and renders the motion-effect image based on the first software Vsync signal.

S1511: The focus application sends a drawn and rendered motion-effect image to the image synthesizer.

After obtaining the first software Vsync signal, the focus application may draw the motion-effect image based on the first software Vsync signal, and invoke, after the motion-effect image is drawn, a hardware rendering thread to send a rendering instruction. The hardware rendering thread then sends the rendering instruction to a rendering proxy object. The rendering proxy object invokes a GPU based on the rendering instruction to render a drawn image. Therefore, the focus application draws and renders the motion-effect image based on the first software Vsync signal through the foregoing process.

After invoking the GPU based on the rendering instruction to render the drawn image, the rendering proxy object stores a rendered motion-effect image into a Buffer Queue. The Buffer Queue stores the rendered motion-effect image into a BLASTBufferQueue. The image synthesizer may read the rendered motion-effect image from the BLASTBufferQueue each time the image synthesizer needs to synthesize the motion-effect image. Therefore, the focus application sends the drawn and rendered motion-effect image to the image synthesizer through the foregoing process.

S1512: The image synthesizer synthesizes the drawn and rendered motion-effect image based on the second software Vsync signal.

S1513: The image synthesizer sends a synthesized motion-effect image to the hardware composer.

S1514: The hardware composer sends the synthesized motion-effect image to the display drive.

S1515: The display drive sends the synthesized motion-effect image to the display driver chip.

S1516: The display driver chip controls a display screen based on the hardware Vsync signal to display the synthesized motion-effect image.

It should be noted that for specific implementation processes of S1512 to S1516, refer to the foregoing specific implementation processes of S713 to S717. To avoid repetition, details are not described herein again.

Figure 16:
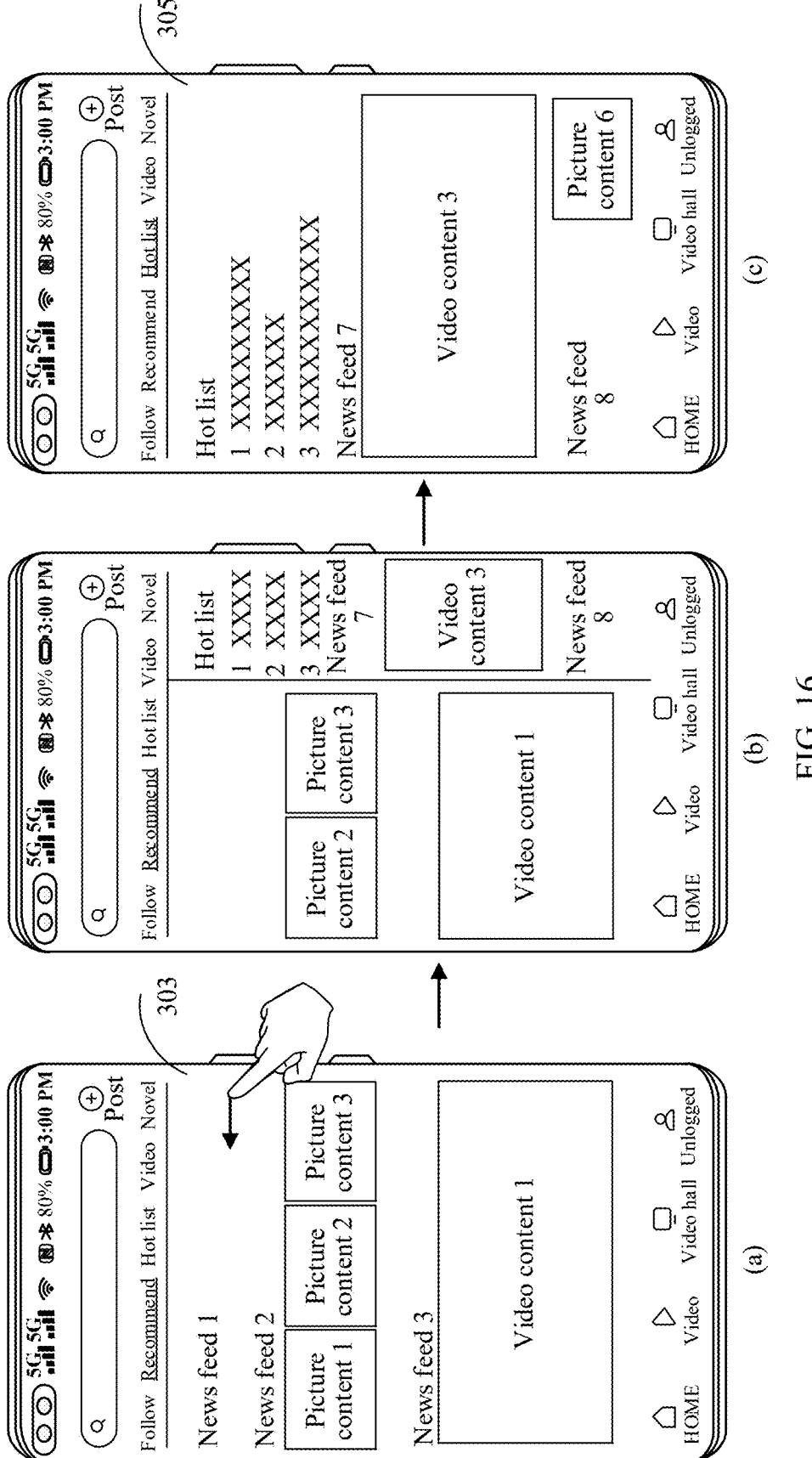
FIG. 16 is a schematic diagram of interface switching in a ViewPage switching scenario according to an embodiment of this application.

An example in which a target application is a news browsing type application and a motion-effect scenario is a ViewPage switching scenario is used. For example, the electronic device may display a first recommendation interface 303 shown in (a) in FIG. 16.

The user may perform a slide-left operation on the first recommendation interface 303. The slide-left operation may be referred to as a first operation. The electronic device may display a hot-list interface 305 shown in (c) in FIG. 16 in response to the slide-left operation after receiving the slide-left operation of the user on the first recommendation interface 303 and detects that the slide-left operation on the first recommendation interface 303 on the screen of the electronic device ends. The hot-list interface 305 includes hot news messages such as a news message in a hot list 1, a news message in a hot list 2, and a news message in a hot list 3. Some news messages that are ranked top in recent click-through rates are displayed in the hot-list interface 305. In addition, the hot-list interface 305 may further include other news messages such as a news feed 7, video content 3 corresponding to the news feed 7, a news feed 9, and picture content 6 corresponding to the news feed 9.

In the ViewPage switching scenario of the news browsing type application, to bring better use experience to the user, the electronic device displays a motion-effect image after a finger of the user slides left and the slide operation on the screen of the electronic device ends. The motion-effect image in the ViewPage switching scenario of the news browsing type application may be an image displayed in a process of switching from the first recommendation interface 303 to the hot-list interface 305 after the user performs the slide-left operation on the first recommendation interface 303. In the ViewPage switching scenario of the news browsing type application, the first recommendation interface 303 may be referred to as a first interface, and the hot-list interface 305 may be referred to as a second interface. In other words, in the ViewPage switching scenario of the target application, the first interface is an interface displayed by the target application before the slide operation, and the second interface is an interface displayed by the target application after the slide operation.

Using the ViewPage switching scenario of the news browsing type application as an example, a plurality of frames of motion-effect images that are successively displayed actually represent a process in which an image in the hot-list interface 305 is gradually displayed on the display screen from left to right and an image in the first recommendation interface 303 gradually disappears from the display screen from left to right. Specifically, a ViewPage switching motion-effect starts when the user slides left in the first recommendation interface 303, the image in the hot-list interface 305 is gradually displayed on the display screen from left to right, and the image in the first recommendation interface 303 gradually disappears from the display screen from left to right. The ViewPage switching motion-effect ends when the image in the hot-list interface 305 is completely displayed on the display screen and the image in the first recommendation interface 303 completely disappears from the display screen. For example, in the ViewPage switching scenario of the news browsing type application, one frame of motion-effect image may be an image shown in (b) in FIG. 16, and the image includes a part of content in the first recommendation interface 303 and a part of content in the hot-list interface 305.

It should be noted that the refresh rate adjustment method in the ViewPage switching scenario may be similar to the specific implementation in the slide-up or slide-down scenario of the interface in the target application. To avoid repetition, details are not described herein again.

In addition, in the ViewPage switching scenario of the target application, the focus application (namely, the target application) may send some relevant parameters to the motion-effect management module, to generate a corresponding motion-effect curve based on the relevant parameters. In addition, in the ViewPage switching scenario of the target application, the motion-effect curve may be any motion-effect curve shown in FIG. 8 or any motion-effect curve other than the motion-effect curves shown in FIG. 8.

Certainly, the ViewPage switching scenario in this embodiment of this application may alternatively be slide-right or the like in addition to the foregoing slide-left. That is, in the interface slide scenario of the target application, the first operation is a slide operation on the interface of the target application, and the slide operation may include a slide-left operation or a slide-right operation.

In the foregoing several manners, a motion-effect image display event is triggered by inputting, by the user, the first operation in the first interface displayed by the electronic device. In some other embodiments, a display trigger event may alternatively include: a motion-effect image display event triggered by receiving, by the electronic device in a process in which the electronic device displays the first interface, a notification message pushed by an application.

That is, in the process in which the electronic device displays the first interface, the user may not input the first operation in the first interface. Instead, when the application receives the pushed notification message, the notification message may trigger the motion-effect image display event, so that the electronic device receives the display trigger event.

In addition, in this embodiment of this application, the motion-effect scenario may alternatively be a window motion-effect scenario, an input method pop-up scenario, an input method hidden scenario, and the like.

Figure 17:
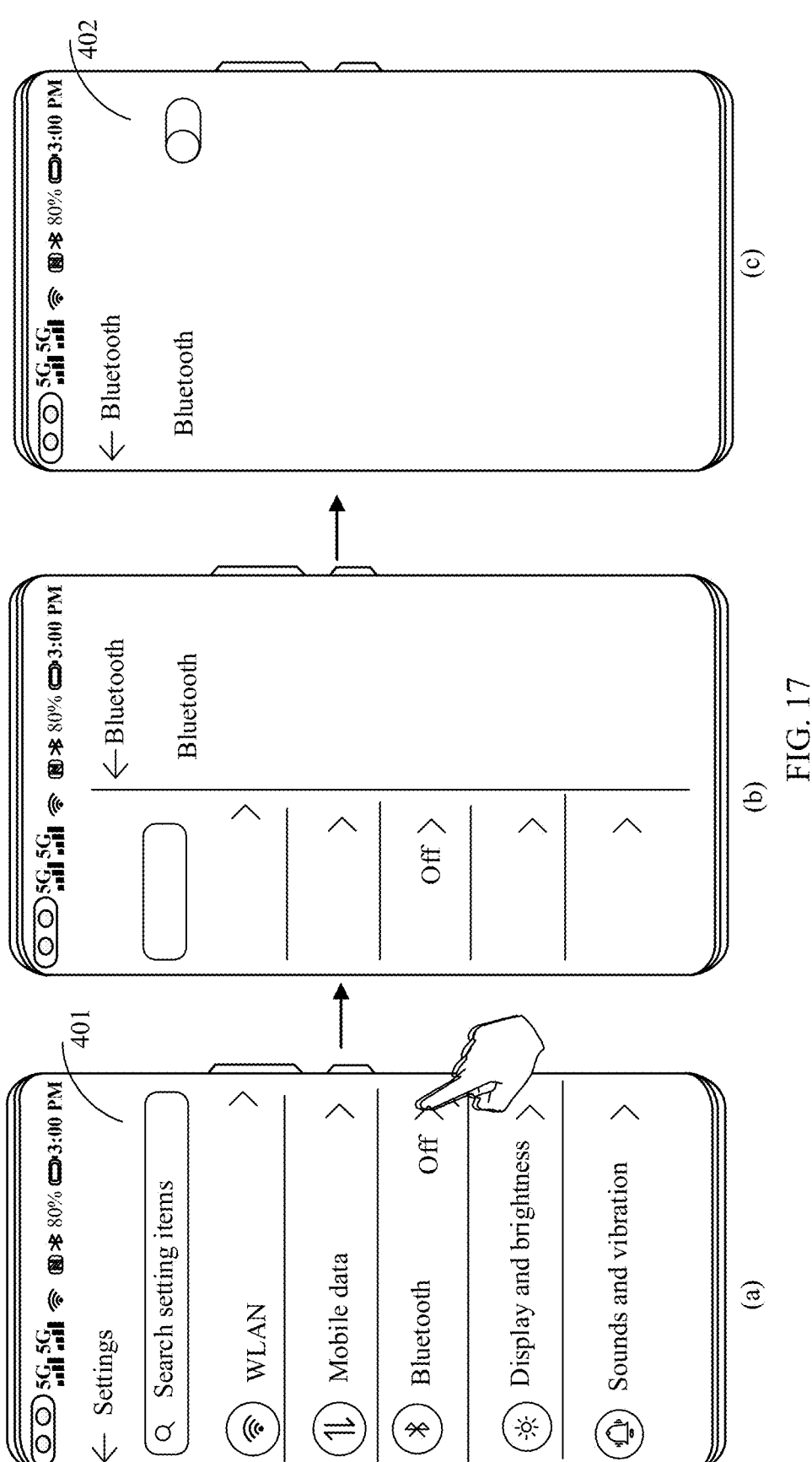
FIG. 17 is a schematic diagram of interface switching in a window motion-effect scenario according to an embodiment of this application.

An example in which the target application is a Settings application and the motion-effect scenario is the window motion-effect scenario is used. For example, the electronic device may display a main setting interface 401 shown in (a) in FIG. 17. The main setting interface 401 includes a setting item search box and a plurality of setting items such as a WLAN setting item, a mobile data setting item, a Bluetooth setting item, a display and brightness setting item, and a sounds and vibration setting item.

The user may perform a touch operation on the Bluetooth setting item. The touch operation in this case may be referred to as a first operation. For example, the first operation in this case may be a tap operation on the Bluetooth setting item in the main setting interface 401. In this case, the electronic device receives the touch operation of the user on the Bluetooth setting item in the main setting interface 401, and may display a Bluetooth setting interface 402 shown in (c) in FIG. 17 in response to the touch operation after the finger of the user leaves the screen of the electronic device.

In the window motion-effect scenario of the Settings application, a corresponding motion-effect image is an image displayed in a process of switching from the main setting interface 401 to the Bluetooth setting interface 402 after the user taps the Bluetooth setting item in the main setting interface 401. In the window motion-effect scenario of the Settings application, the main setting interface 401 of the Settings application may be referred to as a first interface, and the Bluetooth setting interface 402 corresponding to the Bluetooth setting item may be referred to as a second interface.

Using the window motion-effect scenario of the Settings application as an example, a plurality of frames of motion-effect images that are successively displayed actually represent a process in which an image in the Bluetooth setting interface 402 is gradually displayed on the display screen from left to right and an image in the main setting interface 401 gradually disappears from the display screen from left to right. Specifically, a window motion-effect starts after the user performs the tap operation on the Bluetooth setting item in the main setting interface 401 and the finger of the user leaves the screen of the electronic device. The image in the Bluetooth setting interface 402 is gradually displayed on the display screen from left to right, and the image in the main setting interface 401 gradually disappears from the display screen from left to right. The window motion-effect ends when the image in the Bluetooth setting interface 402 is completely displayed on the display screen and the image in the main setting interface 401 completely disappears from the display screen. For example, in the window motion-effect scenario of the Settings application, one frame of motion-effect image may be an image shown in (b) in FIG. 17, and the image includes a part of content in the main setting interface 401 and a part of content in the Bluetooth setting interface 402.

In addition, in the window motion-effect scenario, a window manager may send some relevant parameters to the motion-effect management module, to generate a corresponding motion-effect curve based on the relevant parameters. In addition, in the window motion-effect scenario, the motion-effect curve may be any motion-effect curve shown in FIG. 8 or any motion-effect curve other than the motion-effect curves shown in FIG. 8.

Certainly, a tap operation on another setting item in the plurality of setting items in the main setting interface 401 may also be referred to as the first operation. In other words, the first operation is a tap operation on a target setting item in the main setting interface 401, and the target setting item may be any one of the plurality of setting items included in the main setting interface 401. Correspondingly, the second interface is a setting interface corresponding to the target setting item.

For ease of understanding, a process of interaction between modules in a refresh rate adjustment method in a window motion-effect scenario according to an embodiment of this application is described in detail below with reference to FIG. 18.

Figure 18:
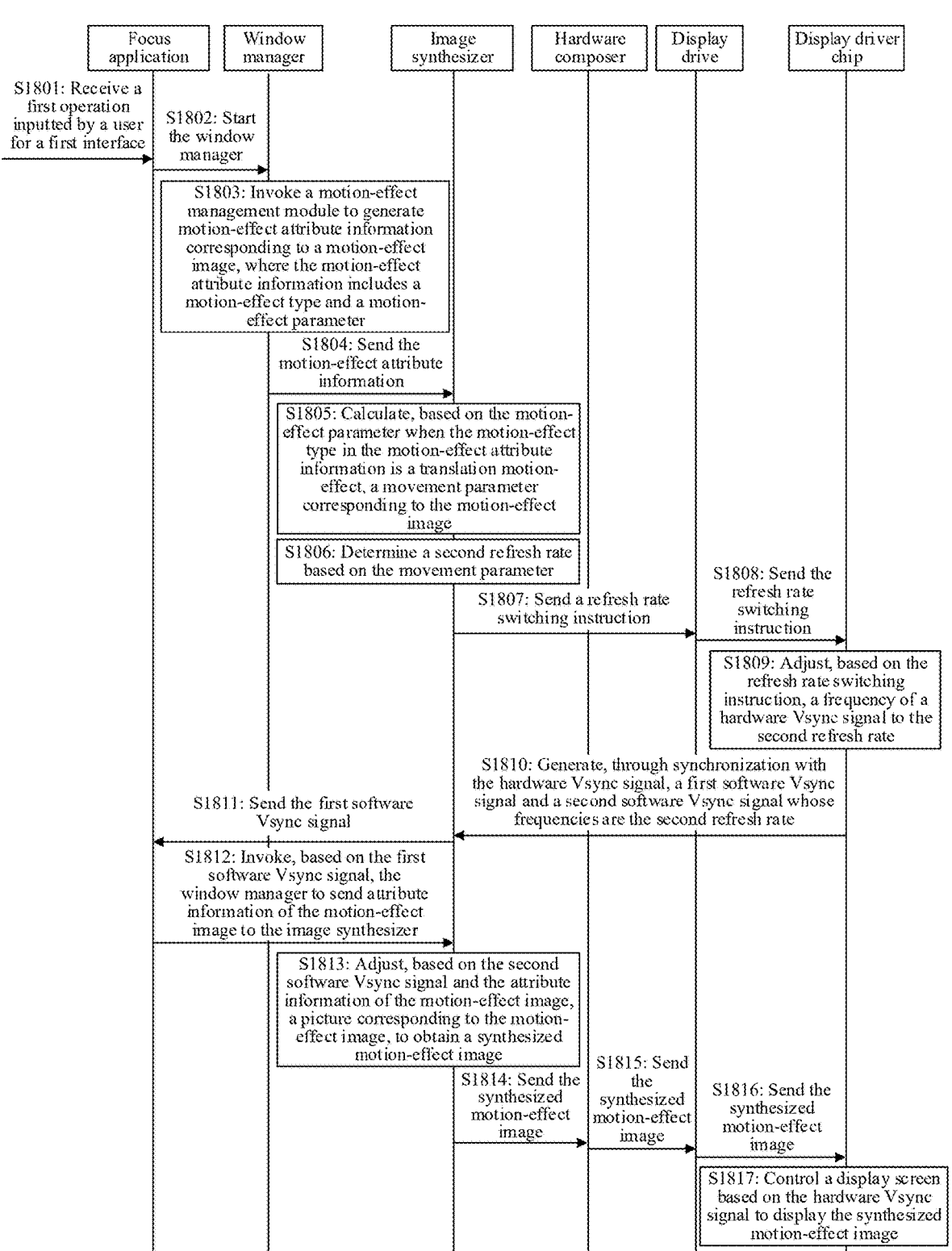
FIG. 18 is an architectural flowchart of a refresh rate adjustment method in a window motion-effect scenario according to an embodiment of this application.

For example, FIG. 18 is an architectural flowchart of the refresh rate adjustment method in the window motion-effect scenario according to this embodiment of this application. Refer to FIG. 18. An electronic device may include a focus application, a window manager, an image synthesizer, a hardware composer, a display drive, and a display driver chip. In a window motion-effect scenario of a Settings application, the focus application in this case is a target application, and the target application may be the Settings application. The refresh rate adjustment method may specifically include the following steps:

S1801: The focus application receives a first operation inputted by a user for a first interface.

In some embodiments, when the electronic device displays the first interface at a first refresh rate, if the user inputs the first operation for the first interface displayed on the electronic device, the focus application may receive the first operation inputted by the user for the first interface.

The first operation may trigger a motion-effect image display event.

It may be understood that for a process in which the focus application receives the first operation inputted for the first interface, refer to the foregoing execution processes of S601 to S607.

S1802: The focus application starts the window manager in response to the first operation after the first operation on a screen of the electronic device ends.

S1803: The window manager invokes a motion-effect management module to generate motion-effect attribute information corresponding to a motion-effect image, where the motion-effect attribute information includes a motion-effect type and a motion-effect parameter.

S1804: The window manager sends the motion-effect attribute information to the image synthesizer.

In the window motion-effect scenario, the focus application starts the window manager in response to the first operation inputted by the user. Then, the window manager invokes the motion-effect management module to generate the motion-effect attribute information corresponding to the motion-effect image. Next, the window manager sends the motion-effect attribute information to the image synthesizer.

The motion-effect attribute information includes a view object, the motion-effect type, and the motion-effect parameter. The motion-effect parameter may include motion-effect start information, motion-effect end information, a motion-effect curve, and motion-effect duration.

S1805: The image synthesizer calculates, based on the motion-effect parameter when determining that the motion-effect type in the motion-effect attribute information is a translation motion-effect, a movement parameter corresponding to the motion-effect image.

S1806: The image synthesizer determines a second refresh rate based on the movement parameter.

S1807: The image synthesizer sends a refresh rate switching instruction to the display drive.

S1808: The display drive sends the refresh rate switching instruction to the display driver chip.

S1809: The display driver chip adjusts, based on the refresh rate switching instruction, a frequency of a hardware Vsync signal to the second refresh rate.

S1810: The image synthesizer generates, through synchronization with the hardware Vsync signal, a first software Vsync signal and a second software Vsync signal whose frequencies are the second refresh rate.

It should be noted that for specific implementation processes of S1805 to S1810, refer to the foregoing specific implementation processes of S704 to S709. To avoid repetition, details are not described herein again.

S1811: The image synthesizer sends the first software Vsync signal to the focus application.

After generating the first software Vsync signal and the second software Vsync signal, the image synthesizer may send the first software Vsync signal to a choreographer, the choreographer sends the first software Vsync signal to a ViewRootImpl object, and the focus application invokes the ViewRootImpl object to obtain the first software Vsync signal. Therefore, the image synthesizer sends the first software Vsync signal to the focus application through the foregoing process.

S1812: The focus application invokes, based on the first software Vsync signal, the window manager to send attribute information of the motion-effect image to the image synthesizer.

S1813: The image synthesizer adjusts, based on the second software Vsync signal and the attribute information of the motion-effect image, a picture corresponding to the motion-effect image, to obtain a synthesized motion-effect image.

In the window motion-effect scenario, the focus application does not draw and render the motion-effect image in real time based on the first software Vsync signal. Instead, the motion-effect image exists in a picture form in this case. The focus application invokes, based on the first software Vsync signal, the window manager to send the attribute information, such as position information and size information, of the motion-effect image to the image synthesizer. The image synthesizer triggers a synthesis process based on the second software Vsync signal, and adjusts, based on the attribute information of the motion-effect image, a position and a size of the picture corresponding to the motion-effect image, to obtain the synthesized motion-effect image.

S1814: The image synthesizer sends the synthesized motion-effect image to the hardware composer.

S1815: The hardware composer sends the synthesized motion-effect image to the display drive.

S1816: The display drive sends the synthesized motion-effect image to the display driver chip.

S1817: The display driver chip controls the display screen based on the hardware Vsync signal to display the synthesized motion-effect image.

It should be noted that for specific implementation processes of S1814 to S1817, refer to the foregoing specific implementation processes of S714 to S717. To avoid repetition, details are not described herein again.

Figure 19:
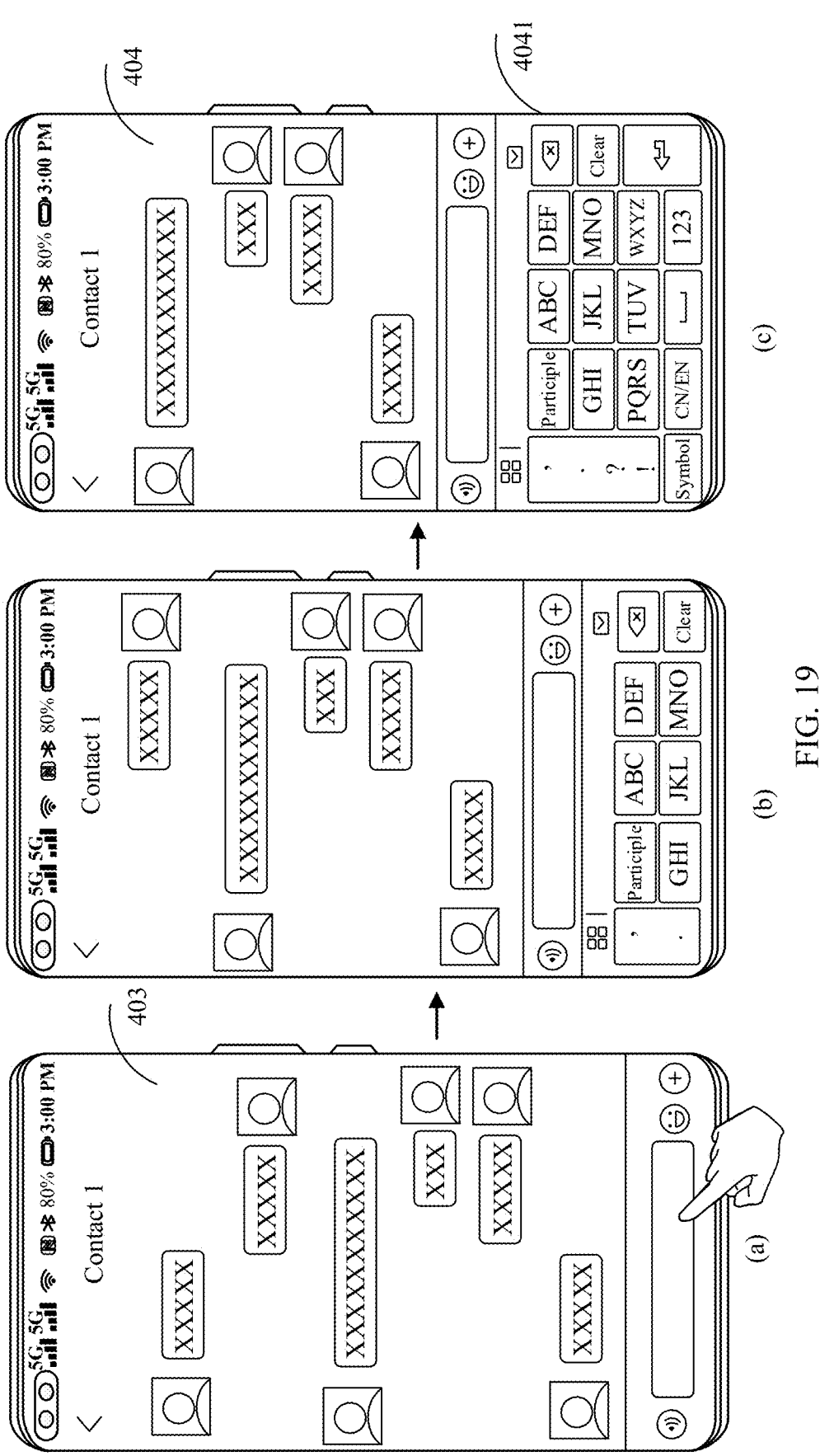
FIG. 19 is a schematic diagram of interface switching in an input method pop-up scenario according to an embodiment of this application.

An example in which the target application is an instant messaging type application and a motion-effect scenario is an input method pop-up scenario is used. For example, the electronic device may display a first chat interface 403 shown in (a) in FIG. 19. The first chat interface 403 includes a chat history between the user and a contact 1, and further includes an input box.

When the user needs to send a new chat message to the contact 1, the user may perform a touch operation on the input box in the first chat interface 403. The touch operation may be referred to as a first operation. For example, the first operation in this case may be a tap operation on the input box in the first chat interface 403. In this case, the electronic device displays a second chat interface 404 shown in (c) in FIG. 19 in response to the touch operation after the electronic device receives the touch operation of the user on the input box in the first chat interface 403 and detects that the touch operation on the input box on the screen of the electronic device ends. The second chat interface 404 includes the chat history between the user and the contact 1 and a pop-up touch keyboard 4041.

In the input method pop-up scenario of the instant messaging type application, to bring better use experience to the user, the electronic device displays a motion-effect image in a pop-up process of the touch keyboard, and the corresponding motion-effect image is an image displayed in a process of switching from the first chat interface 403 to the second chat interface 404 after the user taps the input box in the first chat interface 403 and the finger of the user leaves the screen of the electronic device. In the input method pop-up scenario of the instant messaging type application, the first chat interface 403 may be referred to as a first interface, and the second chat interface 404 may be referred to as a second interface.

Using the input method pop-up scenario of the instant messaging type application as an example, a plurality of frames of motion-effect images that are successively displayed actually represent a process in which the touch keyboard 4041 is gradually displayed on the screen from bottom to top. Specifically, an input method pop-up motion-effect starts after the user taps the input box and the finger of the user leaves the screen of the electronic device, the touch keyboard 4041 is gradually displayed on the screen from bottom to top, and the input method pop-up effect does not end until the touch keyboard 4041 is completely displayed on the screen. For example, in the input method pop-up scenario of the instant messaging type application, one frame of motion-effect image may be an image shown in (b) in FIG. 19, and shows a partial region of the touch keyboard 4041 on the screen.

Certainly, the input method pop-up scenario is not limited to the instant messaging type application, and is applicable to any scenario in which there is an input box and a touch keyboard can pop up by tapping the input box. Therefore, in the input method pop-up scenario, a first interface is an interface including the input box in the target application, the first operation is a tap operation on the input box in the first interface, and a second interface is an interface including the touch keyboard.

A refresh rate adjustment method in the input method pop-up scenario may be applied to an electronic device. The electronic device may include a focus application, an input method manager, an image synthesizer, a hardware composer, a display drive, and a display driver chip. In the input method pop-up scenario, a focus application is a target application.

In the input method pop-up scenario, the focus application starts the input method manager in response to the first operation after the focus application receives the first operation inputted by a user for the first interface and the first operation on a screen of the electronic device ends. The input method manager invokes a motion-effect management module to generate motion-effect attribute information corresponding to a motion-effect image, and sends the motion-effect attribute information to the image synthesizer.

In the input method pop-up scenario, for subsequent processes of calculating a second refresh rate and displaying the motion-effect image, refer to the foregoing specific implementation processes of S1805 to S1817. To avoid repetition, details are not described herein again.

In addition, in the input method pop-up scenario, the input method manager may send some relevant parameters to the motion-effect management module, to generate a corresponding motion-effect curve based on the relevant parameters. In addition, in the input method pop-up scenario, the motion-effect curve may be any motion-effect curve shown in FIG. 8 or any motion-effect curve other than the motion-effect curves shown in FIG. 8.

The foregoing uses the input method pop-up scenario as an example. Certainly, the motion-effect scenario in this embodiment of this application may alternatively be an input method hidden scenario. In the input method hidden scenario, a first interface is an interface including a touch keyboard, and a second interface is an interface including an input box in a target application.

Correspondingly, in the input method hidden scenario, the input method manager may alternatively send some relevant parameters to the motion-effect management module, to generate a corresponding motion-effect curve based on the relevant parameters. In addition, in the input method hidden scenario, the motion-effect curve may be any motion-effect curve shown in FIG. 8 or any motion-effect curve other than the motion-effect curves shown in FIG. 8.

Figure 20:
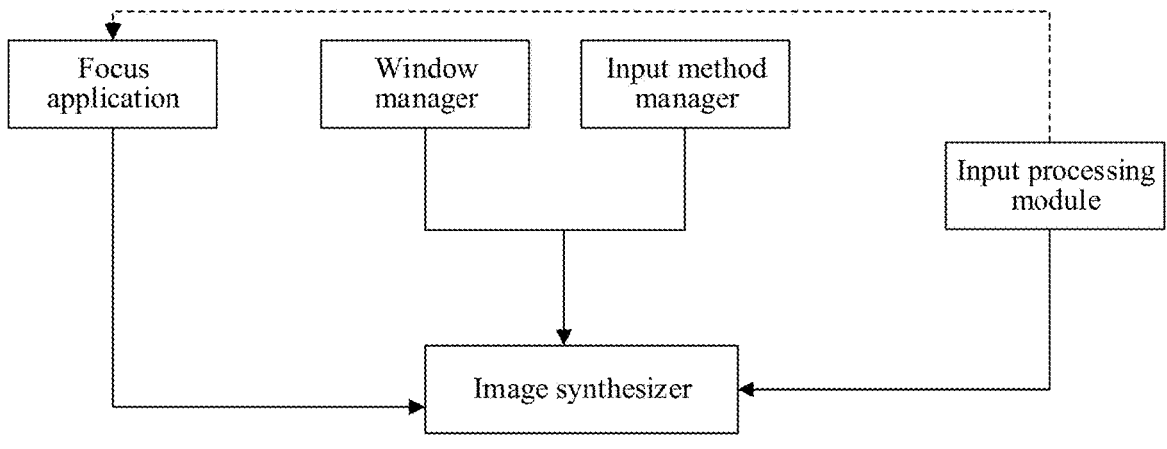
FIG. 20 is a schematic diagram of collecting related information by an image synthesizer for refresh rate decision according to an embodiment of this application.

For example, FIG. 20 is a schematic diagram of collecting related information by an image synthesizer for refresh rate decision according to an embodiment of this application.

As shown in FIG. 20, in an application start scenario, an application exit scenario, an interface slide scenario (a finger leaves a screen after a slide operation), or a ViewPage switching scenario, a focus application may send, to the image synthesizer, motion-effect attribute information corresponding to a motion-effect image, so that the image synthesizer calculates a second refresh rate based on the motion-effect attribute information. For example, the focus application may be a launcher in the application start scenario and the application exit scenario.

In a window motion-effect scenario, a window manager may send, to the image synthesizer, motion-effect attribute information corresponding to a motion-effect image, so that the image synthesizer calculates a second refresh rate based on the motion-effect attribute information. In an input method pop-up scenario and an input method hidden scenario, an input method manager may send, to the image synthesizer, motion-effect attribute information corresponding to a motion-effect image, so that the image synthesizer calculates a second refresh rate based on the motion-effect attribute information.

In a scenario of sliding an interface with a finger not leaving a screen, an input processing module sends, to the image synthesizer, a second slide speed for a user to slide, and the image synthesizer determines a second refresh rate based on the second slide speed.

It should be noted that the image synthesizer has a data interface. The image synthesizer invokes the data interface to obtain the motion-effect attribute information sent by the focus application, the motion-effect attribute information sent by the window manager, the motion-effect attribute information sent by the input method manager, and the second slide speed sent by the input processing module.

In conclusion, it can be learned that in this embodiment of this application, the image synthesizer may determine the second refresh rate for the motion-effect image. In addition, the electronic device in this embodiment of this application further includes a refresh rate control module. In this case, the refresh rate control module and the image synthesizer may jointly determine the second refresh rate for the motion-effect image.

The refresh rate control module is configured to determine, based on a current usage condition of the electronic device, such as whether the focus application is locked at a frame, a low brightness, a low temperature, or a low battery level, a refresh rate interval corresponding to the focus application. The refresh rate interval is an interval from a minimum refresh rate to a maximum refresh rate. When the refresh rate interval corresponding to the focus application changes, the refresh rate control module sends a changed refresh rate interval to the image synthesizer, so that the image synthesizer selects an appropriate second refresh rate based on the refresh rate interval sent by the refresh rate control module. The refresh rate interval is the interval from the minimum refresh rate to the maximum refresh rate, and the second refresh rate determined by the image synthesizer belongs to the refresh rate interval.

For example, when the electronic device is in a low-battery-level scenario and enters a power saving mode, to reduce power consumption of the electronic device, the maximum refresh rate in the refresh rate interval corresponding to the focus application may be set to 60 Hz. In this case, when a motion-effect type is a movement motion-effect and a movement parameter meets a preset condition, a second motion-effect image is still displayed at a second refresh rate less than or equal to 60 Hz.

The scenarios in which the refresh rate may be increased to display the motion-effect image according to embodiments of this application are described above with reference to FIG. 3 to FIG. 20. In the following several scenarios in embodiments of this application, a motion-effect image is displayed by not increasing a refresh rate.

Figure 21:
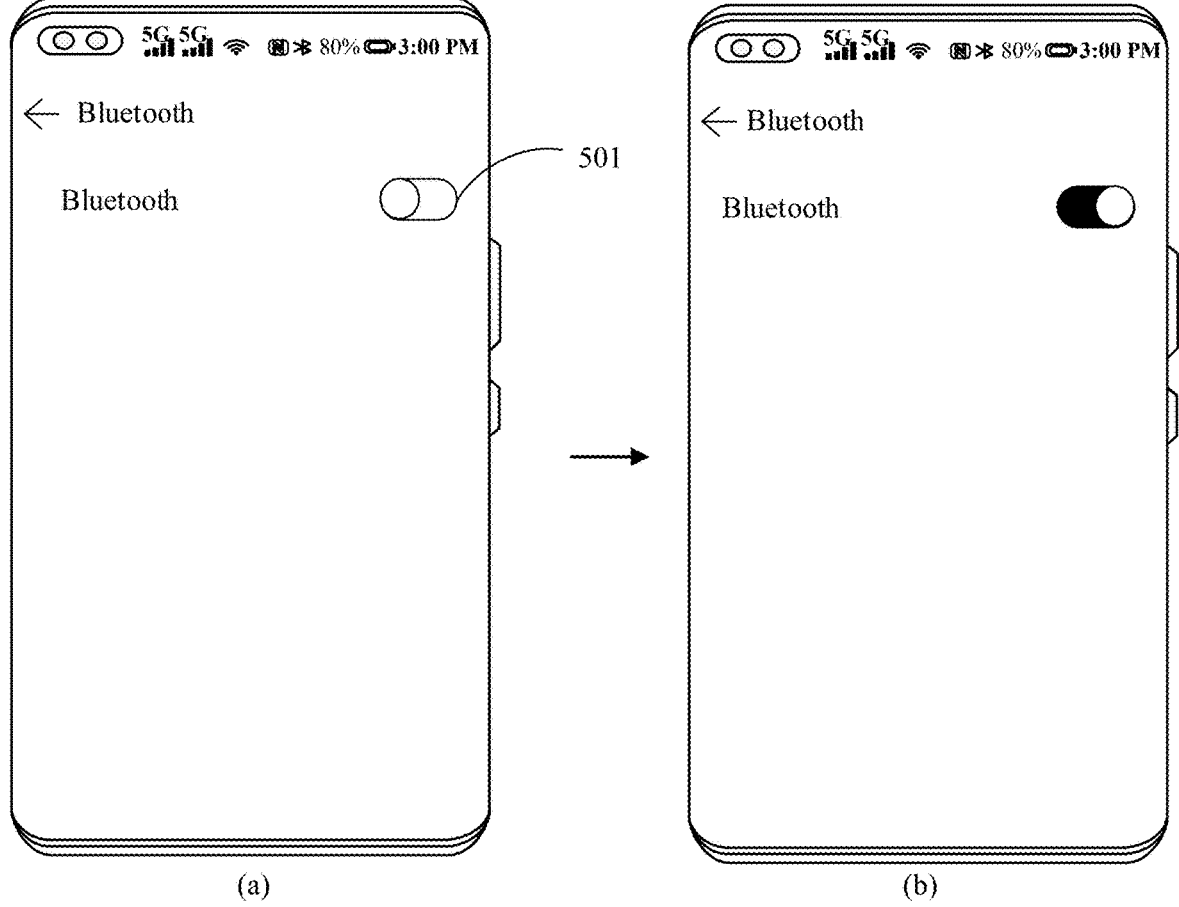
FIG. 21 is a schematic diagram of an interface for displaying a motion-effect image at a low refresh rate according to an embodiment of this application.

For an interface shown in (a) in FIG. 21, when a user wants to turn on a Bluetooth switch, the user may perform a touch operation, for example, a tap operation, on the Bluetooth switch 501. After the user taps the Bluetooth switch 501 and a finger of the user leaves a screen of an electronic device, the electronic device starts to display a motion-effect image that appears in a process in which the Bluetooth switch 501 changes from an off state to an on state. The electronic device may display an interface shown in (b) in FIG. 21 after the display of the motion-effect image is completed. In this embodiment of this application, the motion-effect image in the process in which the Bluetooth switch 501 changes from the off state to the on state is still displayed by the electronic device at a low refresh rate (for example, 60 Hz), instead of being displayed by increasing the refresh rate.

Figure 22:
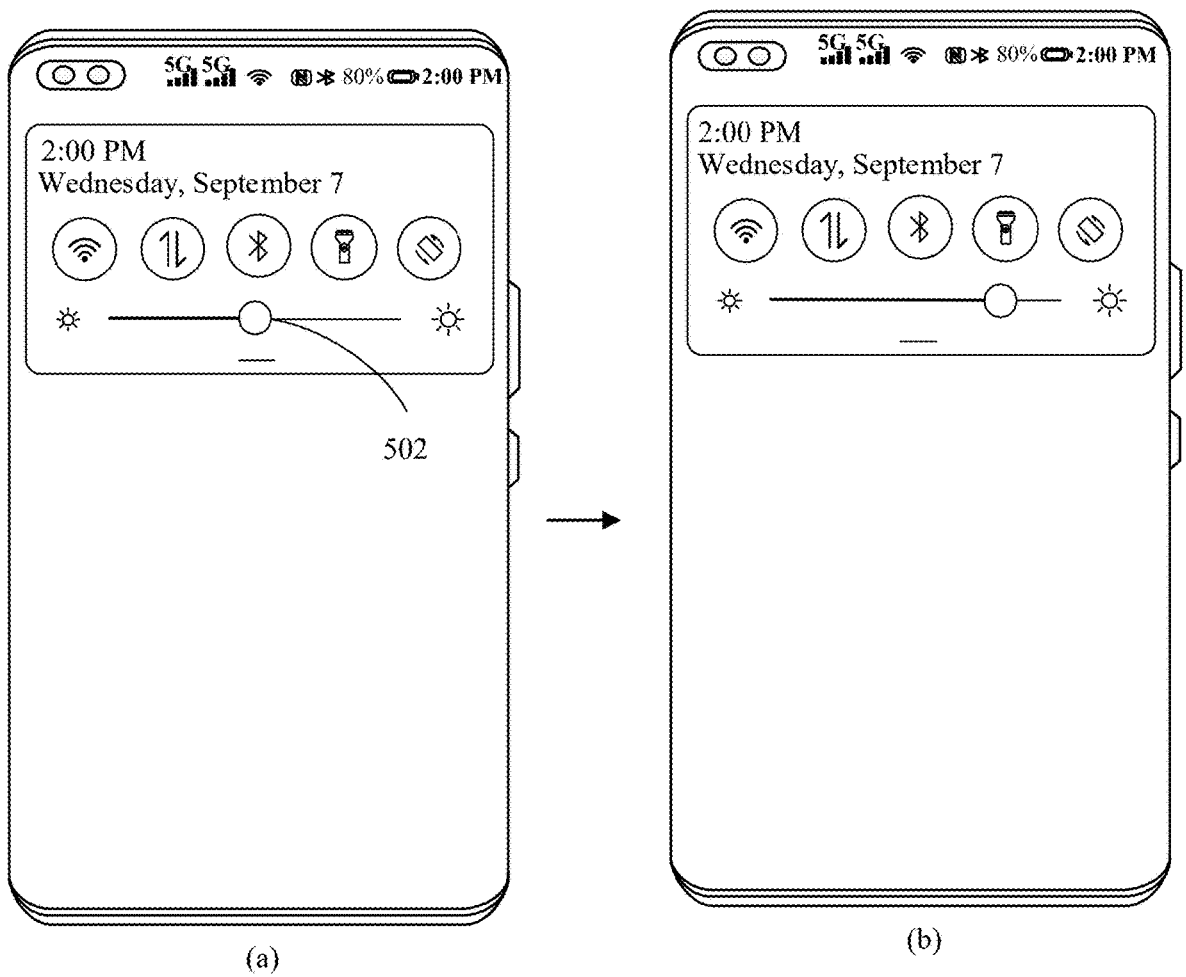
FIG. 22 is another schematic diagram of an interface for displaying a motion-effect image at a low refresh rate according to an embodiment of this application.

For an interface shown in (a) in FIG. 22, when a user wants to adjust display brightness of an electronic device, the user may perform a touch operation, for example, a slide-right operation, on a brightness adjustment switch 502. In a process in which the user slides the brightness adjustment switch 502 right, the electronic device may display a motion-effect image. After a finger of the user leaves a screen of the electronic device, the electronic device may display an interface shown in (b) in FIG. 22 based on a position at which the finger of the user leaves the touched brightness adjustment switch 502. In a process in which the finger of the user always touches the screen of the electronic device and continuously slides the brightness adjustment switch 502, the motion-effect image displayed by the electronic device is a motion-effect image in a process in which the brightness adjustment switch 502 is adjusted from a state shown in (a) in FIG. 22 to a state shown in (b) in FIG. 22.

In this case, the electronic device still displays the motion-effect image at a low refresh rate (for example, 60 Hz) instead of increasing the refresh rate to display the motion-effect image.

In addition, for a WLAN switch, a mobile data switch, a Bluetooth switch, a flashlight switch, and the like in a status bar, after the user taps the corresponding switch and the finger leaves the screen of the electronic device, a motion-effect image corresponding to the switch may be controlled to be still displayed at a low refresh rate (for example, less than or equal to 60 Hz) in a process of changing from an on state to an off state or from an off state to an on state.

For the first operation inputted by the user on the first interface, when the first operation does not trigger the motion-effect image, that is, the interface displayed by the electronic device remains unchanged after the first operation is inputted, the refresh rate is not increased either.

For example, FIG. 23 is a flowchart of a refresh rate adjustment method according to an embodiment of this application. The refresh rate adjustment method may be applied to an electronic device. The electronic device may support a first refresh rate, a second refresh rate, and a third refresh rate. The refresh rate adjustment method may specifically include the following steps:

S2301: The electronic device displays a first interface at the first refresh rate.

Figure 3:
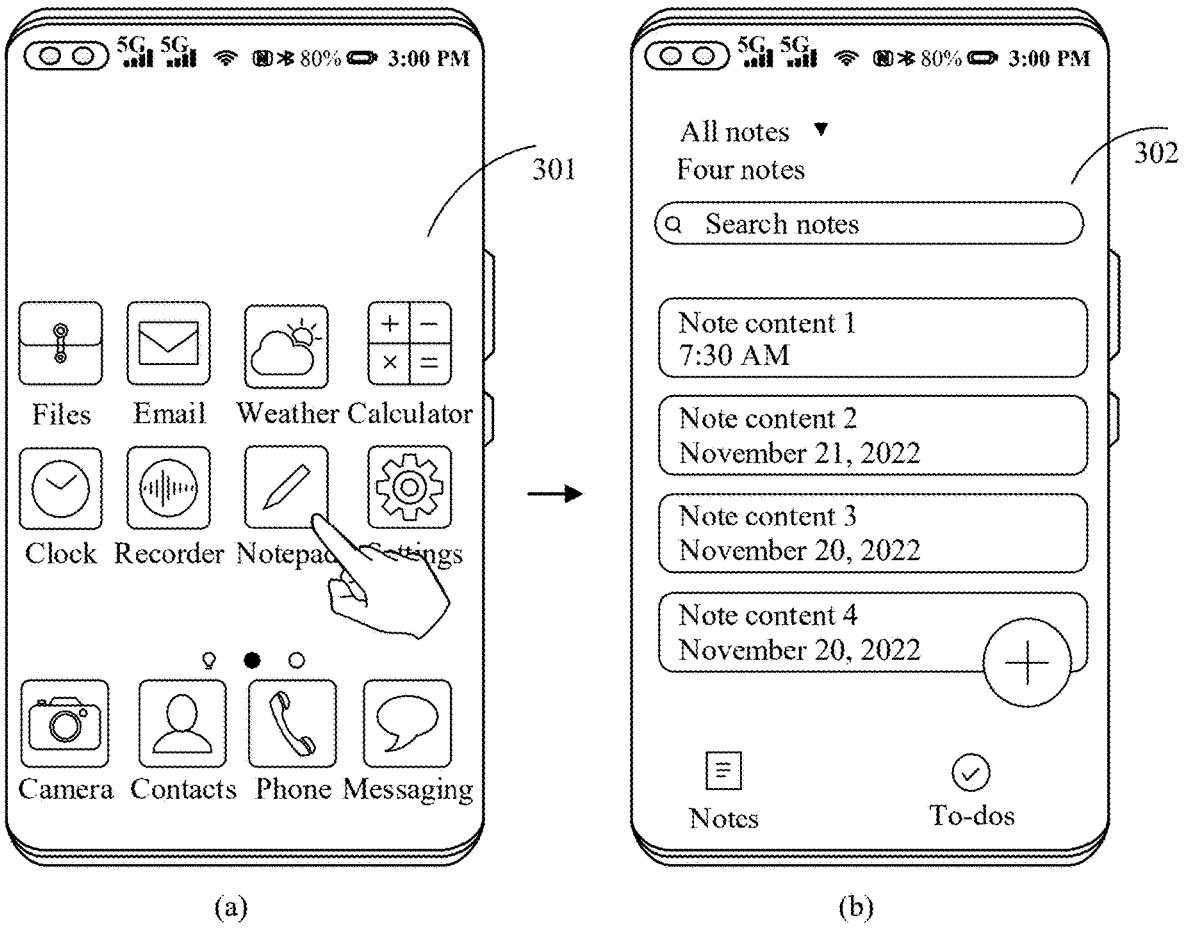
FIG. 3 is a schematic diagram of interface switching in an application start scenario according to an embodiment of this application.

In some embodiments, as shown in (a) in FIG. 3, the first interface may be a desktop 301, and the first refresh rate in this case is a preset refresh rate of the desktop. As shown in (a) in FIG. 13, the first interface may be an interface 302, and the first refresh rate in this case is a preset refresh rate of a Notepad application. As shown in (a) in FIG. 14, the first interface may be a first recommendation interface 303, and the first refresh rate in this case is a preset refresh rate of a news browsing type application.

S2302: The electronic device receives a first operation inputted by a user for the first interface.

For this step, refer to the foregoing specific implementation process of S701 or S1801. Details are not described herein again.

S2303: The electronic device displays a motion-effect image at the second refresh rate in response to the first operation after the first operation on a screen of the electronic device ends.

For this step, refer to the foregoing specific implementation processes of S702 to S717 or the specific implementation processes of S1802 to S1817. Details are not described herein again.

S2304: The electronic device displays a second interface at the third refresh rate after the display of the motion-effect image is completed, where the second refresh rate is greater than the first refresh rate and the third refresh rate.

In some embodiments, as shown in (b) in FIG. 3, the second interface may be an interface 302, and the third refresh rate in this case is the preset refresh rate of the Notepad application. As shown in (c) in FIG. 13, the second interface may be a desktop 301, and the third refresh rate in this case is the preset refresh rate of the desktop. As shown in (c) in FIG. 14, the second interface may be a second recommendation interface 304, and the third refresh rate in this case is the preset refresh rate of the news browsing type application.

Therefore, a motion-effect image whose motion-effect type is a translation motion-effect and whose movement parameter meets a preset condition is displayed at a second refresh rate greater than the first refresh rate and the third refresh rate, that is, a refresh rate of the motion-effect image is improved, thereby improving a display effect of the motion-effect image, and alleviating problems such as jittering and smearing of the motion-effect image, to improve use experience of the user. However, refresh rates for displaying a motion-effect image whose motion-effect type is a transparency motion-effect, a color motion-effect, or a rotation motion-effect and a motion-effect image whose motion-effect type is the translation motion-effect but whose movement parameter does not meet the preset condition are not increased, to reduce power consumption caused when these motion-effect images are displayed at an unnecessarily high refresh rate, thereby reducing power consumption of the electronic device.

The refresh rate adjustment method provided in embodiments of this application is described above with reference to FIG. 3 to FIG. 23, and an apparatus provided in embodiments of this application for performing the foregoing method is described below. FIG. 24 is a schematic structural diagram of a refresh rate adjustment apparatus according to an embodiment of this application. The refresh rate adjustment apparatus may be the electronic device in embodiments of this application or a chip or a chip system in the electronic device.

As shown in FIG. 24, the refresh rate adjustment apparatus 2400 includes: a display unit 2401 and a processing unit 2402. The display unit 2401 is configured to support the refresh rate adjustment apparatus 2400 in performing the foregoing display step. The processing unit 2402 is configured to support the refresh rate adjustment apparatus 2400 in performing the foregoing processing step.

In a possible implementation, the refresh rate adjustment apparatus 2400 further includes a storage unit 2403. The storage unit 2403 is connected to the processing unit 2402 through a line. The storage unit 2403 may include one or more memories, and the memory may be a component in one or more devices or circuits that is configured to store a program or data. The storage unit 2403 may exist independently, and is connected to the processing unit 2402 through a communication bus. The storage unit 2403 may alternatively be integrated with the processing unit 2402.

The storage unit 2403 may store computer-executable instructions for the method in the electronic device, so that the processing unit 2402 performs the method in the foregoing embodiments. The storage unit 2403 may be a register, a cache, a random access memory (random access memory, RAM), or the like, and the storage unit 2403 may be integrated with the processing unit 2402. The storage unit 2403 may be a read-only memory (read-only memory, ROM) or another type of static storage device that may store static information and instructions, and the storage unit 2403 may be independent of the processing unit 2402.

FIG. 25 is a schematic structural diagram of a chip according to an embodiment of this application. As shown in FIG. 25, the chip 2500 includes one or more than two (including two) processors 2501, a communication line 2502, and a communication interface 2503. Optionally, the chip 2500 further includes a memory 2504.

In some implementations, the memory 2504 stores the following element: an executable module, a data structure, a subset thereof, or an extended set thereof.

The method described in the foregoing embodiments of this application may be applied to the processor 2501 or implemented by the processor 2501. The processor 2501 may be an integrated circuit chip having a signal processing capability. In an implementation process, the steps in the foregoing method may be implemented by a hardware integrated logic circuit in the processor 2501, or by using instructions in a form of software. The processor 2501 may be a general-purpose processor (for example, a microprocessor or a conventional processor), a digital signal processor, an application specific integrated circuit (application specific integrated circuit, ASIC), a field-programmable gate array (field-programmable gate array, FPGA) or another programmable logic device, a discrete gate, a transistor logic device, or a discrete hardware component. The processor 2501 may implement or perform the methods, steps, and logical block diagrams disclosed in embodiments of this application.

The steps of the methods disclosed with reference to embodiments of this application may be directly performed and completed by a hardware decoding processor, or may be performed and completed by a combination of hardware and a software module in the decoding processor. The software module may be located in a mature storage medium in the field such as a random access memory, a read-only memory, a programmable read-only memory, or an electrically erasable programmable read-only memory (electrically erasable programmable read only memory, EEPROM). The storage medium is located in the memory 2504, and the processor 2501 reads information in the memory 2504 and implements the steps of the foregoing methods in combination with the hardware of the processor 2501.

The processor 2501, the memory 2504, and the communication interface 2503 may communicate via the communication line 2502.

In the foregoing embodiment, the instructions executed by the processor stored in the memory may be implemented in a form of a computer program product. The computer program product may be pre-written into the memory, or may be downloaded and installed in the memory in a form of software.

An embodiment of this application further provides a computer program product, including one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to the computer or a data storage device, such as a server or a data center, including one or more usable media. For example, the usable medium may include a magnetic medium (for example, a floppy disk, a hard disk, or a magnetic tape), an optical medium (for example, a digital versatile disc (digital versatile disc, DVD)), or a semi-conductive medium (for example, a solid state disk (solid state disk, SSD)).

An embodiment of this application provides an electronic device. The electronic device includes a processor and a memory. The memory is configured to store a computer program. The processor is configured to execute the computer program to perform the foregoing device cooperative control method performed by a first electronic device or a second electronic device.

An embodiment of this application further provides a computer-readable storage medium. All or some of the methods in the foregoing embodiments may be implemented by software, hardware, firmware, or any combination thereof. The computer-readable medium may include a computer storage medium and a communication medium, and may further include any medium that can transmit a computer program from one place to another. The storage medium may be any target medium accessible to a computer.

In a possible design, the computer-readable medium may include a compact disc read-only memory (compact disc read-only memory, CD-ROM), a RAM, a ROM, an EEPROM, or another optical disc memory. The computer-readable medium may include a magnetic disk memory or another magnetic disk storage device. In addition, any connection line may also be appropriately referred to as a computer-readable medium. For example, if software is transmitted from a website, a server, or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in definition of the medium. A magnetic disk and an optical disc used herein include a compact disc (CD), a laser disc, an optical disc, a DVD, a floppy disk, and a blue ray disc, where the magnetic disk generally reproduces data in a magnetic manner, and the optical disc reproduces data optically by using laser.

Embodiments of this application are described with reference to the flowcharts and/or block diagrams of the method, the device (system), and the computer program product according to embodiments of this application. It should be understood that each procedure and/or block in the flowcharts and/or block diagrams and a combination of procedures and/or blocks in the flowcharts and/or block diagrams can be implemented by computer program instructions. These computer program instructions may be provided for a general-purpose computer, a special-purpose computer, an embedded processor, or a processing unit of any other programmable data processing device to generate a machine, so that the instructions executed by the computer or the processing unit of any other programmable data processing device generate an apparatus for implementing a specific function in one or more procedures in the flowcharts and/or in one or more blocks in the block diagrams.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The invention claimed is:

1. A refresh rate adjustment method, wherein the method is applied to an electronic device, and comprises:
displaying, by the electronic device, a first interface at a first refresh rate;
receiving, by the electronic device, a first operation inputted by a user for the first interface;
displaying, by the electronic device, a motion-effect image at a second refresh rate in response to the first operation after the first operation on a screen of the electronic device ends; and displaying, by the electronic device, a second interface at a third refresh rate after the display of the motion-effect image is completed, wherein
the motion-effect image is an image displayed in a process in which the electronic device switches from the first interface to the second interface; and the second refresh rate is greater than the first refresh rate and the third refresh rate.

2. The method according to claim 1, wherein the electronic device comprises a target application; and the first interface is a desktop of the electronic device, and the second interface is an interface displayed after the target application is started; or the first interface is a desktop of the target application, and the second interface is a desktop of the electronic device.

3. The method according to claim 1, wherein the electronic device comprises a target application, the first operation is a slide operation on an interface of the target application, and the slide operation comprises any one of a slide-up operation, a slide-down operation, a slide-left operation, and a slide-right operation; and
the first interface is an interface displayed by the target application before the slide operation, and the second interface is an interface displayed by the target application after the slide operation.

4. The method according to claim 1, wherein the electronic device comprises a target application, and the target application is a Settings application; and
the first interface is a main setting interface of the Settings application, and the main setting interface comprises a plurality of setting items; the first operation is a tap operation on a target setting item in the main setting interface, and the target setting item is any one of the plurality of setting items; and the second interface is a setting interface corresponding to the target setting item.

5. The method according to claim 1, wherein the electronic device comprises a target application; and
the first interface is an interface comprising an input box in the target application, the first operation is a tap operation on the input box in the first interface, and the second interface is an interface comprising a touch keyboard; or
the first interface is an interface comprising a touch keyboard, and the second interface is an interface comprising an input box in the target application.

6. The method according to claim 1, wherein the displaying, by the electronic device, a motion-effect image at a second refresh rate in response to the first operation comprises:
generating, by the electronic device in response to the first operation, motion-effect attribute information corresponding to the motion-effect image, wherein the motion-effect attribute information comprises a motion-effect type and a motion-effect parameter;
calculating, by the electronic device based on the motion-effect parameter when the motion-effect type is a translation motion-effect, a movement parameter corresponding to the motion-effect image;
determining, by the electronic device, the second refresh rate based on the movement parameter; and
displaying, by the electronic device, the motion-effect image at the second refresh rate, wherein
the second refresh rate is greater than the first refresh rate and the third refresh rate when the movement parameter meets a preset condition.

7. The method according to claim 6, wherein when the motion-effect type is the translation motion-effect, the motion-effect parameter comprises a motion-effect start position, a motion-effect end position, a motion-effect curve, and motion-effect duration; and the calculating, by the electronic device based on the motion-effect parameter, a movement parameter corresponding to the motion-effect image comprises:

calculating, by the electronic device based on a distance between the motion-effect end position and the motion-effect start position, a movement distance corresponding to the motion-effect image; and when the movement distance is greater than a first preset distance, calculating, by the electronic device based on at least one of the motion-effect start position, the motion-effect end position, the motion-effect curve, and the motion-effect duration, a movement speed corresponding to the motion-effect image.

8. The method according to claim 7, wherein the determining, by the electronic device, the second refresh rate based on the movement parameter comprises:

obtaining, by the electronic device, the corresponding second refresh rate based on a speed interval to which the movement speed belongs, wherein the electronic device comprises a plurality of speed intervals and second refresh rates one-to-one corresponding to the speed intervals, and the second refresh rate is positively correlated with a speed value comprised in the speed interval.

9. The method according to claim 8, wherein when the movement speed belongs to a preset speed interval, the movement parameter meets the preset condition; and the preset speed interval is at least a part of the plurality of speed intervals, and a speed value comprised in the preset speed interval is greater than a speed value comprised in a speed interval other than the preset speed interval in the plurality of speed intervals.

10. The method according to claim 8, wherein the motion-effect curve is a uniform motion-effect curve, movement speeds corresponding to the motion-effect image at different moments remain consistent, and second refresh rates corresponding to the motion-effect image at different moments remain consistent; or the motion-effect curve is a nonuniform motion-effect curve, movement speeds corresponding to the motion-effect image at different moments are inconsistent, and second refresh rates corresponding to the motion-effect image at different moments change.

11. The method according to claim 10, wherein the nonuniform motion-effect curve comprises at least a first stage curve and a second stage curve, the first stage curve is a motion-effect curve between a motion-effect start moment and a first target moment, the second stage curve is a motion-effect curve after the first target moment, and a slope of the nonuniform motion-effect curve represents a movement speed of the motion-effect image; and a second refresh rate corresponding to the first stage curve is less than or equal to the first refresh rate, a second refresh rate corresponding to the second stage curve is greater than the first refresh rate, and the electronic device displays, at the second refresh rate less than or equal to the first refresh rate, the motion-effect image that appears before the first target moment.

12. The method according to claim 10, wherein the nonuniform motion-effect curve comprises at least a third stage curve and a fourth stage curve, the third stage curve is a motion-effect curve before a second target moment, the fourth stage curve is a motion-effect curve between the second target moment and a motion-effect end moment, and a slope of the nonuniform motion-effect curve represents a movement speed of the motion-effect image; and a second refresh rate corresponding to the third stage curve is greater than the third refresh rate, a second refresh rate corresponding to the fourth stage curve is less than or equal to the third refresh rate, and the electronic device displays, at the second refresh rate less than or equal to the third refresh rate, the motion-effect image that appears after the second target moment.

13. The method according to claim 6, wherein the electronic device comprises a refresh rate control module, a focus application, a target manager, a motion-effect management module, and an image synthesizer, and the target manager comprises a window manager or an input method manager; and the generating, by the electronic device in response to the first operation, motion-effect attribute information corresponding to the motion-effect image comprises:

directly invoking or indirectly invoking through the target manager, by the focus application, the motion-effect management module in response to the first operation, to generate the motion-effect attribute information corresponding to the motion-effect image, and sending the motion-effect attribute information to the image synthesizer;

sending, by the refresh rate control module, a changed refresh rate interval to the image synthesizer when a refresh rate interval corresponding to the focus application changes, wherein the refresh rate interval is an interval from a minimum refresh rate to a maximum refresh rate, and the second refresh rate determined by the image synthesizer belongs to the refresh rate interval; and wherein the calculating, by the electronic device based on the motion-effect parameter when the motion-effect type is a translation motion-effect, a movement parameter corresponding to the motion-effect image comprises:

calculating, by the image synthesizer based on the motion-effect parameter when determining that the motion-effect type in the motion-effect attribute information is the translation motion-effect, the movement parameter corresponding to the motion-effect image; and the determining, by the electronic device, the second refresh rate based on the movement parameter comprises:

determining, by the image synthesizer, the second refresh rate based on the movement parameter.

14. An electronic device, comprising a memory and a processor, wherein the memory is configured to store a computer program, and the processor is configured to invoke the computer program, to perform the following operations:

displaying, by the electronic device, a first interface at a first refresh rate;

receiving, by the electronic device, a first operation inputted by a user for the first interface;

displaying, by the electronic device, a motion-effect image at a second refresh rate in response to the first operation after the first operation on a screen of the electronic device ends; and displaying, by the electronic device, a second interface at a third refresh rate after the display of the motion-effect image is completed, wherein the motion-effect image is an image displayed in a process in which the electronic device switches from the first interface to the second interface; and the second refresh rate is greater than the first refresh rate and the third refresh rate.

15. The electronic device according to claim 14, wherein the electronic device comprises a target application; and the first interface is a desktop of the electronic device, and the second interface is an interface displayed after the target application is started; or the first interface is a desktop of the target application, and the second interface is a desktop of the electronic device.

16. The electronic device according to claim 14, wherein the electronic device comprises a target application, the first operation is a slide operation on an interface of the target application, and the slide operation comprises any one of a slide-up operation, a slide-down operation, a slide-left operation, and a slide-right operation; and the first interface is an interface displayed by the target application before the slide operation, and the second interface is an interface displayed by the target application after the slide operation.

17. The electronic device according to claim 14, wherein the electronic device comprises a target application, and the target application is a Settings application; and the first interface is a main setting interface of the Settings application, and the main setting interface comprises a plurality of setting items; the first operation is a tap operation on a target setting item in the main setting interface, and the target setting item is any one of the plurality of setting items; and the second interface is a setting interface corresponding to the target setting item.

18. The electronic device according to claim 14, wherein the electronic device comprises a target application; and the first interface is an interface comprising an input box in the target application, the first operation is a tap operation on the input box in the first interface, and the second interface is an interface comprising a touch keyboard; or the first interface is an interface comprising a touch keyboard, and the second interface is an interface comprising an input box in the target application.

19. The electronic device according to claim 14, wherein the displaying, by the electronic device, a motion-effect image at a second refresh rate in response to the first operation comprises:

generating, by the electronic device in response to the first operation, motion-effect attribute information corresponding to the motion-effect image, wherein the motion-effect attribute information comprises a motion-effect type and a motion-effect parameter;

calculating, by the electronic device based on the motion-effect parameter when the motion-effect type is a translation motion-effect, a movement parameter corresponding to the motion-effect image;

determining, by the electronic device, the second refresh rate based on the movement parameter; and displaying, by the electronic device, the motion-effect image at the second refresh rate, wherein the second refresh rate is greater than the first refresh rate and the third refresh rate when the movement parameter meets a preset condition.

20. A non-transitory computer-readable storage medium, wherein the computer-readable storage medium stores a computer program or instructions, and the computer program or the instructions, when run, the electronic device is enabled to perform the following operations:

displaying, by the electronic device, a first interface at a first refresh rate;

receiving, by the electronic device, a first operation inputted by a user for the first interface;

displaying, by the electronic device, a motion-effect image at a second refresh rate in response to the first operation after the first operation on a screen of the electronic device ends; and displaying, by the electronic device, a second interface at a third refresh rate after the display of the motion-effect image is completed, wherein the motion-effect image is an image displayed in a process in which the electronic device switches from the first interface to the second interface; and the second refresh rate is greater than the first refresh rate and the third refresh rate.

* * * * *